(12) United States Patent
Kembel et al.

(10) Patent No.: US 7,356,569 B1
(45) Date of Patent: Apr. 8, 2008

(54) APPARATUS AND METHOD FOR TRACING THE DISTRIBUTION OF DIVERSELY SOURCED INTERNET CONTENT

(75) Inventors: John Albert Kembel, Palo Alto, CA (US); George Andrew Kembel, Menlo Park, CA (US); Anthony P. Medrano, Mountain View, CA (US); Daniel S. Kim, Palo Alto, CA (US); John Russell, Palo Alto, CA (US); Jake Wobbrock, Palo Alto, CA (US); Geoffrey S. Kembel, Menlo Park, CA (US); Jeremy L. Kembel, Palo Alto, CA (US); Lynn D. Gabbay, Sunnyvale, CA (US); Scot J. Malloy, Portola Valley, CA (US); Joseph A. Bella, San Francisco, CA (US); Sridhar T. Devulkar, San Jose, CA (US); Mark Wallin, Mountain View, CA (US)

(73) Assignee: Mainstream Scientific, LLC, Mountain View, CA (US)

( * ) Notice: Subject to any disclaimer, the term of this patent is extended or adjusted under 35 U.S.C. 154(b) by 0 days.

(21) Appl. No.: 09/558,924

(22) Filed: Apr. 26, 2000

Related U.S. Application Data

(60) Provisional application No. 60/176,699, filed on Jan. 18, 2000, provisional application No. 60/176,687, filed on Jan. 18, 2000, provisional application No. 60/131,083, filed on Apr. 26, 1999, provisional application No. 60/131,115, filed on Apr. 26, 1999, provisional application No. 60/131,114, filed on Apr. 26, 1999.

(51) Int. Cl.
*G06F 15/16* (2006.01)
*G06F 3/00* (2006.01)

(52) U.S. Cl. .................. 709/217; 709/227; 715/513
(58) Field of Classification Search .......... 709/23–229; 705/14; 715/760, 512–515, 738–9, 804–5
See application file for complete search history.

(56) References Cited

U.S. PATENT DOCUMENTS 5,625,781 A   4/1997   Cline et al.
(Continued)

FOREIGN PATENT DOCUMENTS

WO       WO 01/80086 A2    10/2001

OTHER PUBLICATIONS

Patent Application entitled "Parallel Web Sites" U.S. Appl. No. 09/192,633, filed Nov. 16, 1998.
(Continued)

*Primary Examiner*—Joseph E. Avellino
(74) *Attorney, Agent, or Firm*—Jonathan A. Small

(57) ABSTRACT

The invention includes a method of tracking distributed content within a computer network. The method includes the step of identifying the delivery of a set of Network Information Monitors (NIMs). Information about each NTM within the set of NIMs is tracked. The information includes a first time at which a user opens a selected NIM, a second time at which the user closes the selected NW, and an identifier for the selected NIM. The information is used to determine sub-sets of NIMs that are displayed simultaneously. The invention also includes a method of identifying the delivery of a Network Information Monitor (NIM) to a user. Content information for the NIM is recorded. NIM use activity is tracked the user for a set of NIMs. The content information is correlated with the NIM use activity.

9 Claims, 35 Drawing Sheets

U.S. PATENT DOCUMENTS

| | | | |
|---|---|---|---|
| 5,649,186 A | 7/1997 | Ferguson | |
| 5,740,549 A | 4/1998 | Reilly et al. | 705/14 |
| 5,745,718 A * | 4/1998 | Cline et al. | 715/777 |
| 5,761,662 A | 6/1998 | Dasan | |
| 5,794,230 A | 8/1998 | Horadan et al. | |
| 5,796,393 A | 8/1998 | MacNaughton et al. | |
| 5,796,952 A * | 8/1998 | Davis et al. | 709/224 |
| 5,801,702 A | 9/1998 | Dolan et al. | |
| 5,802,530 A * | 9/1998 | Van Hoff | 715/513 |
| 5,809,248 A | 9/1998 | Vidovic | |
| 5,835,088 A * | 11/1998 | Jaaskelainen, Jr. | 715/803 |
| 5,890,172 A | 3/1999 | Borman et al. | |
| 5,893,091 A | 4/1999 | Hunt et al. | 707/3 |
| 5,923,885 A * | 7/1999 | Johnson et al. | 717/176 |
| 5,948,061 A * | 9/1999 | Merriman et al. | 709/219 |
| 5,974,446 A | 10/1999 | Sonnenreich et al. | |
| 5,977,964 A | 11/1999 | Williams et al. | |
| 5,983,227 A | 11/1999 | Nazem et al. | 707/10 |
| 5,987,513 A | 11/1999 | Prithviraj et al. | |
| 5,995,756 A | 11/1999 | Herrmann | |
| 6,006,252 A * | 12/1999 | Wolfe | 709/203 |
| 6,012,090 A | 1/2000 | Chung et al. | 709/219 |
| 6,012,098 A | 1/2000 | Bayeh et al. | |
| 6,018,344 A | 1/2000 | Harada et al. | |
| 6,026,433 A | 2/2000 | D'Arlach et al. | |
| 6,065,044 A * | 5/2000 | Ogasawara | 709/207 |
| 6,133,916 A | 10/2000 | Bukszar et al. | |
| 6,161,112 A | 12/2000 | Cragun et al. | |
| 6,177,936 B1 | 1/2001 | Cragun | |
| 6,199,082 B1 | 3/2001 | Ferrel et al. | |
| 6,215,490 B1 * | 4/2001 | Kaply | 715/788 |
| 6,230,173 B1 | 5/2001 | Ferrel et al. | |
| 6,275,854 B1 * | 8/2001 | Himmel et al. | 709/224 |
| 6,286,034 B1 * | 9/2001 | Sato et al. | 709/204 |
| 6,292,185 B1 * | 9/2001 | Ko et al. | 715/763 |
| 6,297,819 B1 * | 10/2001 | Furst | 715/733 |
| 6,317,759 B1 * | 11/2001 | Osmond | 715/513 |
| 6,341,305 B2 * | 1/2002 | Wolfe | 709/203 |
| 6,370,552 B1 * | 4/2002 | Bloomfield | 715/513 |
| 6,393,407 B1 * | 5/2002 | Middleton et al. | 705/14 |
| 6,411,992 B1 * | 6/2002 | Srinivasan et al. | 709/218 |
| 6,418,440 B1 * | 7/2002 | Kuo et al. | 707/10 |
| 6,434,563 B1 | 8/2002 | Pasquali et al. | |
| 6,460,029 B1 | 10/2002 | Fries et al. | |
| 6,484,149 B1 | 11/2002 | Jammes et al. | |
| 6,487,566 B1 | 11/2002 | Sundaresan | |
| 6,537,324 B1 | 3/2003 | Tabata et al. | |
| 6,538,673 B1 | 3/2003 | Maslov | |
| 6,549,612 B2 | 4/2003 | Gifford et al. | |
| 6,560,639 B1 | 5/2003 | Dan et al. | |
| 6,594,682 B2 | 7/2003 | Peterson et al. | |
| 6,606,657 B1 * | 8/2003 | Zilberstein et al. | 709/224 |
| 6,662,341 B1 * | 12/2003 | Cooper et al. | 715/513 |
| 6,757,716 B1 * | 6/2004 | Blegen et al. | 709/217 |
| 6,784,900 B1 | 8/2004 | Dobronsky et al. | |
| 6,816,880 B1 | 11/2004 | Strandberg et al. | |
| 6,819,343 B1 * | 11/2004 | Sobeski et al. | 715/848 |
| 6,842,779 B1 | 1/2005 | Nishizawa | |
| 6,879,994 B1 * | 4/2005 | Matsliach et al. | 709/204 |
| 7,222,303 B2 * | 5/2007 | Oren et al. | 715/744 |
| 2002/0091697 A1 | 7/2002 | Huang et al. | |
| 2004/0041836 A1 * | 3/2004 | Zaner et al. | 345/751 |

OTHER PUBLICATIONS

Alexa 1.4.1 Support Pages, 9 pgs., downloaded from www.alexa.com/support/index 1.html, Jan. 1999.

Alexa General FAQs, 4 pgs., downloaded from www.alexa.com/whatisalexa/faq.html#general, Jan. 1999.

"Custom Explorer Bars Give Sites an Edge," 2 pgs., downloaded from www.microsoft.com/Windows/Ie/IE5/custom.asp, Jan. 1999.

"Flexibility Across the Web", 2 pgs., downloaded from www.microsoft.com/Windows/Ie/IE5/choice.asp, Jan. 1999.

"Web Accessories Overview", 2 pgs., downloaded from www.microsoft.com/workshop/...er/accessory/overview/overview.asp, Jan. 1999.

"Browser Extensions Overview", 2 pgs., downloaded from www.microsoft.com/workshop/browser/ext/overview/overview.asp, Jan. 1999.

Alexa Technology, 4 pg.s, downloaded from www.alexa.com/support/technology.html, Jan. 1999.

"Creating Custom Explorer Bars and Desk Bands", 13 pgs., downloaded from www.microsoft.com/workshop/browser/ext/overview/Bands.asp, Jan. 1999.

Alexa Internet Tour, 1 pg., downloaded from www.alexa.com.whatisalexa/index.html, Jan. 1999.

"Revolutionary ad Model", Advertise on Alexa, 1 pg., downloaded from www.alexa.com/company/advertise.html, Jan. 1999.

"The Alexa Service Appears on Your Desktop in Its Own Window", 1 pg., downloaded from www.alexa.com/tour/overview.html, Jan. 1999.

"Know More About the Sites You Visit", 1 pg., downloaded from www.alexa.com/tour/site_stats.html, Jan. 1999.

"Find Related Web Sites", 1 pg. downloaded from www.alexa.com/tour/related_links.html, Jan. 1999.

500,000 Sites and Growing, 1 pg., downloaded from www.alexa.com/tour/archive.html, Jan. 1999.

"Research Tools at Your Fingertips", 1 pg., downloaded from www.alexa.com/tour/eb.html, Jan. 1999.

"Reporting", 1 pg., downloaded from www.alexa.com/company/reporting.html, Jan. 1999.

"Alexa Internet's Related Links Integrated Into Netscape Browsers", 1 pg., downloaded from www.alexa.com/company/netscape.html, Jan. 1999.

"Demographics", 1 pg., downloaded from www.alexa.com/company/demographics.html, Jan. 1999.

"Ads Appear in the Pop-up and on the Bar", 1 pg., downloaded from www.alexa.com/company/adspecs.html, Jan. 1999.

"Alexa Why Crawl", 1 pg., downloaded from www.alexa.com/support/why_crawl.html, Jan. 1999.

GIF Image 590×329 pixels, Alexa, 1 pg., downloaded from www.alexa.com/tour/images/alexa_overview.gif, Jan. 1999.

"It's X-treme!", Alexa, PC Magazine: The Best of 1998, 1 pg., downloaded from www.zdnet.com/pcmag/special/bestof98/internet5.html, Jan. 1999.

"Search While You Surf", PC Magazine: Search the Web, 1 pg., downloaded from www.zdnet.com/pcmag/features/websearch98/surf.html, Jan. 1999.

Online document; MindSpring, My Yahoo!; © MindSpring Enterprises, Inc.; http://www.mindspring.com/myyahoo/contents.htm.; Dec. 1997, pp. 1-16.

U.S. Appl. No. 09/558,922, filed Apr. 26, 2000, Kembel et al.

U.S. Appl. No. 09/558,923, filed Apr. 26, 2000, Kembel et al.

U.S. Appl. No. 09/558,925, filed Apr. 26, 2000, Kembel et al.

Morrison, Michael: XML Unleashed: Sams Publishing, Dec. 21, 1999.

Flanagan, David: JavaScript: The Definitive Guide, 3rd Edition, O'Reilly: Jun. 1998.

* cited by examiner

| 270 | 271 | 272 | 273 | 274 | 275 |
|---|---|---|---|---|---|
| IDENTIFICATION | FRAME<br>- Titlebar<br>- Size<br>- Position<br>- Bottombar<br>- Exit | MENU<br>- Item(s)<br>- Action | CONTROLS<br>- ID<br>- Layout<br>- Initialization (e.g. URLs) | CATEGORIES | EVENTS |

FIG. 13

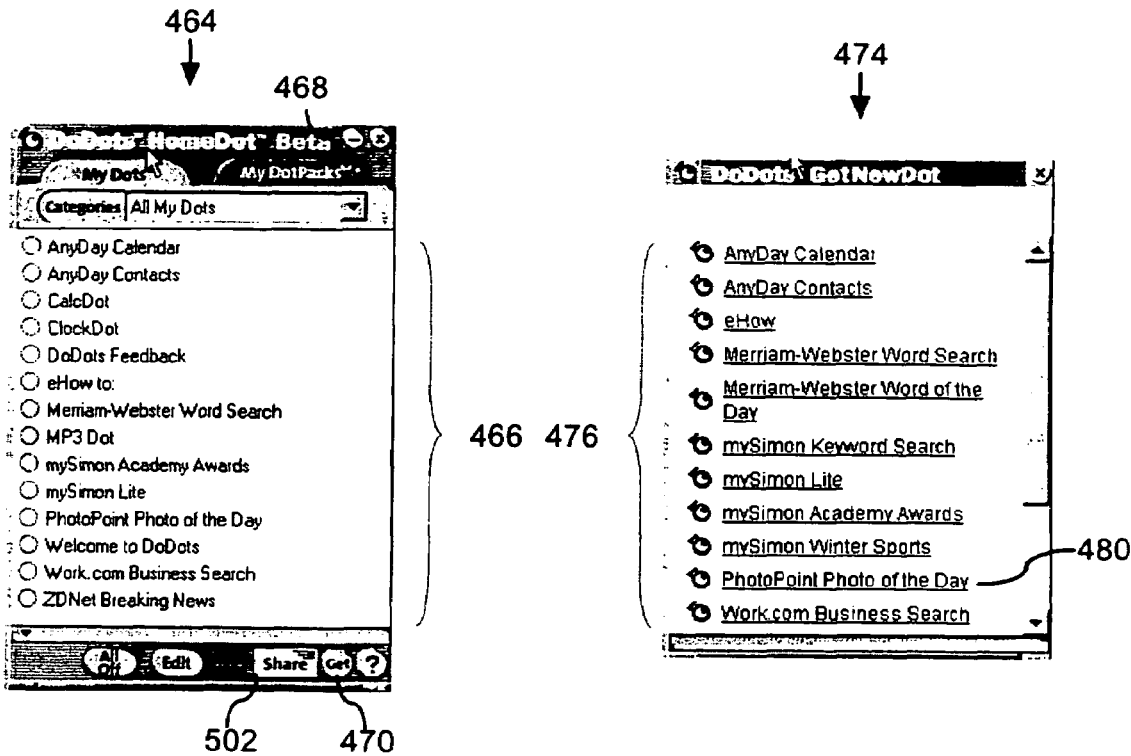
FIG. 21  FIG. 22
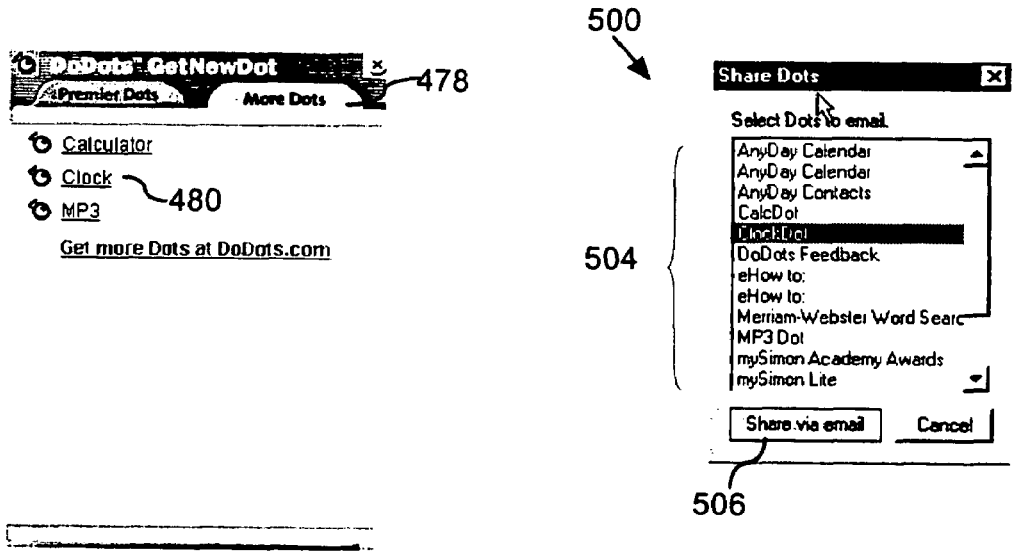
FIG. 23  FIG. 25

| SHARELINK DATABASE | | | | |
|---|---|---|---|---|
| Share Table | | | | |
| | Share ID | | | |
| | | Share Module | | |
| | | | Creation Date | |
| | | | NIM Definition Module | |
| | | | | Look and Feel |
| | | | | Initialization URL |
| | | | | Location |
| | | | Sharepack Module | |
| | | | | NIM Definition Module 1 |
| | | | | NIM Definition Module N |

78 — SHARELINK DATABASE
484 — Share Table
486 — Share ID
488 — Share Module
490 — Creation Date
492 — NIM Definition Module
494 — Sharepack Module
496 — NIM Definition Module 1
498 — NIM Definition Module N

DoDots ·····ᛅ Collect the Dots

Your Dot List:     FAQ     Dot Design Guide     Development Support

Get the HomeDot
Collect the Dots
About Dots

Company
News
Careers
Partners

Help
Contact Us
Log Out

Modify Dot

Fields marked with an asterisk (*) are required.

● Delete ———— 532 ———— ● Save

General Dot Information

Dot Name*: ?

MP3 Dot

○ Development    ⊙ ● Public ⟶ 538

Username and Dot Company: ?

johnny    DoDots

URL for Branding Image*: ?

../DotPartners/jiffybank/DotIndex/jiffybank_80x4
0.gif

URL for Detailed Image*: ?

../DotPartners/jiffybank/DotIndex/MP3_100x100.gi
f

Statistics Database

| Events | User ID | Start Time | End Time | NIM ID | Provider ID | URL | NIM Pack ID |
|---|---|---|---|---|---|---|---|
| ⌐1002 | ⌐1004 | ⌐1006 | ⌐1008 | ⌐1010 | ⌐1012 | ⌐1014 | ⌐1016 |
| Event 1 ⋮ Event n | ⋮ | ⋮ | ⋮ | ⋮ | ⋮ | ⋮ | ⋮ |

| Content Database | | | |
|---|---|---|---|
| Content Descriptor ⌐1052 | NIM ID ⌐1054 | Start Time ⌐1056 | End Time |
| Content Descriptor 1 ⋮ Content Descriptor n | ⋮ | ⋮ | ⋮ |

1058 points to the header row.

FIG. 36

APPARATUS AND METHOD FOR TRACING THE DISTRIBUTION OF DIVERSELY SOURCED INTERNET CONTENT

CROSS-REFERENCE TO RELATED DOCUMENTS

This application claims the benefit of and hereby incorporates by reference in their entireties U.S. Provisional Application Nos. 60/131,083 filed Apr. 26, 1999; 60/131,115 filed Apr. 26, 1999; 60/131,114 filed Apr. 26, 1999; 60/176,687 filed 5 Jan. 18, 2000; and 60/176,699 filed Jan. 18, 2000.

BACKGROUND OF THE INVENTION

A user operating a client computer typically accesses the Internet by using a viewer application, such as a browser to view web content provided at a destination address, typically a web page. In this context, web content and web applications are designed to fill the entire web page. It is known to divide the web content into different regions of a single web page. For example, personalized web pages can be specified, such that a user views a variety of content sources in a single page, such as stock information, weather information, and sports information, which is aggregated at the server that delivers the web page to the user, who then views the aggregated content in a single web page. Observe that even when disparate content is aggregated, in this manner, it is reassembled into a full web page and is served through a full-screen browser. Web content and application developers therefore have limited control over the user experience: content is typically trapped within the frame of the browser. A developer's only alternative to engaging a user page-by-page in a browser is to develop, distribute, and support custom client software. In the Web browser scenario, it is the content provider, not the user that aggregates the information that is viewed by the user. Thus, the user is not in a position to separately aggregate the content at a client computer, instead the user is constrained to view the content that has been delivered in the manner provided by the server computer hosting the web page. There is a growing desire for individual users to fully control the aggregation and presentation of content and web applications that appears on a client computer.

A user who wishes to view multiple web pages or applications can open multiple instances of a browser. However, the user will not be able to view each "full-screen" page at the same time. Instead, the user must adjust the windows corresponding to each browser instance and view only part of each page. The information appearing in each browser is not designed for viewing in this manner. Thus, the user cannot create an optimized display of content from multiple sources.

Currently, content providers and end users have limited tools to alter the browser in which content appears. That is, the controls associated with a browser are not fully configurable. Thus, the vendor of a browser is in a position to brand the browser and regulate the controls associated with the browser. There is a growing desire for content providers to not only fill a browser with their content, but to also fully brand and control the frame in which the content appears. Further, in some instances, content providers desire to limit the controls associated with a browser or viewer, so that a user is more inclined to view a single set of content, for example, by having limited access to previously viewed content.

At the present time, it is relatively difficult to trace the content viewing activity of a client computer. In other words, it is difficult to identify the type of content that a particular user of a client computer favors. Consequently, there are limited tools 25 available to provide a user with tailored information that would be of particular interest to the user.

In view of the foregoing, there is a need in the art to provide a technique for accessing multiple instances of distributable computer readable media in their entirety simultaneously, where these instances are typically smaller than the full pages used in 30 current web pages and web applications. There is a further need for providing the user with flexibility in selecting, collecting, relating and viewing such computer readable media, and for giving the media provider flexibility in directing media to a specific user and controlling the framework in which media is presented. Finally, there is a need to gather more accurate information regarding the type of content that a user enjoys, so that the user can be automatically provided with this content.

SUMMARY OF THE INVENTION

The invention includes a method of tracking distributed content within a computer network. The method includes the step of identifying the delivery of a set of Network Information Monitors (NIMs). Information about each NIM within the set of NIMs is tracked. The information includes a first time at which a user opens a selected NIM, a second time at which the user closes the selected NIM, and an identifier for the selected NIM. The information is used to determine sub-sets of NIMs that are displayed simultaneously.

The invention also includes a method of identifying the delivery of a Network Information Monitor (NIM) to a user. Content information for the NIM is recorded. NIM use activity is tracked the user for a set of NIMs. The content information is correlated with the NIM use activity.

The invention also includes an apparatus in the form of a computer readable memory to direct a computer to function in a specified manner. The computer readable memory includes a first executable module to identify the delivery of a set of Network Information Monitors (NIMs). A second executable module tracks information about each NIM within the set of NIMs. The tracked information includes a first time at which a user opens a selected NIM, a second time at which the user closes the selected NIM, and an identifier for the selected NIM. A third executable module determines from the information sub-sets of NIMs that are displayed simultaneously.

BRIEF DESCRIPTION OF THE DRAWINGS

FIG. 13 illustrates a data structure for a NIM definition, stored in the NIM application server's template database or user profile database;

FIG. 21 is an illustration of the main home NIM graphical user interface used in accordance with an embodiment of the invention;

FIG. 22 is an illustration of a "Get New NIM" graphical user interface that may be used in accordance with an embodiment of the invention;

FIG. 23 is an illustration of a "More NIMs" graphical user interface representative of an embodiment of the invention;

FIG. 24 is a diagrammatic illustration of the ShareLink database used in accordance with an embodiment of the invention;

FIG. 25 is an illustration of a Share NIM's graphical user interface according to an embodiment of the invention;

FIG. 27 is a partial view of a NIM modification web page utilized in accordance with an embodiment of the invention;

FIGS. 29A to 31B are illustrations of Administrative Zone (AdminZone) Web pages utilized in accordance with an embodiment of the invention;

FIG. 34 illustrates a statistics database that may be used in accordance with an embodiment of the invention;

FIG. 36 illustrates a content database that may be used in accordance with an embodiment of the invention;

DETAILED DESCRIPTION OF THE INVENTION

The present invention discloses a technology that is capable of processing distributable computer readable media. Distributable computer readable media includes, but is not limited to, standard web content, such as HTML, dHTML, images, imbedded ActiveX and Java applications, JavaScript, CSS, Pen scripts, Streaming Media, and/or Flash. The present invention is advantageous relative to prior art systems and methods because it provides improved mechanisms for simultaneously interacting with several independent sources of distributable computer readable media, collecting references to such media, and sharing such references with other users. The ac disclosed technology is further advantageous because it provides improved systems and methods for on screen management of distributable computer readable media.

In the system and method of the present invention, a user logs into a server by providing a login identifier to a login construct. The login identifier is used by the server to obtain an unprocessed user profile that corresponds to the user. The unprocessed user profile is processed by the server to generate a processed user profile. Advantageously, this processing step allows for up-to-date refinement of the user profile. Up-to-date refinements include, for example, the addition of advertisements directed to the user based on one or more characteristics in the user profile. The processed user profile is delivered to the client computer associated with the user. The processed user profile includes references to home networked information monitors (NIMs). As used herein, the term networked information monitor or NIM refers to a fully configurable frame with one or more controls; the frame through which content is optionally presented. The fully configurable frame utilized in accordance with the invention stands in contrast to present web browsers, which are branded by the browser vendor and which have limited means by which to alter the controls associated with the browser. The figures illustrate NIMs supplied by DoDotS™, the assignee of the present invention. The reader is invited to visit www.dodots.com to experience the NIM technology described in this document.

Attention is initially directed toward the home NIM of the invention, which coordinates the activities of all other NIMs that are accessed by a user. The home NIM facilitates much of the technology of the present invention, including the ability to simultaneously review multiple sources of distributable computer readable media as well as to package and distribute such media.

Figure 1:
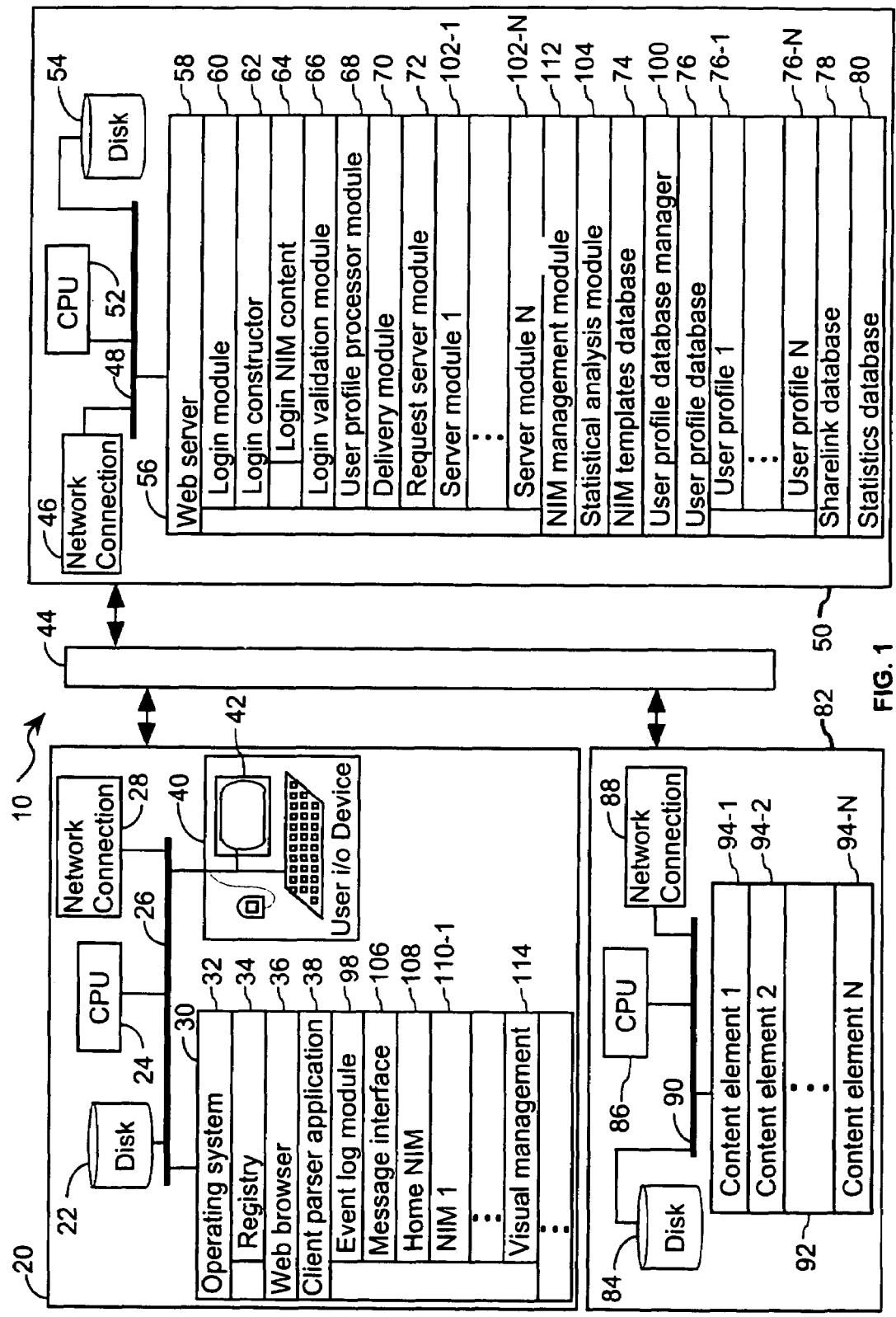
FIG. 1 illustrates a system for processing distributable computer readable media in accordance with one embodiment of the present invention.

FIG. 1 is a general illustration of a system in accordance with one embodiment of the present invention. In FIG. 1, a network 10 is operated in accordance with the present invention. Network 10 includes at least one user or client computer 20, at least one server computer of class 50, and optionally one or more server computers of class 82. User computer 20 as well as server computers of class 20 50 and 82 are each connected by transmission channel 44, which is any wired or wireless transmission channel.

User computer 20 is any device that includes a Central Processing Unit (CPU) 24 connected to a random access memory 30, a network connection 28, and one or more user input/output ("i/o") devices 40 including output means 42. Output means 42 is any device capable of communicating with a user and includes, for example, a video monitor, a liquid crystal display, voice user interfaces, and/or integrated graphic means such as mini-displays present in web-phones. Typically, user computer 20 includes a main non-volatile storage unit 22, preferably a hard disk drive, for storing software and data. Further, user computer 20 includes one or more internal buses 26 for interconnecting the aforementioned elements. In a typical embodiment, memory 30 includes an operating system 32 for managing files and programs associated with user computer 20. In some embodiments, operating system 32 includes a registry 34 that has one or more references to specified locations in system 10. The exemplary memory 30 of FIG. 1 further includes a web browser 36 for viewing web content and a client parser application 38 for facilitating low level functionality, such as login and logout procedures, in accordance with the present invention. In some embodiments, client parser application 38 uses the one or more references in registry 34 to obtain a login construct from server 50. In various embodiments, in accordance with the present invention, client parser application 38 runs in conjunction with one or more software modules, such as an event log module 98, which tracks user activity, a message interface module 106, which serves as a communication interface between the client parser application 38 and web server 58 and/or external web servers, a home NIM 108, which references one or more NIMs 110, and a visual management system 114 which regulates the characteristics of visual manifestations of NIMs 108 and 110 when displayed on output device 42. Furthermore, in some embodiments, client parser application 38 runs in conjunction with instances of web browser 36 as well as web server 58 as detailed below.

Server computer 50 includes standard server components, including a network connection device 46, a CPU 52, a main non-volatile storage unit 54, and a random access memory 56. Further, server computer 50 includes one or more internal buses 48 for interconnecting the aforementioned elements. Memory 56 stores a set of computer programs, modules and data to implement the processing associated with the present invention.

The embodiment of memory 56 illustrated in FIG. 1 includes a web server 58 for processing requests received from client computer 20. Web server 58 has many components, including a variety of modules and data structures to assist users that want to log into system 10. Namely, login module 60 handles an entry request from a client computer 20 and accepts a login identifier that corresponds to a user from client computer 20. Login constructor 62 generates a login construct in response to a call for a login construct and transfers the login construct to client 20. Login constructor 62 dynamically generates login constructs using updated login NIM content 64. Login validation module 66 works in conjunction with user profile database manager 100 to identify an unprocessed user profile, which is associated with a user provided login, in user profile database 76. If an unprocessed user profile corresponding to the user provided login does not exist in user profile database 76, login validation module 66 associates a new unprocessed user profile with the login identifier.

When an unprocessed user profile is identified by login validation module 66, it is processed by user profile processor module 68 to produce a processed profile. It will be appreciated that the services of user profile processor module 68 are highly advantageous because they allow for last minute user profile revisions. Such revisions include, for example, the addition or customization of NIMs referenced by the user profile, and/or server redirect information that is a function of current server load in system 10. Importantly, the processed user profile includes a reference to a home NIM. The home NIM is capable of accessing each of the NIMs that are represented in the processed user profile. Memory 56 further includes delivery module 70, which coordinates the delivery of portions of the home NIM to the client based on parameters specified in the processed user profile.

Once a user has successfully logged into system 10, request server module 72 handles requests for specified NIMs from client 20. When such a request is received, request server module 72 routes the request to an address that corresponds to the specified NIM and transmits the specified NIM to client 20. One class of specified networked information handled by request server module 72 is requests for NIMs. When such a request is received, request server module 72 searches NIM templates database 74 for the specified NIM. NIM templates database 74 includes a large number of NIM templates. Each NIM template defines the characteristics of a specific NIM, including fully configurable frame characteristics, viewer and control characteristics, and NIM content references.

The web server 58 illustrated in FIG. 1 further includes additional modules 102 to handle specialized features of the present invention. For example, one embodiment of the present invention provides a mechanism that allows users to distribute NIMs to each other. In such embodiments, a special server module 102 provides instructions for storing the NIMs, which are to be distributed, in sharelink database 78. Advantageously, NIMs that are distributed to other users are customizable. A user can, for example, resize and position a particular NIM prior to sharing it with another user. Indeed, it is possible, in such embodiments, for a user to arrange a series of NIMs in a unique arrangement and then distribute the collection of NIMs in the designated NIMs in the designed arrangement. As an illustration, a user arranges a first NIM that represents a scrolling stock ticker at the bottom of an output means, such as a computer screen, a second NIM that tracks the NASDAQ top ten most heavily traded stocks in the upper left corner of the output means, and a third NIM that tracks headline news on the upper right hand corner of the output means. Then, the user distributes the three NIMs in this customized arrangement to other users. Observe that in this example a user of a client computer is aggregating separate sets of information in different NIMs. This stands in contrast to prior art approaches where a web server running on a server computer aggregates information in a single page.

System 10 is highly scalable and thus supports a large number of users. This scalability stems from the fact that the server 50 is delivering the definition associated with a NIM. The content displayed in the NIM may be located on a separate computer.

Memory 56 provides a statistical analysis module 104 for tracking key events associated with users. This information is stored in statistics database 80. The information collected by statistical analysis module 104 is used for a wide variety of purposes, including server load optimization and directed advertising, as discussed below. As described below, the statistical information gathered in accordance with the invention includes fully traced events defining the type of content and the duration over which all content is viewed by a user. This type of comprehensive information is not available using present techniques.

Much of the distributable computer readable media that is available for processing is stored as content elements 94 on server 82. Server 82 is a standard web server that includes components such as a network connection device 88, a CPU 86, a main non-volatile storage unit 84, a random access memory (RAM) 92, and one or more internal buses 90 for interconnecting the aforementioned elements. RAM 92 includes some of the content elements 94 stored by server 82. Other content elements 94 are stored in storage unit 84. In some embodiments, a single web server 58 is capable of directly accessing content elements 94 located on one or more servers 82. In other embodiments, each server 82 has a resident web server module that works in conjunction with server 50 to identify, optionally dynamically generate, and serve content elements 94 upon demand.

Figure 2:
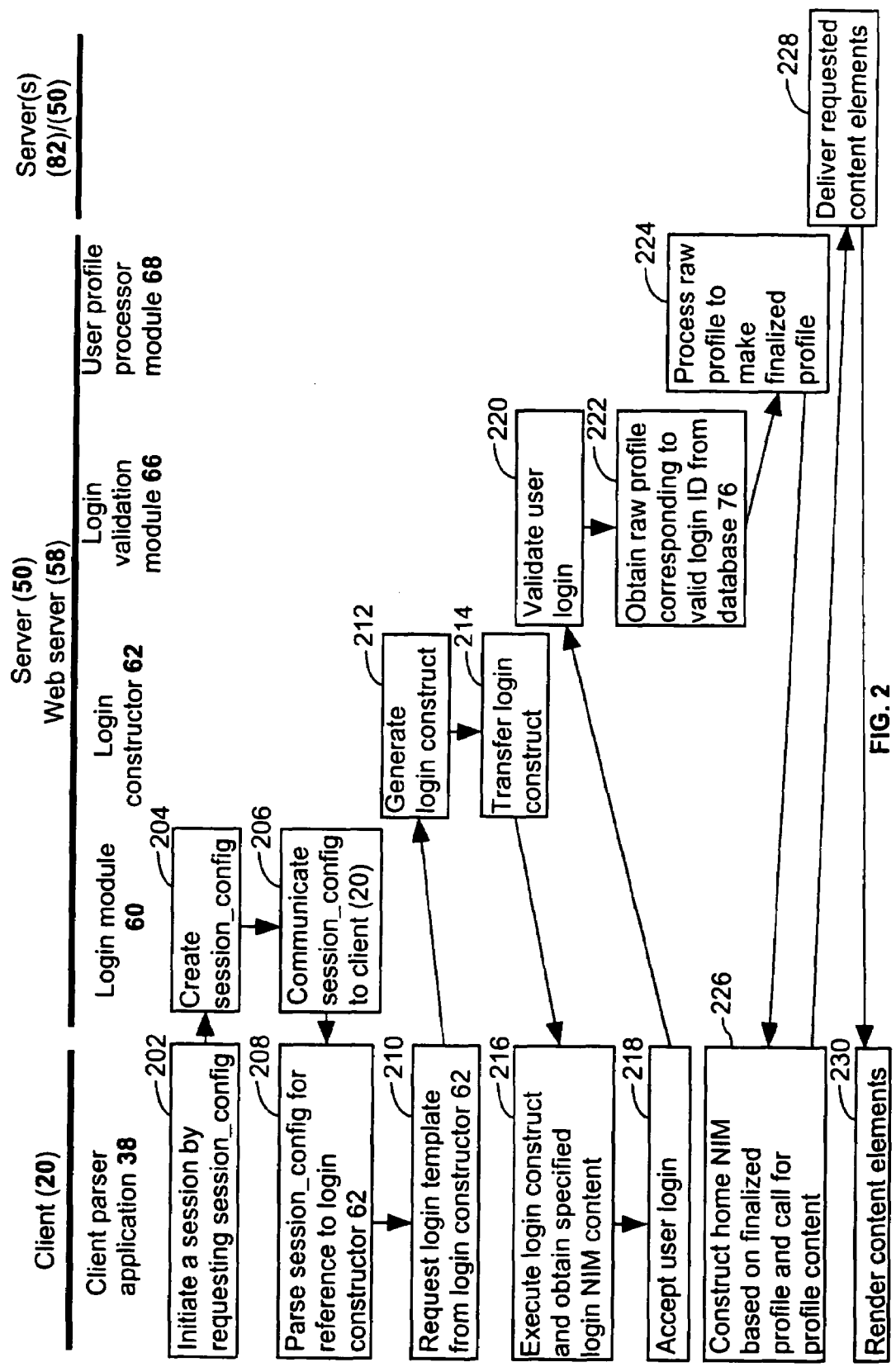
FIG. 2 shows exemplary processing steps used to initiate an instance of a home networked information monitor (NIM) using the apparatus of FIG. 1.

Now that general architecture of a system in ac dance with the present invention has been disclosed, attention turns to FIG. 2, which discloses a method for logging into system 10 (FIG. 1). In the first processing step shown in FIG. 2 (202), a user initiates a session on system 10 by requesting the global login script "session_config." It will be appreciated that the term "session_config" merely provides an illustrative name for the global login script and that the technology of the present invention is by no means limited to this name or the script described.

The request for "session_config" originates on client 20 and is sent to server 50 where it is processed by login module 60 of web server 58. Upon receiving request 202, login module 60 creates a "session_config" global login script (204). Processing step 204 is advantageous relative to systems that have static global login scripts because it allows for the incorporation of highly variable information. This highly variable information includes, for example, system settings such as up-to-date server redirect information, server content address changes, directed advertisements, and messages. An exemplary "session_config" is found in Example I below. Each line of data has an associated numeral. The remaining text in the example describes the purpose of select data.

EXAMPLE 1

Version tag that identifies the latest home NIM version
(1) </SESSION_CONFIG VERSION="alpha:3"
Upgrade event that is sourced when home NIM version is outdated
(2) <UPGRADE=http://www.NIM.com/QuickOpen.exe>
Location of Server-Supported Functionality
Default base address for server supported functionality
(3) <METHODS BASEURL=http://neo.NIM.com/servlet/NIMServer/>
(4) <ADD_USER URL="addUser/>
(5) <GET_USER URL="getUser"/>
(6) <SET_USER URL="setUser/>
(7) <GET_SES_CONFIG URL=http://www.NIM.com/home_NIM/s_cnfg.xml"/>
Server-based functionality for setting password
(8) <SET_PASSWORD URL="setPassword"/>
List of all publicly available NIMs
(9) <GET_MASTER_NIM_LIST URL="getMaster NIMList"/>
(10) <GET_ALL_CONFIG URL="getAllConfig"/>
(11) <SET_ALL_CONFIG URL="setAllConfig/>
(12) <SET_ALL_STATS URL="setAllStats"/>
(13) <GET_NIM_TEMPLATE URL="get NIM_Template"/>
Location of server-side NIM and pack sharing functionality
(14) <ADD_SHARE URL="addShare"/>
(15) <GET_SHARE URL="getShare"/>
(16) <AUTH_TEST URL="DOeCHO?AUTH=TRUE"/>
Redirect information
(17) <DO_REDIR URL="doRedir"/>
(18) </METHODS>
Flexible content layer that defines default NIM frame appearance, including the default appearance of the frame of a home NIM
(19) <FRAMES>
Default NIM frame appearance
(20) <NIM>
(21) <IMAGES BASEURL= http://www.NIM.com/home_NIM/NIM_FrameImages/>
(22) </NIM>
Default home NIM frame appearance
(23) <HOME_NIM>
(24) <IMAGES BASEURL= http://www.NIM.com/home NIMImages/>
(25) </HOME_NIM>
(26) </FRAMES>
Location of system NIM templates
(27) <NIMs>
(28) <ADD TEMPLATE="http://www.NIM.com/ . . . /add_NIM_XML.xml"/>
(29) <HELP TEMPLATE="http://www.NIM.com/ . . . /help_NIM_XML.xml"/
(30) <LOGIN TEMPLATE="http://www.NIM.com/ . . . /login2.xml"/
(31) </NIMs>
(32) </SESSION_CONFIG>

Line 1 of the exemplary "session_config" of Example 1 provides the version tag for the expected version of the home dot system that corresponds to the "session_config" script. In one embodiment, client parser application 38 determines whether it is up-to-date using the information in line I. If client parser application 38 determines that it is outdated, an upgrade request is made in accordance with the instructions provided by the UPGRADE flag of line 2. In one embodiment, the UPGRADE flag in line 2 of Example I describes the location of an executable program, one of skill in the art will appreciate that this flag can in fact reference any form of instruction, including a flat file, a web page, a script, a symbol, or an address.

Lines 3 through 18 in Example 1 define the functionality that is provided by a server, such as server 50. For example, line 8 of Example 1 provides the location of a set of instructions that are called when a user requests a password change. Furthermore, line 9 of Example 1 provides the location of master list of NIMs that are publicly available. Lines 14 and 15 of Example 1 provide the location of specialized server-side functionality that allows users to share data such as NIM definitions.

Lines 19 through 26 of Example 1 define where the default appearance of a NIM and a home NIM are found within system 10. Lines 27 through 31 define a collection of system NIMs. A system NIM is any type of NIM that is to be distributed to each user of system 10. In some embodiments, system NIMs are used to provide a core functionality. In Example I, line 28 defines a NIM that provides users with a convenient mechanism for collecting additional NIMs. Line 29 defines the location of a NIM that is invoked when the user presses a help button associated with a home NIM. Finally, line 30 defines the location of a NIM that is used to log into system 10.

Returning to FIG. 2, once login module 60 has created "session_config," it is sent back to requesting client 20 (206). When a "session_config" is received by client 20, client parser application 38 parses the global login script in order to identify a reference to a login constructor 62 (208). Login constructor 62 is a server-based module that generates a construct that allows a user to log into system 10. When client parser application 38 locates the reference to login constructor 62 in "session_config," a request for a login construct is directed to the identified reference (210). In Example 1 above, the reference to the login construct is provided in line 30. On line 30, the global variable "LOGIN TEMPLATE" is assigned the URL address "http://www.N-IM.com . . . /login2.xml." Client parser application uses the URL assigned to the global variable "LOGIN TEMPLATE" to make a request for a login constructor 62 that is directed to this URL. When login constructor 62 receives a request for a login construct, it generates a login construct (212).

Figure 3A:
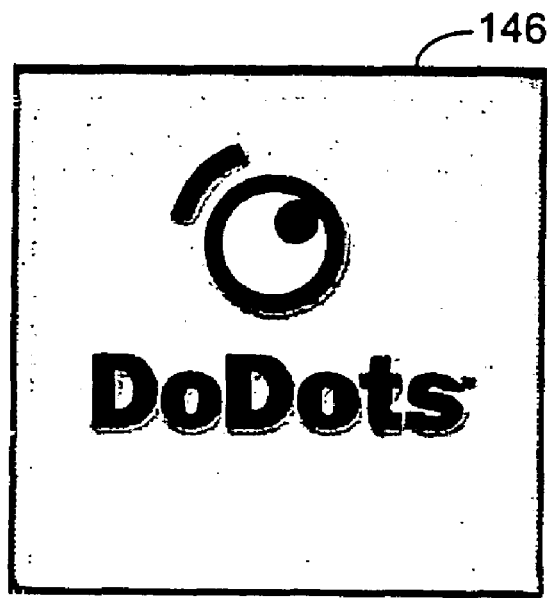
FIG. 3A illustrates a screen logo in accordance with one embodiment of the present invention.

Login construct 148 (FIG. 3B) illustrates a type of login construct that is generated in one embodiment of the present invention during processing step 212. Before the login construct is executed on client 20, a schematic such as logo 146 (FIG. 3A) is displayed on output means 42. As illustrated in FIG. 1, login constructor 62 is a component of web server 58. However, there is no requirement that login constructor 62 be a component of web server 58. In fact, login constructor 62 is a standalone software program in some embodiments of the present invention whereas in other embodiments, login constructor 62 is merely a script, such as a PERL script, that is processed by an interpreter program native to server 50. In still other embodiments, login constructor 62 is merely a simple flat file that includes a set of instructions that are interpretable by client parser application 38. In such embodiments, login constructor 62 is the login construct. In embodiments in which a login construct is dynamically generated, it is possible to introduce last minute changes in the login construct. Thus, an advantage of the exemplary login process shown in FIG. 2 is that there are multiple stages in which updated information is used to customize the login process based on the environmental variables.

Once a login construct has been prepared by login constructor 62, it is transferred back to client 20 (214) (FIG. 2) and executed in conjunction with client parser application 38 (216). The login constructs of the present invention are a form of NIM. Therefore, one function of processing step 216 is to obtain the login NIM content 64 (FIG. 1) specified by the login construct from server 64. In login construct 148, for example, the login NIM content includes the shape and functionality of "Exit button 160," message 150, the shape and functionality of "New user" button 152, the functionality of "Forgot it?" button 154, and login panel 156. When processing step 216 is completed, the user uses the login construct to provide a login identifier (218).

Figure 3B:
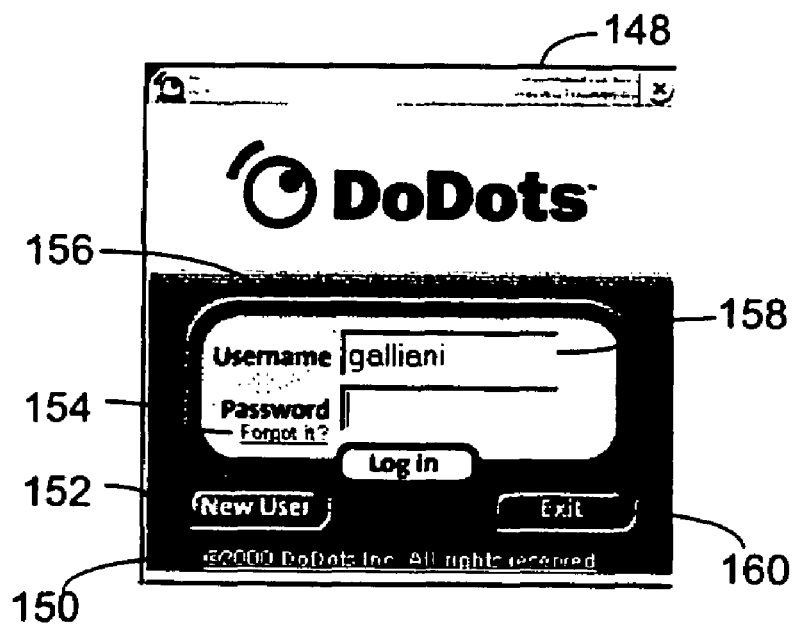
FIG. 3B illustrates a login construct in accordance with one embodiment of the present invention.

In FIG. 3B, a user has provided the login identifier "Galliani." The definition of login identifier as used in the present invention is to be broadly construed. In some embodiments, login identifiers include a unique name and a corresponding password. In other embodiments, a login identifier does not have a password. This is particularly the case when the user is a guest or a new user and there is no user profile associated with the user.

Working in conjunction with client parser application 38, the login construct accepts the user login and sends it to server 50 for validation (218). As illustrated in the exemplary system of FIG. 1, web server 58 includes a login validation module 66 to verify the login identifier provided by user (220). Typically, processing step 220 involves a look-up operation in which the login identifier is used to query user profile database 76 for an unprocessed or raw user profile that matches the login identifier. In embodiments that include a password, validation step 220 includes a password verification step. Successful completion of processing step requires entry of a valid login identifier sequence in processing step 218. When processing step 220 has been successfully completed, the raw or unprocessed user profile corresponding to the login identifier is obtained from user profile database 76 (FIG. 1) (222) and is processed by user profile process module 68 to produce a processed or finalized user profile that is delivered to client 26 (226). In sonic embodiments, a user profile 76 includes user contact information, such as the name, address, telephone number and email address of a user. Additionally, some embodiments of system 10 provide different types of access privileges. For example one embodiment of the present invention includes developer access privileges, administration access privilege, and general user access privileges. In such embodiments, the access privileges that have been granted to a user are stored in the user profile 76 associated with the user.

The processed user profile includes a reference to each NIM in system 10 that is associated with the login identifier provided in processing step 216. One of the NIMs referenced by the processed user profile is the home NIM that corresponds to the login identifier provided in processing step 216. When executed in conjunction with client parser application 38 in processing step 226, the home NIM provides a mechanism for accessing each of the NIMs referenced by the processed user profile. Like the login construct, the home NIM includes several components, including pull down menus and screen manipulation functionality. The reference to the home NIM in the processed user profile includes the system 10 address of each of these components. Therefore, in one embodiment, construction of the home NIM in processing step 226 involves one or more requests to server 50 and/or server 82 for content (228) that is then rendered (230) in accordance with the home NIM description provided in the processed user profile. In some embodiments, the home NIM is distinct from other NIMs in the sense that a large proportion of the home NIM in such embodiments is pre-compiled. Such embodiments are advantageous because some of the functionality provided by the home NIM requires substantial client 30 processing resources. Therefore, to minimize such processing resource requirements, many aspects of the home NIM are pre-compiled in some embodiments. In other embodiments, however, the home NIM has a structure that is substantially the same as a regular NIM. In such embodiments, simple script commands are used to identify the NIM as a home NIM.

Upon completion of processing step 230, the user is granted access to all of the technologies of the present invention, including the ability to view multiple NIMs simultaneously, collect new NIMs, customize NIMs, and share customized NIMs with other users. An exemplary processed user profile is provided in Example 2. Once again, each line of data is identified with a numeral, while the remaining text in the example describes select data. In some embodiments, the user is granted specific privileges and the extent to which the user is granted access to system 10 is regulated by the types of privileges that have been granted to the user.

EXAMPLE 2

(1) SAMPLE PROCESSED USER PROFILE
(2) <ALL CONFIG>
NIMs AND PACKS THAT CORRESPOND TO THE USER
(3) USER
NIM definition 1
(4) <NIM DOMAIN="ZDNet" GLOBALID="1" KND="news"
(5) <FRAME BACKGROUNDCOLOR=#FFFF00" COLLAPSED="FALSE"
(6) FIXHEIGHT="TRUE" FIXWIDTH="TRUE" NAME="ZDNet Breaking News"
(7) PIXELHEIGHT="275" PIXELWIDTH="235" X="RIGHT" Y="TOP">
(8) <TITLE COLOR=#000000" JUSTIFY="RIGHT" TEXT=" "/>
(9) <TITLEBARIMAGE DOWN=http://www.NIM.com/ . . . /feed/titlebar.gif
(10) HOVER=URL address to a first GIFfile <param 1> . . . <param N>
(11) INACTIVE=URL address to a second GIFfile <param 1> . . . <param 2>
(12) NORMAL=URL address to a third GIFfile <param 1> . . . <param 2>
(13) <BOTTOMBARIMAGE DOWN= http://www.NIM.com/ . . . /feed/bottombar.gif
(15) HOVER=URL address to a fourth GIFfile <param 1> . . . <param 2>
(16) INACTIVE=URL address to afifth GIFfile <param 1> . . . <param 2>
(17) NORMAL=URL address to a sixth GIFfile <param 1> . . . <param 2>
(18) </FRAME>
(19) <MENU/>
(20) <CONTROL_LAYOUT HEIGHT="1" HEIGHTSCALES="TRUE" WIDTH="1"
(21) WIDTHSCALES="TRUE"><CONTROL CLASS="Browser" HEIGHT="1"
(22) ID="1" KIND="A" LEFT="0" TOP="0"
(23) URL=http://www.mandala.com/cgl/zdnet/zdfeedl-.cgi WIDTH="1"/>
(24) </CONTROL_LAYOUT>
(25) <CATEGORIES/>
(26) <EVENTS/>
(27) </NIM>
NIM definition 2
(28) <NIM DOMAIN=NIM DOMAIN 2 GLOBALID='2'
(29) </NIM>
NIM definition N
(30) <NIM DOMAIN=NIM DOMAIN2 GLOBALID='N'
(31) </NIM>
Pack definition 1
(32) <PRESET TITLE="New DotPack">
(33) <NIM GLOBALID="1" X="RIGHT" Y="TOP"/>
(34) <NIM GLOBALID="2" X=RIGHT Y="320"/>
(35) </PRESET>
(36) </SHARE>
Last state of the home NIM
(37) <LASTSTATE>
(38) <PRESET TITLE=>
(39) <NIM GLOBALID="1" X="RIGHT" Y="TOP"/>
(40) <NIM GLOBALID="2" X=RIGHT Y="280"/>
(41) </PRESET>
(42) <HOMENIM COLLAPSED="FALSE" HEIGHT="134" X="616" Y="109"
(43) </LASTSTATE>
(44) </ALL_CONFIG>

Example 2 describes a representative processed user profile in accordance with the present invention. In general, a processed user profile includes three major components: (i) a definition of each NIM associated with the user, (ii) a description of each pack associated with the user and, (iii) the last state of each home NIM associated with a user. In Example 2, the definition of each NIM associated with the user is found on lines 4 through 31. Specifically, lines 4 through 31 describe NIM definitions I through N. In Example 2 there is only one pack associated with the user. This pack, entitled "New DotPack," is found on lines 32 through 35 of Example 2. The final major component of the processed user profile found in Example 2 is the last state of the home NIM, which is defined on lines 37 through 43. This code stores the last state of the home NIM. Such last state information includes whether the home NIM was collapsed, and the position of the home NIM on the screen.

When the user wishes to log out of system 10, the processed user profile is transferred from client 20 to server 50. When web server 58 receives the processed user profile, it passes the processed user profile to user profile database manager 100. User profile database manager 100 stores the processed user profile as the unprocessed user profile 76 corresponding to the user. In some embodiments, such a storage operation involves a conversion process. For example, advertisements or specific system NIM definitions are stripped from the processed user profile in order to convert the processed user profile to the unprocessed user profile 76 that corresponds to the user. In some embodiments, the processed user profile is periodically transferred, in its entirety or incrementally, from client 20 to server 50 and saved in the manner described in the log out procedure above. Such timed periodic or event based backup procedures are possible because NIM definitions are efficiently described, thus the absolute size of a processed user profile remains relatively small. Accordingly, timed backups of a processed user profile to user profile database 76 are possible without extensive use of system 10 bandwidth or server 50 resources.

At this stage, a system (FIG. 1) and a login procedure (FIG. 2) in accordance with the present invention has been disclosed. Although the system and login procedure was discussed using an example where only one home NIM was associated with a user, it will be appreciated that, in some embodiments, any number of distinctly different home NIMs are associated with a user. Furthermore, a user can simultaneously execute multiple instances of a particular home NIM on client 20 or, indeed, any number of different home NIMs. In one embodiment, a developer or merchant provides a user with a highly customized home NIM that provides specialized functionality. In such embodiments, the user collects the home NIMs and, therefore, a processed user profile includes a description of more than one home NIM.

Figure 4:
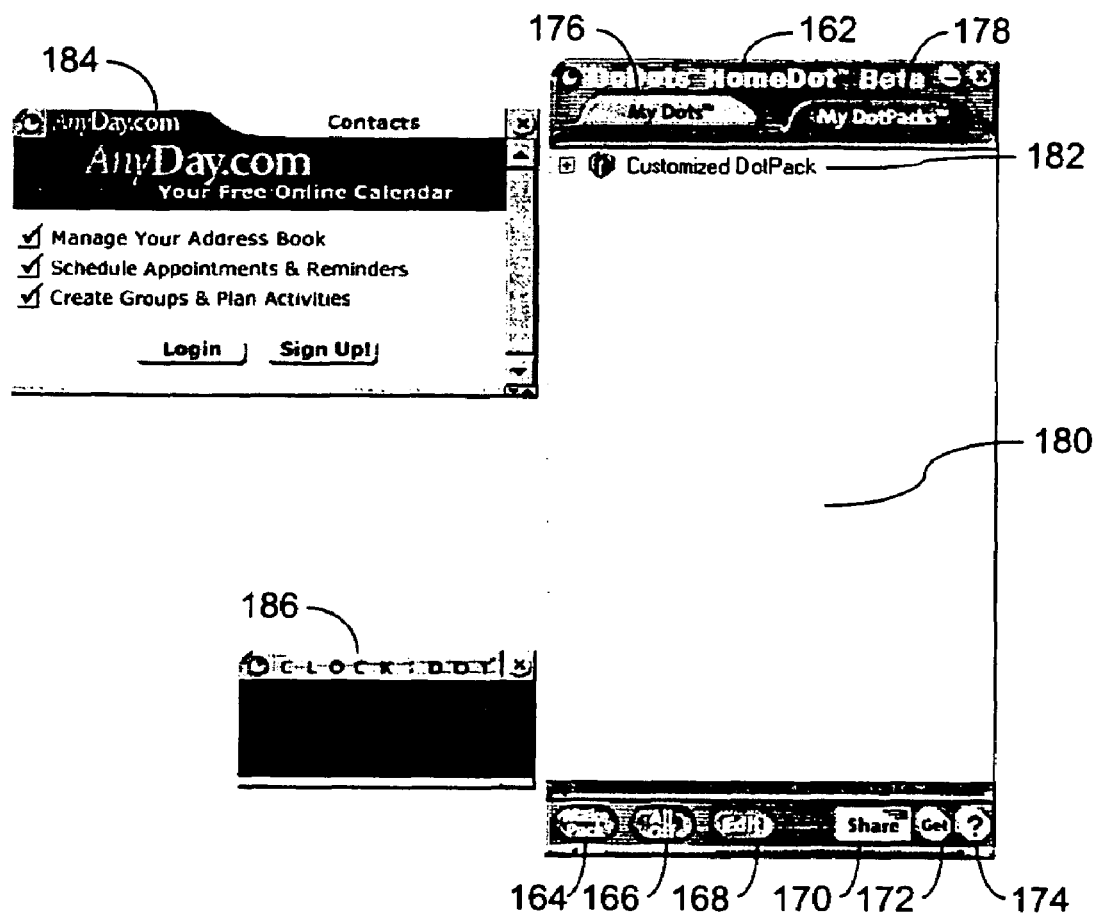
FIG. 4 illustrates a set of visual manifestations corresponding to a collection of NIMs, including a home NIM.

Attention now turns to some of the advantages and features of the present invention. In FIG. 4, a visual manifestation of the home NIM 162 is illustrated. One advantage of the home NIM, which is an advantage that is common to NIMs in general, is that the content of the NIM is not trapped in a third party viewer. In fact, the home NIM definition regulates the actual appearance of the home NIM. The home NIM definition is formed by general parameters and commands found in "session_config" as well as customized parameters and commands in the processed user profile. The division of the home NIM definition between a system level file and a user level file represents a balance in the tension between the need for a system I0 host to insure a consistent level of quality, through the proper implementation of general parameters and commands, and the desire of each user to create highly customized home NIMs. Lines 20 through 22 of Example I provide an example of general parameters that are defined in "session_config." Lines 23 through 25 define the source location of home NIM frame images. In home NIM 162 (FIG. 4), such home NIM frame images include the image used to represent buttons 164 through 174, and menu tabs 1 and I78. Furthermore, lines 20 through 22 of Example 1 define the location of other images that are used to construct default NIMs. An example of user initiated home NIM customization is found in lines 33 through 39 of Example 2, which define a "LASTSTATE" definition for the home NIM, including the dimensions of the visual manifestation corresponding to the home NIM on line 38 (HEIGHT="134" X="616" Y="109") and indicates that the home NM is not collapsed upon startup (COLLAPSED="FALSE").

The visual manifestation of home NIM 162 illustrates additional benefits and features of a home NIM in accordance with the present invention. When a user selects tab 176, a list of the NIMs that are present in the processed user profile associated with the user is displayed in viewer 180. As disclosed in more detail below, a user has the option to associate a collection of NIMs into an object termed a "pack". The pack references some subset of the NIMs associated with a user as well as associated state information. This arrangement includes, for example, whether a visual manifestation corresponding to each MM is displayed on output means 42 or not, the dimensions of each visual manifestation, and the position of each visual manifestation. The name of each pack is stored in the processed user profile. A user reviews packs associated with the user by selecting tab 178 (FIG. 4). In FIG. 4, the user only has one pack, "Customized DotPack" 182. When the user selects pack 182, each NIM in the pack is restored in accordance with the state information stored in the pack definition.

In total, FIG. 4 represents a typical visual experience provided by one embodiment of the present invention. In addition to home NIM 162, visual manifestations 184 and 186, corresponding to two additional NIMs in the processed user profile, are displayed. Visual manifestation 184 provides functionality that allows a user to manage an address book, schedule appointments, or create groups and plan activities. Visual manifestation 186 represents a NIM that provides time and date information.

Figure 5:
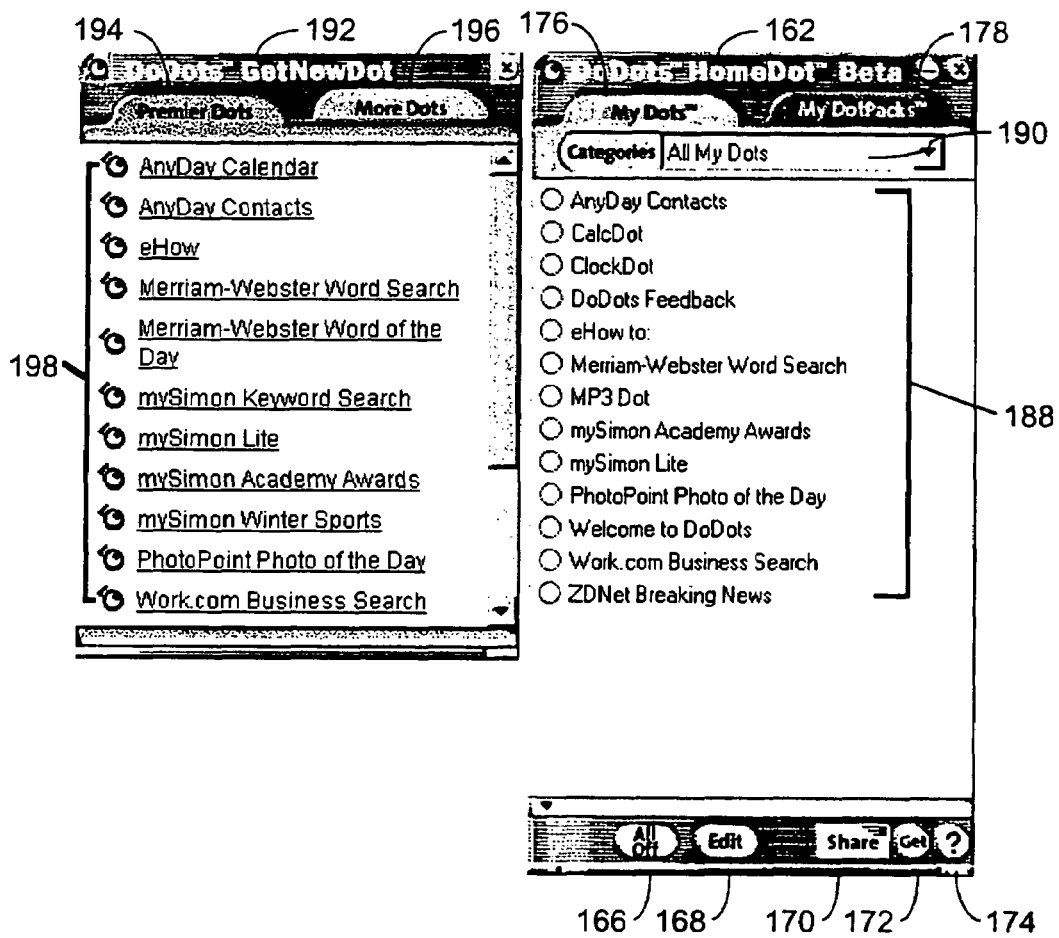
FIG. 5 illustrates a visual manifestation of a home NIM as well as a visual manifestation of a reference NIM that references additional NIMs.

FIG. 5 shows the visual manifestation of home NIM 162 of FIG. 4 with tab 176 selected. Accordingly, each of the NIMs in the processed user profile associated with the user is listed in list 188. The user can activate any of the listed NIMs by clicking on the NIM name. In addition to the NIMs in list 188, home NIM 162 includes core NIMs that are defined in "session_config." In the "session_config" of Example 1, cores are found on lines 28 and 29. Specifically, line 28 provides the address of an XML-based definition for the add template functionality associated with button 172 in FIGS. 4 and 5, and line 29 provides the address of an XML-based definition for the help template functionality associated with button 174 in FIGS. 4 and 5.

Importantly, the user can categorize NIMs using filter 190. Categories include such topics as sports, personal, weather, etc. Furthermore, the user can add NIMs to the processed user profile associated with the user as well as delete NIMs. There are a variety of mechanisms that enable a user to add a NIM to the processed user profile. One mechanism is to receive links to NIMs from other users of system 10 (FIG. 1), as disclosed below. Another mechanism is to toggle button 172 in order to activate a visual manifestation associated with NIM 192 (FIG. 5).

NIM 192 provides a system that enables users to add select NIMs to their user profile with a single click or keystroke sequence. NIM 192 includes tab 194 that allows the user to select premiere NIMs and a general tab 196 that allows the user to review a general catalog of NIMs that is present in NIM templates database 74 (FIG. 1). In one embodiment, when a user selects a NIM in list 198 (FIG. 5), the NIM is added to list 188 and is incorporated into the processed user profile associated with the user. In this way, the user can collect NIMs of interest to the user using a single mouse click. By illustration, consider the case in which a user selects the NIM "AnyDay Calender" in list 198. In response to this selection, a definition of the NIM "AnyDay Calender" is obtained from NIM templates database 74 and is copied directly into the processed user profile associated with the user. Furthermore, the title of the selected NIM, "AnyDay Calender" is added to list 188. Finally, a visual manifestation that corresponds to the NIM "AnyDay Calender" is displayed on output means 42 (FIG. 1). As a result, the display illustrated in FIG. 5 adopts the appearance illustrated in FIG. 6.

Figure 6:
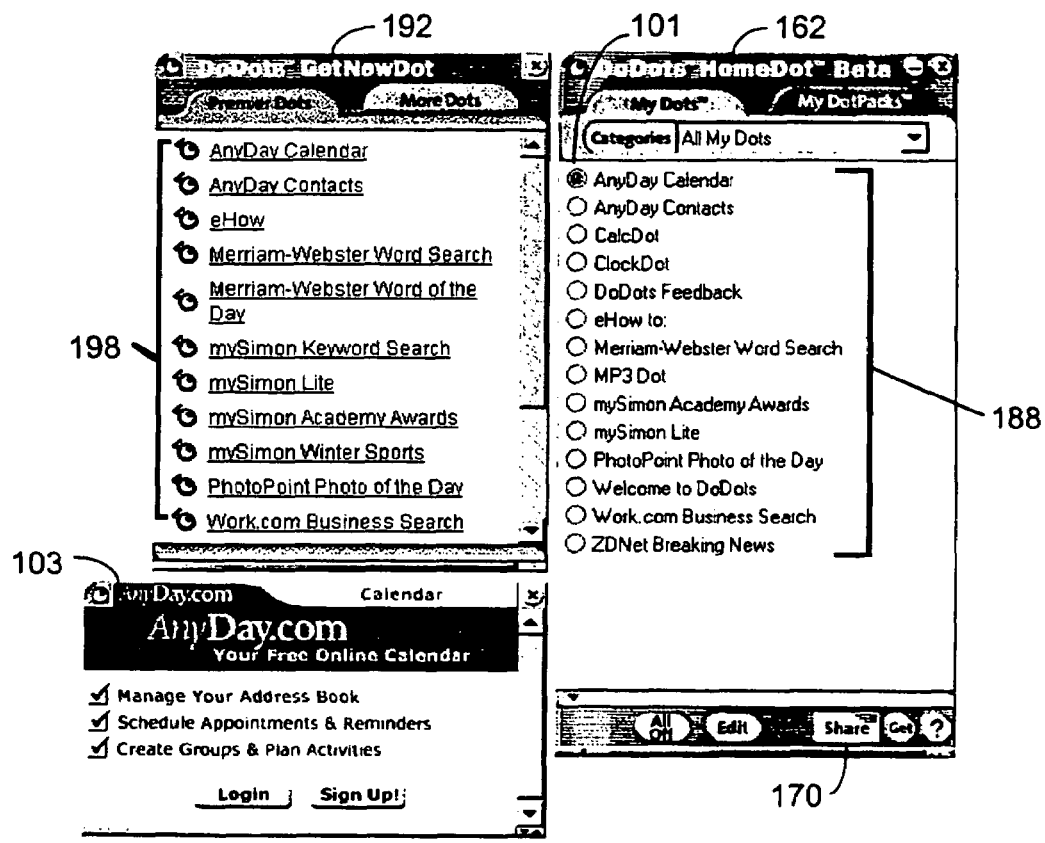
FIG. 6 illustrates how a NIM, referenced by the reference NIM of FIG. 5, is added to a processed user profile in response to a designated keyboard entry sequence or mouse click.

In FIG. 6, the NIM "AnyDay Calendar" appears at the top of list 188. Furthermore, a control 101 associated with the NIM "AnyDay Calendar" in list 188 is filled, indicating that the NIM is currently active. Additionally, as illustrated in FIG. 6, a visual manifestation 103 corresponding to NIM "AnyDay Calendar" appears on the output means. The user has the ability to toggle this NIM between an inactive and active state by selecting control 101.

In one embodiment, the user is provided with the option of (i) incorporating a NIM selected in list 198 into the processed user profile or (ii) transiently executing the NIM on client 20. Furthermore, when the user receives NIMs from other users, the user has the option to transiently operate the received NIMs on client 20. If the user decides to keep the transient NIMs at a later date, the user has the option to add the transient NIMs to the processed user profile at that time. Thus, in such embodiments, the user effectively has the option to "preview" NIMs before adding them to the processed user profile. This is advantageous because it reduces the chances of filling the user profile with undesirable NIMs. Such a feature is particularly advantageous in the case of novice or inexperienced users of system 10. Furthermore, one of skill in the art will appreciate that the concept of transient NIM execution raises the possibility of executing NIMs on a client 20 during a period of time in which the user is not logged into system 10. For example, consider a NIM that is executed on a client 20 after a user initiated response to a web page advertisement presented in web browser 36. Although the user is not logged into web server 58 and therefore does not have a processed user profile resident on client 20, the user can execute the NIM on client 20 on a transient basis. Furthermore, if the user wishes to add the transiently executed NIM to the user profile 76 associated with the user, the user can log into web server 58 and then add the NIM to the processed user profile that is delivered to client 20 as a function of the log in process.

Figure 7:
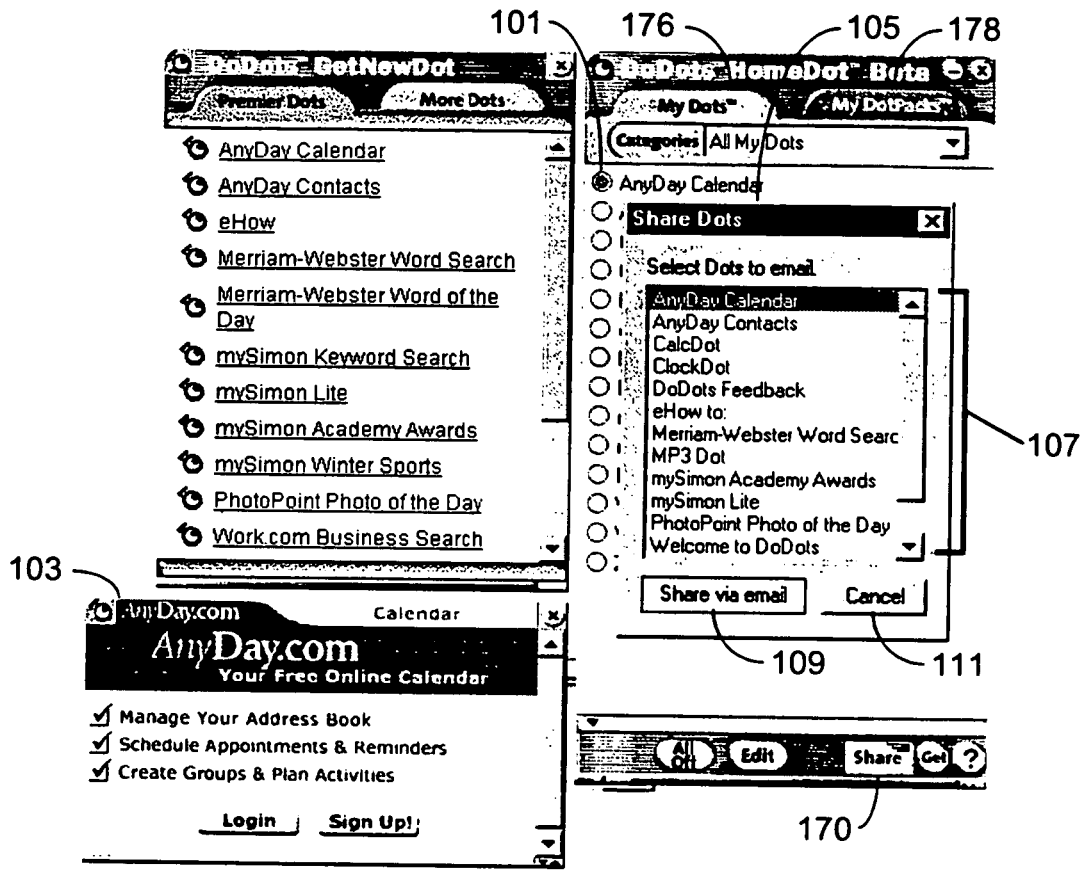
FIG. 7 illustrates how a NIM is shared with other users in accordance with an embodiment of the present invention.

Another important feature of the present invention is the ability for users to share NIMs with each other. For example, if a user wishes to share the NIM "AnyDay Calendar" that was added to list 188 in FIG. 6, the user clicks "share" button 170 (FIG. 6). In response, panel 105 is displayed (FIG. 7). Because "share" button 170 is pressed while tab 176 is active in the illustration provided by FIGS. 6 and 7, panel 105 lists each of the NIMs associated with the user. If, however, "share" button 170 is pressed while tab 178 is active rather than tab 176, panel 105 will list each of the packs associated with the user instead of each of the NIMs. Returning to the situation illustrated in FIG. 7, the user shares a NIM with other users by selecting the NIM to be shared from list 107 and then toggling button 109 "Share via email." In one embodiment, the user has the option to select multiple NIMs from list 107 using predefined keystroke operations. For example, in one embodiment, the user selects multiple NIMs by clicking on several of the NIMs in list 107 with a mouse button while depressing the "shift" button on the keyboard. When a user decides not to share a NIM and panel 105 is displayed, the user presses cancel button 111 and panel 105 is dismissed.

When a user toggles "share via email" button 109 at a time when one or more NIMs in list 107 have been selected, the definition of each selected NIM is copied from the processed user profile associated with the user into a container and the container is sent to server 50 (FIG. 1). In the embodiment shown in FIG. 1, the container is received by web server 58. Web server 58 includes instructions for routing the container to sharelink database 78 where the container is stored. When the container is stored, a unique identifier is assigned to the container. Although a large number of different mechanisms for generating a unique identifier are practiced in accordance with this aspect of the invention, in one embodiment, the unique identifier assigned to the container upon storage in sharelink database 78 can be subsequently processed to form a URL address that specifically references the container within the context of system 10. In one embodiment, after a unique identifier has been assigned to the container, an e-mail program is launched on client 20 and the user is requested to designate the recipients of the designated NIMs. Then, each recipient is provided with the unique identifier associated with the container in an e-mail message. When the recipient clicks on the unique identifier, a call is made for a copy of the associated container from sharelink database 78 and the container is delivered to the client 20 associated with the recipient.

As is readily apparent upon review of FIG. 7, the user has the option to size and position the visual manifestation that corresponds to each NIM. Furthermore, by toggling controls, such as toggle button 101 (FIG. 7), the visual manifestation of a NIM is toggled between an on state and an off state. Such functionality is highly advantageous. First, by using this functionality, the user has the option to create unique arrangements. Second, NIM developers have the ability to control the default position and size of NIMs as well, and can therefore produce an arrangement of NIMs to further specialized purposes. Finally, because the NIMs of the present invention are not trapped in third party applications that have a set of undesirable features such banner ads, the utility and overall appearance of an arrangement of NIMs is enhanced and adopts an independent value. Using the technology disclosed in the present invention, the user collects an assortment of NIMs and arranges them in a customized fashion. The user has the option to "capture" favored arrangements into constructs known as packs, which have been briefly discussed previously.

Figure 8A:
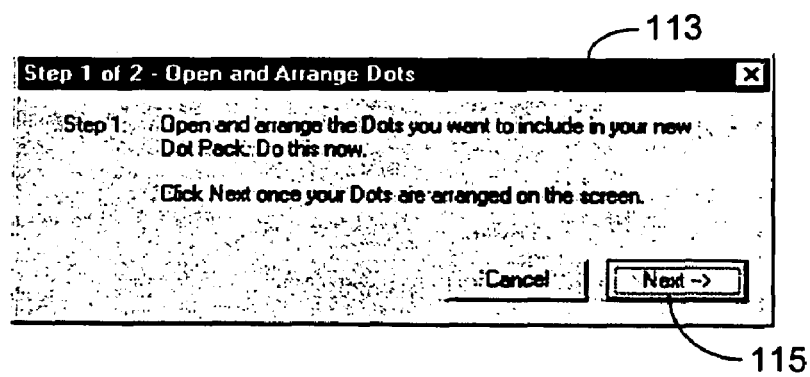
FIGS. 8A and 8B illustrate screen panels that facilitate the collection of the I5 description of a set of designated NIMs into a pack.
Figure 8B:
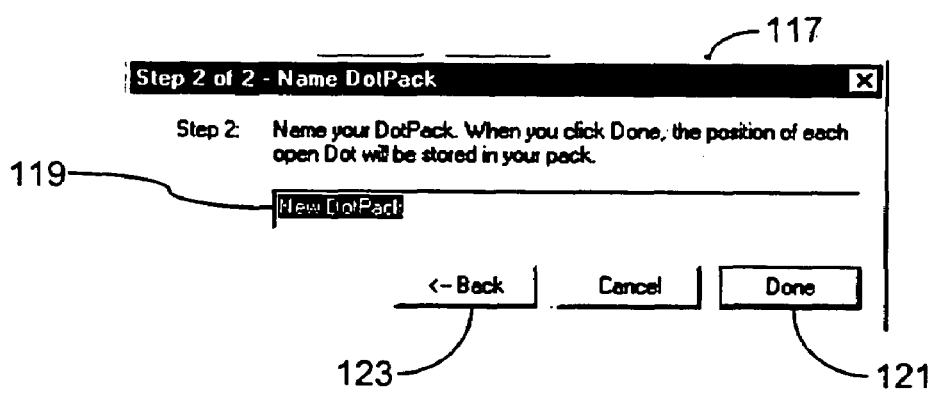
Figure 9A:
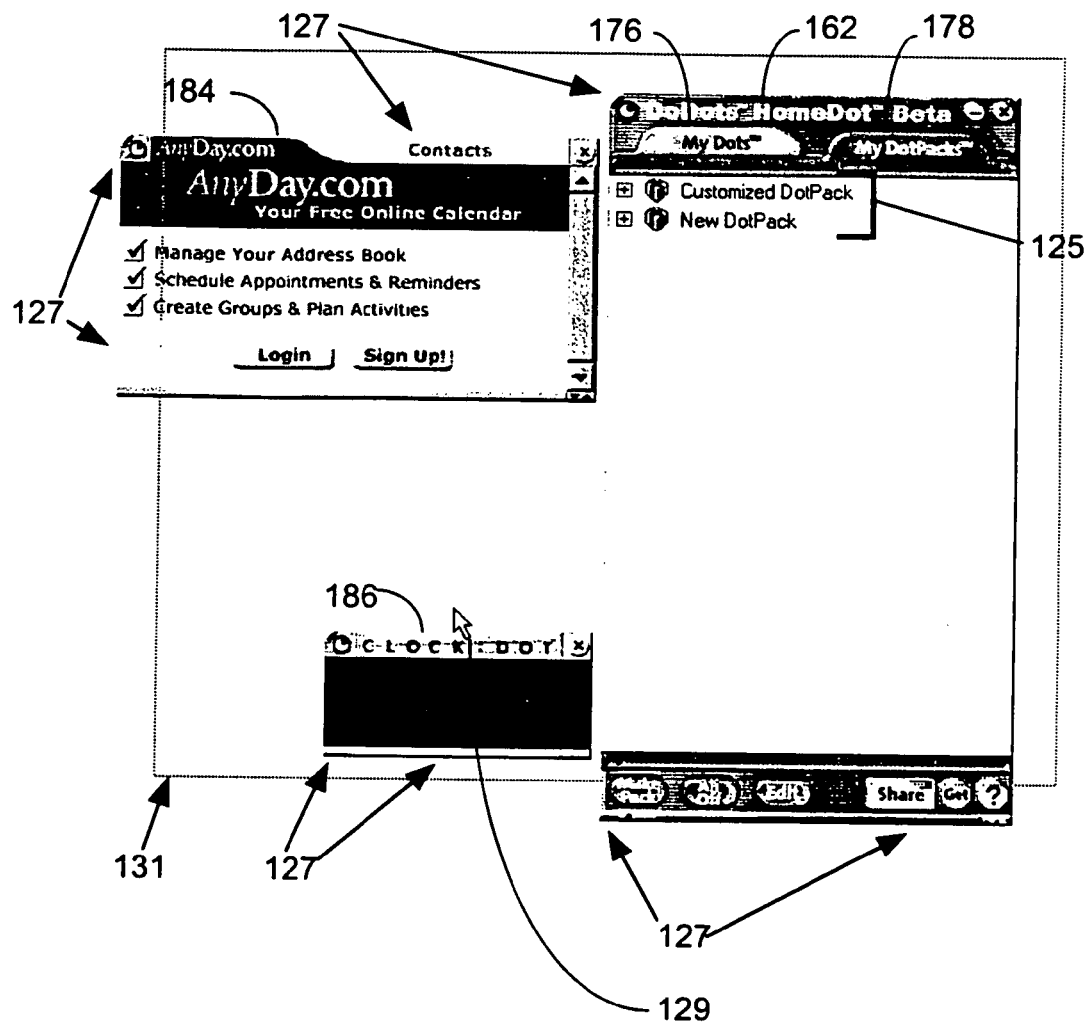
FIG. 9A illustrates how the relative position of visual manifestations that correspond to NIMs remains fixed when the visual manifestations are within a predetermined distance of each other.

FIGS. 8 and 9A illustrate the formation of a pack using the arrangement of NIMs illustrated in FIG. 4. The process begins when the user toggles button 164 "Make Pack" in FIG. 4. In the embodiment illustrated by FIGS. 8 and 9A, panel 113 (FIG. 8) is displayed when the user toggles button 164 (FIG. 4). Panel 113 advises the user to open and arrange each of the NIMs that are to be included in a pack. In the case of FIG. 4, for example, such an arrangement could include the arrangement of NIMs 184 and 186. The user indicates that specified NIMs are in a desired arrangement by selecting button 115 "Next" (FIG. 8). When button 115 is toggled, prompt 113 is terminated and prompt 117 is displayed to prompt the user for a name to associate with the designated pack. The user indicates that a name 119 has been provided for the pack by selecting "Done" button 121.

In the embodiment shown in FIG. 8, the user further has the option to return to panel 113 and rearrange the specified NIMs before committing to pack creation by selecting the "Back" button 123. In the situation illustrated in FIG. 8, the user has provided the name "New DotPack." FIG. 9A illustrates the state of the visual manifestation corresponding to home NIM 162 after the user has selected "Done" button 121 (FIG. 8). Specifically, the name "New DotPack" is added to pack list 125 and tab 178 is activated to display the user pack list rather than the user NIM list that is displayed when tab 176 is activated. Furthermore, in response to the user selection of "Done" button 121 in FIG. 8, a reference to each NIM specified by the user is collected into a pack, along with some state information, and the pack is stored in the processed user profile associated with the user. Representative state information for each NIM stored in a pack includes whether the NIM was collapsed and the position of the NIM. In some embodiments, the state information includes the dimensions of the last visual manifestation corresponding to the NIM to have been displayed on output means 42.

Figure 9B:
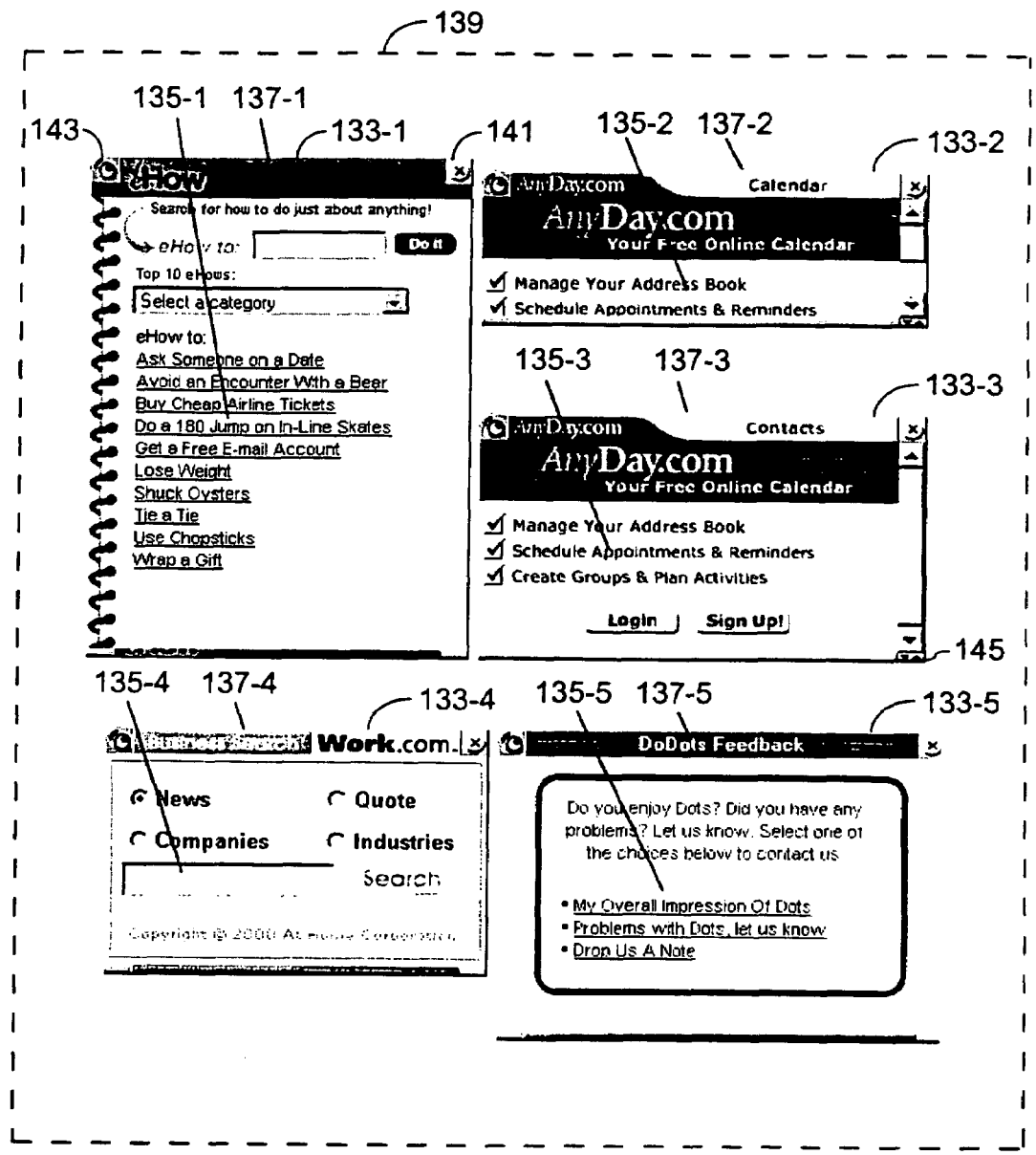
FIG. 9B illustrates a representative pack in accordance with the present 20 invention.

FIG. 9 illustrates pack 139, which is delineated with a dashed box. Pack 139 includes five NIMs 133. Each NIM 133 includes two primary components, a viewer 135 for viewing content and a frame 137 for providing user functionality. Each viewer 135 provides a platform for reviewing machine readable information, such as HTML, dHTML, images, imbedded ActiveX and Java applications, JavaScript, CSS, Streaming Media, and/or Flash. Furthermore, in some embodiments, viewer 135 provides functionality for processing digitally recorded sound. Observe then that each NIM of the invention utilizes machine readable information that is easily retrieved from a specified address. If the content provider of this information desires to change the machine readable information, changes can be made and then delivered the next time that the machine readable information is addressed. This stands in contrast to prior art techniques in which updates to executable code can be relatively difficult to distribute.

Each frame 137 provides functions and controls for manipulating the visual manifestation of the NIM 133 corresponding to the frame. For example, some frames 137 include a dismiss button 141. When the user clicks on dismiss button 141, the corresponding NIM 133 is dismissed. Additionally, some frames 137 include a menu button 143. When the user clicks on button 143, a menu appears. In one embodiment, the menu is a pull down menu and the menu items are defined in the corresponding NIM definition. In an abstract example, the NIM definition provides a menu definition of the format:

Menu 143-(I)-"Get more NIMs" URL where (I) refers to the $N^{th}$ element of the menu that is activated when menu button 143 is pressed, "Get more NIMs" is the menu element name, and URL is the event or web address that is called when the user selects the $N^{th}$ element of the menu associated with button 143.

The developer has full control over all aspects of the appearance and functionality of NIM frame 137. Thus, a NIM developer has the ability to control, for example, the functionality located at any corner of frame 137, functionality placed along the top or bottom of the frame, or on the sides of the frame. As an illustration, frame 137-3 includes a control button 145 that allows the user to resize the visual manifestation of NIM 133-3. One of skill in the art will appreciate that the bottom row of NIM frame 137 could have any number of buttons, including a forward control, a backward control, and similar controls, each of which provides the user with distinct functionality.

An advantage of the present invention is that it is possible to embed commands that affect frames 137 in the content of the computer readable media delivered to frame viewer 135. The use of embedded commands provides NIM developers with powerful tools and additional flexibility. For example, a developer can use embedded commands, such as the menu command above, to design a NIM that has a context sensitive help menu. Each time a particular event occurs, the developer changes the content of the help menu using embedded commands. For example, when a sound file is delivered to a NIM, the sound file may be attached to a set of embedded commands that provide sound manipulation functionality in the form of a pull down menu. Elements of such a pull down menu include a command for saving the sound file to disk, commands for fast forward, stop, and play, and commands for sound enhancement. After the sound file has been played, embedded commands are used in this example by the developer to reset the menu associated with button 143 to some default state. One of skill in the art will appreciate the benefits and advantages of a frame 137 that is capable of being modified based on commands embedded in the machine readable media delivered to the corresponding viewer 135. The developer can use presentation tools, such as adding transient help buttons, resizing the visual manifestation of the NIM, changing the frame border color, changing the title of the frame, and changing the frame border patterns, to create a more effective application.

One of the advantages of the disclosed pack system is that it provides a convenient mechanism for rapidly assembling NIMs that track diverse sources of information. Furthermore, when a useful set of NIMs is collected into a pack, the user can share the pack with other users using the same procedure previously identified for sharing one or more NIMs. It will be appreciated that in some embodiments, NIMs are commercial applications and that appropriate use of packs provides an additional dimension for application development. Therefore, in some embodiments, pack recipients are subscribers to a service provided by a pack developer. In other embodiments, pack recipients are purchasers or licensees of packs. In still other embodiments, pack recipients receive packs developed by friends, family members, or business associates.

The technology of the present invention further provides a set of NIM management tools to help a user manage displayed NIMs. In some embodiments of the present invention, these management tools are provided by visual management module 114 (FIG. 1). Two such NIM management tools are, in fact, properties that are associated with NIMs, namely magnetism and snapping. The property of magnetism is exhibited when a visual manifestation corresponding to a first NIM is dragged or moved near a visual manifestation corresponding to a second NIM. When this occurs, the two NIMs exhibit a magnetism that causes the first NIM to accelerate toward the second NIM. However, when the visual manifestations are within a predetermined distance of each other, the NIMs snap together. In one embodiment, the predetermined distance that triggers the two visual manifestations to snap together is a gap of about five pixels. While the above discussion describes the principles of snapping and magnetism based on a pair of NIMs, there is in fact no limitation on the number of NIMs that can be snapped together and furthermore, the principle of magnetism is not dependent on whether a NIM is in fact snapped to another NIM or not.

An additional management tool, illustrated in FIG. 9A, provides a mechanism for selecting multiple NIMs and for moving the NIMs in a coordinated fashion. In FIG. 9A, visual manifestations 162, 184 and 186 corresponding to respective NIMs are locked together. In response, halo 127 is drawn around the selected locked visual manifestations to graphically notify the user which NIMs are locked together. As mentioned previously, the user has the option to position NIMs as a coordinated group. For example, in one embodiment, when halo 127 is displayed and the user moves mouse arrow 129 after selecting one of the visual manifestations corresponding to a locked NIM, a target manifestation 131 is displayed to indicate to the user the position that the selected NIMs will be relocated to if the user clicks a mouse key. In some embodiments, target manifestation is a shadow image of the NIMs within halo 127 rather than the box depicted in FIG. 9.

The present technology further provides additional methods for controlling visual manifestations of NIMs. For example, in one embodiment, the user has the option to select multiple NIMs by pressing a predefined key such as the keyboard "Ctrl" key, before selecting a specified NIM. While continuing to depress the control key, the user has the option to select additional NIMs and add the corresponding NIMs to a group. The user then has the option to move each of the NIMs in a single coordinated fashion as a group. Furthermore, by entering a designated keyboard or mouse sequence, the user has the option to move a single NIM even in situations where the NIM is in a group. In one embodiment in accordance with this aspect of the invention, the user clicks the visual manifestation corresponding to a locked NIM that the user wishes to move in an independent manner and the user does not click the visual manifestation when the user wishes to move the NIM in a manner that is coordinated with the other NIMs. Additional features of the present invention include the option to select rows or columns of NIMs using specialized control sequences. For example, in one embodiment of the present invention, the user selects a column of NIMs by clicking on a NIM while holding down the alphanumeric character "c" on the keyboard.

Figure 10A:
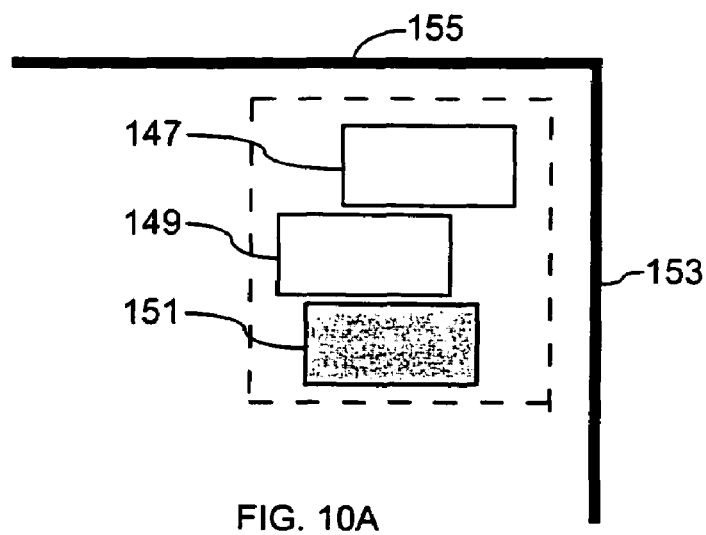
FIGS. 10A, 10B and 10C illustrate how a set of visual manifestations corresponding to a collection of NIMs is aligned against a boundary when a user selects the visual manifestations and pushes them against the boundary.
Figure 10B:
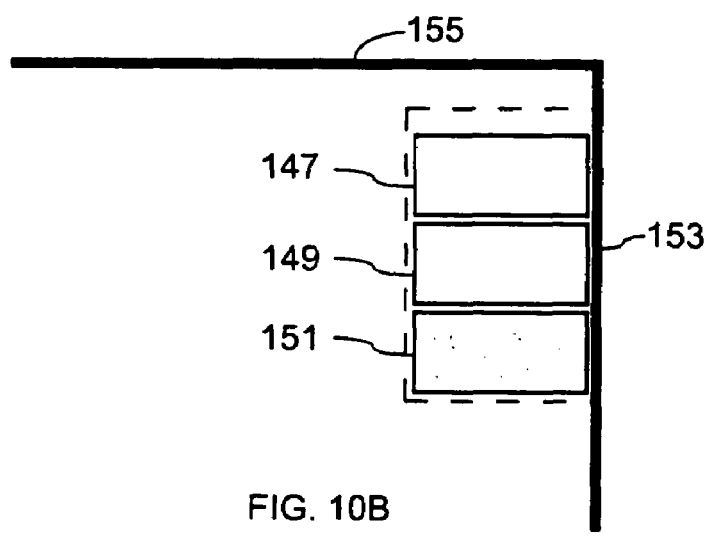
Figure 10C:
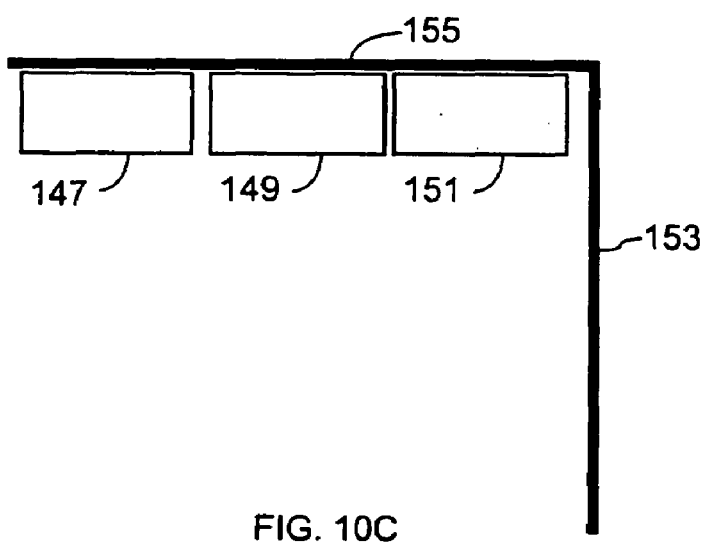

It will be appreciated that one advantage of the present invention is that it is possible to display multiple NIMs and that each NIM provides a specialized visual experience. Therefore, NIM alignment tools are advantageous because they allow users to quickly make room on output means 42 for additional NIMs and/or to produce highly styled NIM arrangements. Accordingly, the present technology provides a specialized feature to rapidly align NIMs. This technology is illustrated in FIG. 10. The technology works in conjunction with the tools for selecting multiple NIMs. In FIG. 10A, the user selects the visual manifestations 147, 149 and 151 corresponding to respective NIMs using, for example, the column select feature disclosed above. Then, the user pushes the selected NIMs against boundary 153. In one embodiment, boundary 153 is the horizontal or vertical edge of output means 42. In another embodiment, all visual manifestations corresponding to NIMs are displayed in a single viewport such as a window. In such embodiments, the horizontal and vertical edges of the window each represent a boundary. FIG. 10B illustrates how visual manifestations 147, 149, and 151 are automatically aligned when they are pushed against a boundary, such as boundary 153. In some embodiments, the relative alignment between the visual manifestations is preserved even after the manifestations are moved in subsequent action by the user. The present technology further allows for the rearrangement of NIMs along a particular axis. For example, if NIMs are substantially oriented along a vertical axis as shown in FIG. 10B and the user wishes to realign the NIMs on the horizontal axis, all the user has to do is push the collection of NIMs against a horizontal border. For example, when the user pushes visual manifestations 147, 149 and 151 against border 155, the visual manifestations realign to conform to border 155 thus resulting in the view depicted in FIG. 10C.

The features of the home NIM of the invention have been fully described. Attention presently turns to the architecture and operation of individual NIMs utilized in accordance with the invention.

In one embodiment of the invention, after a user has logged into the system, as discussed above in connection with FIGS. 1 to 10, the user interface 40 displays the home NIM 162 as shown in FIG. 5. The home NIM typically includes a list of NIMs 188, referred to in FIG. 5 as "MyDots." These are NIMs which have been "collected" by the user. The list of collected NIMs, along with their associated definitions, is stored on the server in the user profile database 76, and downloaded from the application server 50 in response to a request from the client parser application 38. The local copy of the processed user profile is then further processed when the user collects or uses NIMs.

Collected NIMs may be opened or closed by clicking on the control button next to the NIM's name or on the NIM's name itself, in list 188, and all NIMs may be closed by clicking on the "all off button 166. The user may place NIMs into categories in a list of categories 190, which can be edited by clicking on the -Edit" button 168. New NIMs may be added to the user's collection of NIMs by clicking on the "Get" button 172.

Figure 11:
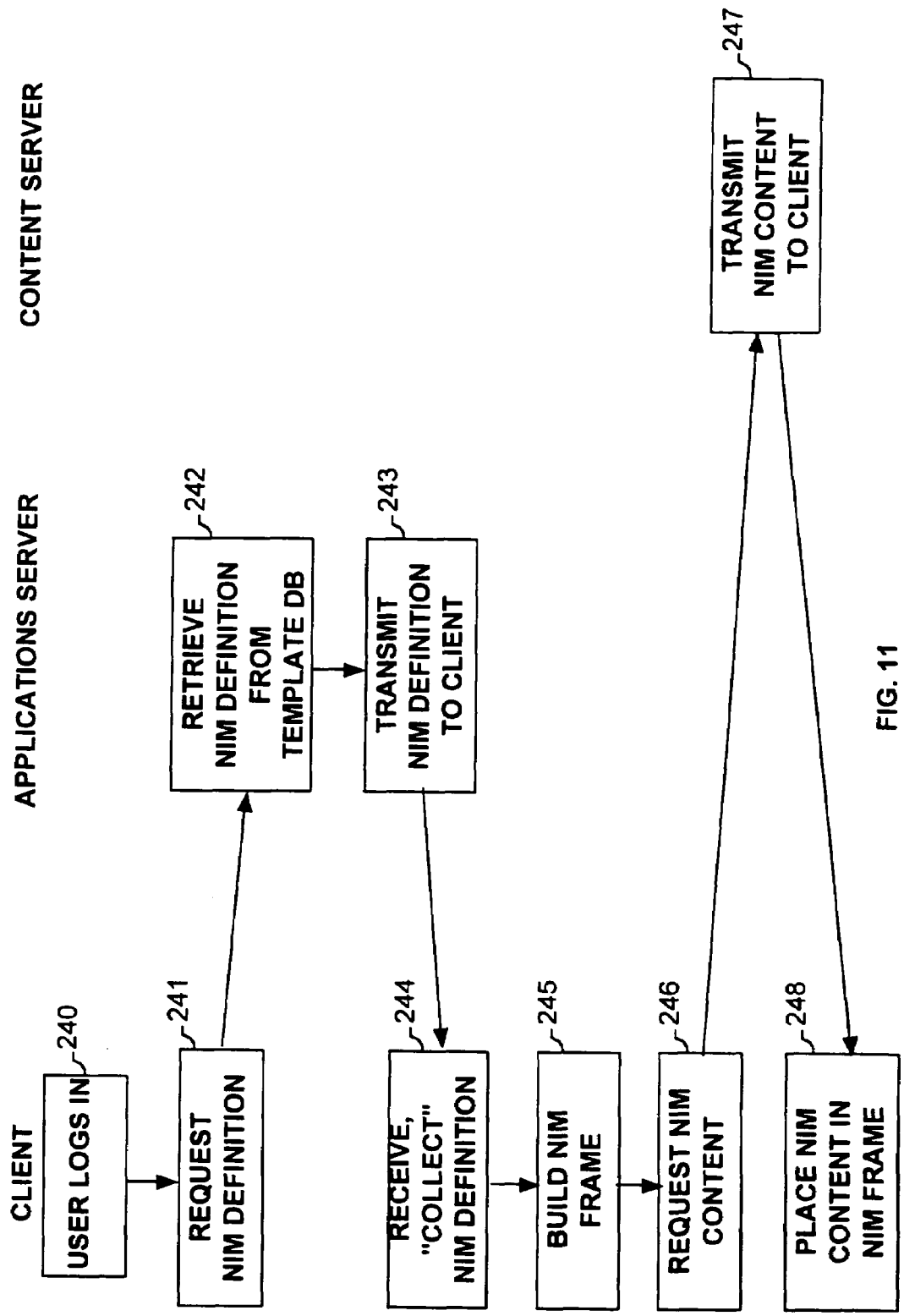
FIG. 11 is a flow chart of the steps taken by a client to give a user access to a NIM where the user "collects" the NIM, in accordance with one embodiment of the invention.

FIG. 5 also shows a NIM 192 with a list of NIMs 198, which may be previewed and/or collected by the client 20. The user may preview or collect a NIM by clicking on the associated name of the NIM, e.g., "eHOW". The steps taken to provide the NIM to a user are shown in FIG. 11. After logging in (step 240) the user clicks on the name of a NIM, and the client parser application 38 sends a request including the NIM_ID of the NIM definition, to the applications server 50 via the transmission channel 44 (step 241). Alternatively, the user may click on a NIM link before logging in, for example if the link has been e-mailed to the user, and then, after clicking on the link, log in. In another aspect, the user could view, but not collect, a transient NIM without ever logging in.

After the user is logged in and has clicked on the NIM, the applications server 50 retrieves the NIM definition from the NIM template database 74 using the NIM ID, in step 242, and provides it to the client 20 in step 243. The client 20 receives the NIM definition from the applications server 50 in step 244, and the client parser application 38 creates a frame in the display of the user interface 42 in step 245. In step 246, the client 20 requests the necessary content elements 94 stored at the URLs identified in the NIM definition from the corresponding content server 82. The content server 82 transmits the content 94 in step 247, and in step 248 the client parser application 38 places the content in the viewer, which is enclosed by the frame, allowing the user to preview the NIM. Alternatively, the client parser application 38 may simply collect the NIM, adding it to the user's processed user profile.

The user may then view the NIM on the user interface display 42, and may interact with the NIM much in the same way as a user may interact with Internet content or web applications. This may change the NIM from its present, "raw" state to a used state reflecting alteration or use of the NIM by the user. For example, the user may direct the NIM to different content within the NIM if the NIM content enables the user to do so. Or, the user may provide information to the content server 82 which allows the NIM to be personalized. The user may additionally be given the option of changing the size of the frame.

If the user collects the NIM, the NIM will be added to the user's list of collected NIMs such as the list 188 shown in FIG. 5. Additionally, the client parser application will add the NIM's definition to the processed user profile, and, on logout, send the processed user profile to the application server 50. Thus, the NIM's "state" will be preserved. Alternatively, the client parser application may collect the NIM automatically, without waiting for a user command, by adding the NIM definition directly to the processed user profile.

If the NIM's state has been altered by the user or by the content—if for example, the user has directed the NIM to Internet content other than the initially-displayed content, provided personalizing information, or changed the properties of the frame, or if the content itself has caused an alteration in the NIM—this alteration will be reflected in the NIM definition stored in the user profile database 76. Information which personalizes the resulting content, instead of being stored in a "cookie" on the client's hard drive, can be stored as part of the NIM definition. This advantageously permits personalization of content, such as web content that is associated with the NIM content and the user, without storing a cookie on the client 20.

Figure 12:
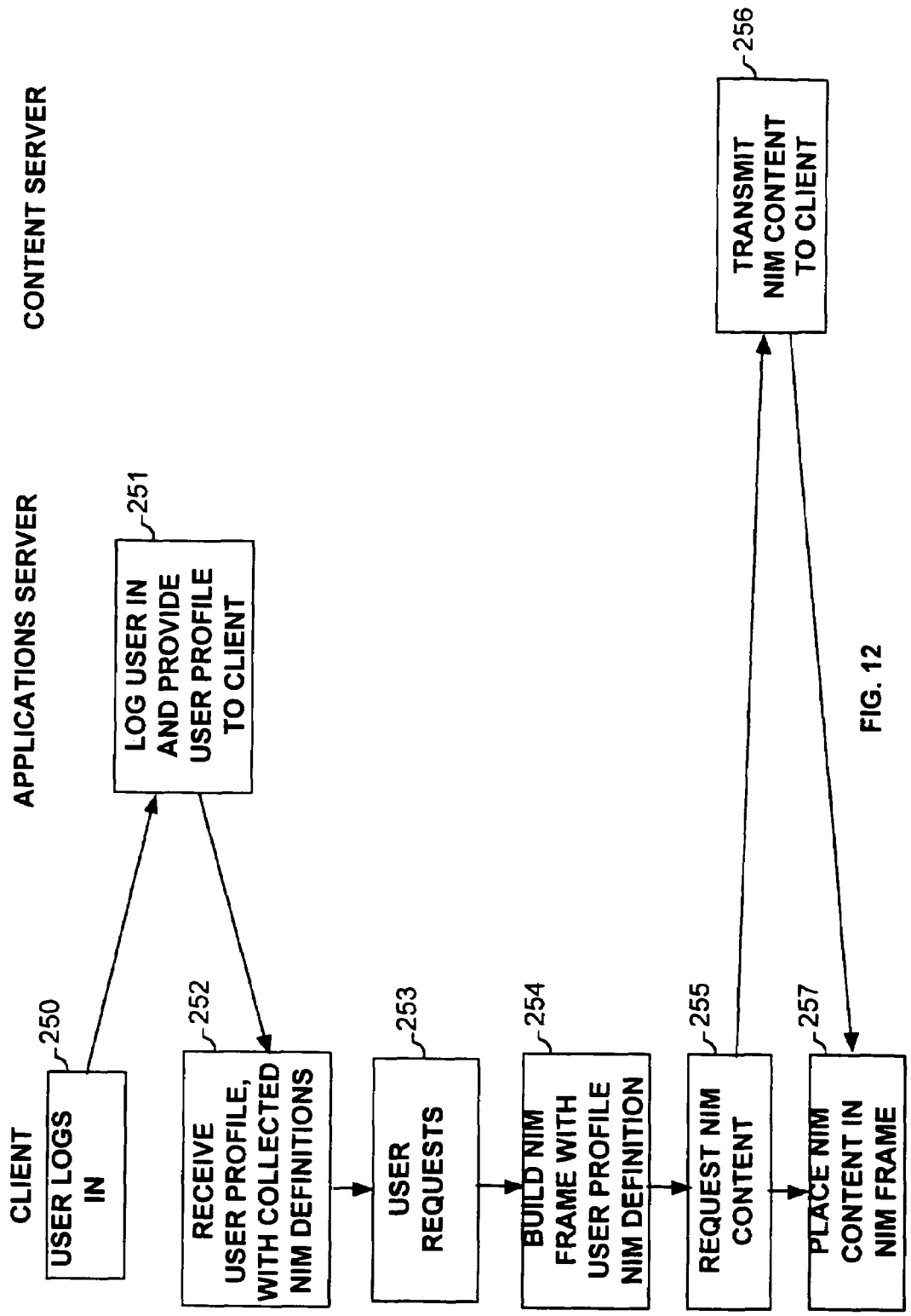
FIG. 12 is a flow chart of the steps taken by a client to present a NIM to a user, where the NIM has been "collected" previously by the user, in accordance with one embodiment of the invention.

A user may also access a NIM which has been previously collected, and possibly altered by use as explained above. As previously described, the user profile 76 includes NIM definitions for NIMs which have been viewed and collected by each user. A screen shot showing NIMs 188, which have been previously collected by a user is shown in FIG. 5. The steps taken to provide the user with NIMs which have been previously collected are shown in FIG. 12.

As discussed above, on login (step 250) the user's profile is retrieved by the client parser application 38 in the client 20 (step 251 and 252). The user's profile, stored in the user profile database 76, includes the NIM definition for each of the NIMs previously collected, and possibly altered, by each user. The NIM definitions, as discussed above, includes the NIM frame definition and the definition of the controls for filling the viewer within the frame with content. After log in, a local copy of the processed user profile is stored on the client 20, and this copy is further processed as the user collects new NIMs, or uses new or collected NIMs such that the NIMs are altered.

When the user clicks on the name of a collected NIM (step 253) the client parser application 38 creates a frame in the display 42 of the user interface 40 in step 254. At step 255, the client 20 requests the necessary content elements 94 stored at the URLs identified in the NIM definition from the corresponding content servers 82, which provide the content 94 in step 256. It will be appreciated that these URLs need not be the same as the initialization URLs in the "raw" NIM definition stored in the NIM template database 74 on applications server 50, and in fact the content servers need not be the same content servers corresponding to the initialization URLs. In step 257, the NIM parser application 38 places the content in the NIM frame, and the NIM is then fully opened.

FIG. 13 illustrates a data structure for a NIM definition. As discussed above, a NIM is defined as a frame that contains a collection of controls, or functional units, such as a web rendering control or a GIF rendering control. The NIM frame surrounds a viewer, which displays the addressed content. The MM has a defined layout or arrangement of the controls, and defined initialization input data, e.g. data and URLS, for each control or element, in the NIM. NIM definitions are available to the client parser application via NIM links. The NIM links "point" to NIM definitions, which include all the information needed to build a NIM frame and fill the NIM with NIM content. Thus, NIMs links are easily collected, associated into packs, and shared by users.

In one embodiment, the NIM definitions are defined using Extensible Markup Language (XML), so that the NIM as a whole—the frame and the content within the viewer—is advantageously as flexible as standard web content. NIMs are extremely flexible, because the definition of the NIM is content, rather than compiled code. The NIM definition defines the structure of the NIM, and everything that is visible in a NIM is based on standard Internet content, such as HTML, dHTML, or GIFs, and is referenced or pointed to by the NIM definition. An "application"—type NIM, such as a web calendar or web mail, may be changed by the user, by the content provider, or by other content, while advantageously avoiding the need to distribute and support a hard-coded compiled application. The definition of a NIM thus includes everything that is needed for the NIM to be rendered and filled with Internet content.

As shown in the exemplary embodiment of FIG. 13, the definition of a NIM includes tags that identify the NIM 270, define and configure the NIM frame 271, specify and layout the controls 273 in the NIM viewer, and specify parameters to initialize all the NIM's components with content or data.

In one embodiment, a NIM is identified by three ID strings 270: GlobalID, Domain and Kind. A GlobaliD is used when the MM definition is within a share. It is unique with respect to other NIM tags in the share. A NIM's domain is a unique label for the owning company or developer of the NIM, such as "dodots.com." Finally, a NIM's kind, which is specified by the NIM's developer, is a helpful identifier for finding the NIM, but need not be unique. Examples of possible NIM kinds include "mp3", "scriblets," and "calculator." As discussed above, a NIM definition will typically be written in a format which facilitates sharing of data over the Internet, such as XML. An XML specification for the NIM identification strings, for one embodiment of the invention follows. The bold text identifies NIM definition data, while the remaining text describes the data.

GLOBALID="string"

Used only within <SHARE> tags. This GLOBALID must be unique with respect to other <NIM> tags in this <SHARE>.

DOMAIN="string"

Unique label for the owning company of this NIM. In theory, NIMs may be limited to communicating with NIMs only from their own domain.

KIND="string"

Helpful identifier for finding such a NIM from another NIM. Does not have to be unique.

The NIM definition also includes the definition of a frame 271, which specifies the frame size and shape, and optionally the frame orientation and/or location on the user's screen. The space within the frame is the control space or viewer; visible controls are distributed within the control space or viewer.

The NIM definition may optionally include controls for: a titlebar; a NIM menu with flexible menu entries; an exit button; and a bottombar. A typical layout for these components is: titlebar at the top of the control space, with menu on the left and exit button on the right, and the bottombar at the bottom.

The titlebar component gives the user a place to grab and drag the NIM in a windowed environment. In one embodiment, it is implemented as a GIF rendering control that can be targeted to a local or remote titlebar image. The titlebar will preferably have a fixed height and width that is a function of the NIM's width. The titlebar is preferably capable of being located at any position on the periphery of the NIM. Overlay text can also be specified to layer on top of the titlebar image. The bottombar may be implemented in a similar fashion, but typically will not include text overlay. The titlebar and bottombar may be filled in with initialization data from a fixed data file, or alternatively with Internet content from, example, an initialization URL.

In one embodiment, a menu definition 271 is also included in the NIM definition. The menu includes items and actions of the NIM provider's choosing. For example, menu items may include the title "browse" associated with the action of targeting a full-screen browser or another NIM, and retrieving content for that browser or NIM from a specified address such as a URL. Logging off, or directing the NIM to another address or URL, are also possible menu action items. Menu action items that require communication of messages between the NIM and another NIM may also be provided—for example, opening another NIM, or changing the content of another NIM that is already open. Communication of messages between different parts of the system is discussed below.

An XML specification for a frame, titlebar, bottombar and menu, for one embodiment of the invention follows:

<FRAME>
<TITLE>
TEXT="string
JUSTIFY=-"LEFT"|"CENTER"|"RIGHT"
COLOR="#XXXXXX"
PIXELWIDTH="integer"
Width in pixel units. Overrides WIDTH attribute.

PIXELHEIGHT="integer"
Height in pixel units. Overrides HEIGHT attribute.
WIDTH="integer"
Width in NIM units. Default value is 1.
HEIGHT="integer"
Height in NIM units. Default value is 1.
X="integer"|"LEFT"|"CENTER"|"RIGHT"
Initial X position in screen coordinates. Default is center.
Y="integer"|"TOP"|"CENTER"|"BOTTOM"
Initial Y position in screen coordinates. Default is center.
FIXWIDTH="TRUE"|"FALSE"
Default is false.
FIXHEIGHT="TRUE"|"FALSE"
Default is false.
BACKGROUND COLOR="#XXXXXX"
Default is white.
<TITLEBARIMAGE>
JUSTIFY="LEFT"|"CENTER"|"RIGHT"
TILELEFT="integer"
TILERIGHT="integer"
NORMAL="URL"
DOWN="URL"
HOVER="URL"
INACTIVE="URL"
<BOTTOMBARIMAGE>
JUSTIFY="LEFT"|"CENTER"|"RIGHT"
TILELEFT="integer"
TILERIGHT="integer"
NORMAL="URL"
DOWN="URL"
HOVER="URL"
INACTIVE="URL"
<MENU>
Contains zero or more <ITEM> tags.
<ITEM>
TITLE="string"
TOOLTIP="string"
ICON="URL"
ID="string"
Must be unique.
<ACTION>
RECIPIENT="address"
MESSAGE="string"

As shown in FIG. 13, the MM definition also includes layout and definition of the controls 273. A control may be visible and render some sort of visual or text display, either static or dynamic. A control may be hidden, for example a functional element that is not necessarily visual such as a Java control. The control definition 273 includes identification of the types of controls, the layout of the controls, and initialization information. In one embodiment, NIM controls are specified and identified by class, kind and ID. Class defines the type of NIM control and is not unique. Kind is a useful identifier selected by the developer, and again is not unique. The NIM ID is unique within a user's processed profile.

Different classes of controls may be used. For example, a control may be a web rendering object, which can render web content such as HTML, dHTML, images, imbedded ActiveX and Java applications, JavaScript, CSS, Streaming Media, and/or Flash. Alternatively, a control may be any object capable of rendering any kind of computer readable media, such as a GIF rendering object or an custom-designed object to display a particular kind of information. Alternatively, a control may be an object capable of processing any kind of application logic, such as a Java module.

For example, an on-line brokerage firm could implement a custom stock-chart-rendering control, and define a NIM to use this control.

As discussed above, the control space is located within the frame, and one or more controls can be flexibly positioned within the control space, and these controls may include a titlebar and a bottombar, as well as other controls. The location of controls is specified by the layout in the definition of the controls 273 within the NIM definition. In one embodiment, the controls are laid out or positioned within the NIM frame according to a flexible grid. In this embodiment, the NIM definition allows the control space to be subdivided into equal vertical and horizontal units, and then for the controls to be positioned and sized within the control space.

A control definition will typically include initialization data. For example, where a control is a web rendering object, the definition will include initial URLs. When the NIM is opened, the control will navigate to the initial URLs to obtain content and render the NIM. If the control is a GIF, the control could retrieve the GIF file from a content server or from the application server. A NIM definition may optionally include additional tags identifying initialization parameters for different platforms: for example, a URL is suitable for a PC, but a "P-URL" may be provided as well, pointing to content suitable for users viewing NIMs through a personal digital assistant (PDA) or similar device.

Controls are typically installed on the applications server, and may be updated after installation by the applications server. The home NIM code, downloaded when the client becomes "NIM-enabled," includes the then-existing controls. Controls are updated as new controls are installed on the server or when a user requests a NIM that requires a new control. The server may then may download such updates to the client parser application, for example on log-in. The NIM framework allows any control to be positioned and initialized in a control space in a NIM, as discussed above.

An XML specification for control definition and layout, in accordance with one embodiment of the invention, follows:
<CONTROL_LAYOUT>
Contains zero or more <CONTROL> tags.
WIDTH="integer"
Divides control space into this many evenly spaced columns. Default is 1.
HEIGHT="integer"
Divides control space into this many evenly spaced rows. Default is 1.
WIDTHSCALES="TRUE"|"FALSE"
Default is true.
HEIGHTSCALES="TRUE"|"FALSE"
Divides control space into this many evenly spaced columns. Default is 1.
<CONTROL>
CLASS="string"
Class may be "Browser," "GIF reader," or other object for rendering computer readable media.
KIND="string"
ID="string"
Must be unique with other controls in this NIM.
LEFT="integer"
X position of the control in container unites. Default is 0.
TOP="integer"
Y position of the control in container units. Default is 0.
WIDTH="integer"
Width in container units. Default is 1.
HEIGHT="integer"
Height in container units. Default is 1.
URL="URL"

This is read if and only if this control is of class "Browser". This is the URL to which this control navigates. Otherwise, may include address for other control content, e.g. GIF address in applications server.
<CATEGORIES>
Contains zero or more <CATEGORY> tags.
<CATEGORY>
Adds the NIM to this category. This is the only way categories are specified; i.e. there is no master category list.
NAME="string"
This is the name of the category.

A NIM definition may also optionally include home NIM categories 274. A home NIM category used by home NIM 204 is a convenient way for a user to keep track of collected NIMS. When a user adds a NIM to a category 204, the category is added, as a string element, to the categories element 274 of the NIM definition in the user profile. For example, a user may categorize a particular NIM as "entertainment," or "news," or "reference." This category will then be added to the categories element 274 of the MM definition.

A NIM definition may also optionally include an events element 275, which defines actions to certain NIM events. For example, the OnClose event, when a NIM is closed, may be assigned a specific and targeted action, similar to a menu item. An XML specification for the event element in a NIM definition, in accordance with one embodiment of the invention, follows:
<EVENTS>
<ONCLOSE>
Executes this action list on close.
<ACTION_LIST>
Contains zero or more <ACTION> tags.
<ACTION>
RECIPIENT="address"
MESSAGE="string"

A sample NIM definition, in an XML file format in accordance with the above specification, follows:
<NIM DOMAIN="calculator" KIND="basic">
<FRAME CLAS S="Standard" BACKGROUNDCOLOR="#FFFF00"
WIDTH="6" HEIGHT="4" FIXWIDTH="TRUE" FIXHEIGHT="TRUE">
<TITLE TEXT="Basic Calculator" COLOR="#000OFF" JUSTIFY="LEFT"/>
<TITLEBARIMAGE JUSTIFY="LEFT" TILELEFT="1" TILERIGHT="1"
NORMAL="" INACTIVE="" HOVER="" DOWN=""/>
<BOTTOMBARIMAGE JUSTIFY="LEFT" TILELEFT="1"
TILERIGHT="1" NORMAL="" INACTIVE="" HOVER="" DOWN=""/>
</FRAME>
<MENU/>
<CONTROL LAYOUT WIDTH="1" HEIGHT="1">
<CONTROL CLASS="Browser" KIND="A" ID="1" TOP="0" LEFT="O" WIDTH="1" HEIGHT="1"
URL="http://www.dodots.com/dots/Calc/CALCULATOR2.htm"/>
</CONTROL LAYOUT>
</NIM>

The first line of this definition establishes the identification of the NIM definition, as discussed above: it is in the domain "calculator," and the kind of display is "basic." In one embodiment, the domain will be the domain name associated with the content provider. The domain name is a unique label for the provider or developer of the NIM. The NIM's "kind" is a helpful identifier for locating the NIM, and need not be unique. A NIM may also be identified using a GlobalID, when the NIM is being shared. Since the NIM defined by this XML file is not being shared, it does not have a GlobalID.

The second line of the example XML NIM definition establishes the size and appearance of the NIM frame, defining a NIM viewer in which the NIM content will be placed. The third line ensures that the height and width of the frame are fixed—that is, the size of this frame cannot be adjusted by the user. The fourth and fifth lines establish the title of the NIM—"Basic calculator"—and its location. The next four lines establish the location and placing of the titlebar and bottombar, and relevant images, e.g. mouseover. Thus, the first part of the example NIM definition defines the NIM frame. The definition of a frame, titlebar, menu and other aspects distinguish a NIM from a browser— the content provider has control over the frame size and every aspect of the NIM's appearance, whereas when a browser is used, the content provider has to adapt to the browser display size, and browser titlebar, menu, logo and other aspects cannot be controlled by the content provider.

The rest of the NIM definition identifies, positions, and initializes the NIM's controls, which, in this case, are contained by the NIM frame. In this example, the next few lines establish that a single control will start in the upper left corner of the NIM viewer, that the control is of the type "browser," or web-rendering, and that the initialization URL for the control is www.dodots.com/dots/Calc/CALCULATOR2.htm. This URL is typically referred to as the "initialization URL," because it is where the NIM looks for NIM content when it is opened. Where the control is of type "browser," the content will typically be HTML content. However, any standard Internet content—HTML, dHTML, flash, streaming media, or Java, for example—may be used. As discussed earlier, a control, could include types other than a browser. The final two lines of the XML file close the definition file.

It will be appreciated that the NIM is designed such that content consumes the entire frame. In one embodiment, the content for the corners of the frame—the menu and the exit button—and the frame sizing images are served by an application server and referenced when the user logs in. Everything else is developed and served by a separate NIM developer. This differs fundamentally from the current approach to providing web content, in which there is a strong distinction between the viewer application—the browser—and the web page or web content. Using present browser-type technology, the content is trapped within the viewer. To obtain a cohesive application feel and access to application features, the current alternative is to develop custom client applications. NIMs allow a developer to provide an application feel without developing custom client applications.

NIMs and the client parser application have a messaging architecture—the NIM messaging architecture, or NMA— that enables NIMs, controls, and the client parser application to communicate. Messaging, in combination with the NIM definition, gives the content of a NIM access to the application/rendering program—the client parser application— and to other NIMs, allowing true application behavior. The NIM definition, discussed above, is accessible, flexible, and may be changed by a NIM or a user while the NIM is in use, even after it's been rendered.

The content provider, the user, or other NIMs can change a NIM. For example, the content—which includes the titlebar and menu elements—may be changed by the NIM provider by simply enhanced NIM content, using 20 messaging, so that NIMs can exhibit true application behavior. For example, an online brokerage firm can go beyond providing a NIM that renders stock tracking charts, and allow users to trade on-line via a second NIM that can interact with other NIMs such as the first NIM to help facilitate the activity.

A NIM can be changed by its content, or by another NIM, using messaging. This enables a NIM to, for example, notify a user of events, such as a change in content. A NIM could, for example, remain open, but in a collapsed mode, until a particular event occurs, and could then either expand to normal size, or open another related NIM. For example, if a particular stock hits a predetermined price, the stock tracking chart NIM discussed earlier can notify the user by expanding, by popping up a message, or by opening another NIM (such as a stock trading NIM). Alternatively, the NIM could notify the user of a particular event by coming into focus or changing size or content. These changes could also be made by sending messages from a content or applications server to the NIM.

Figure 14:
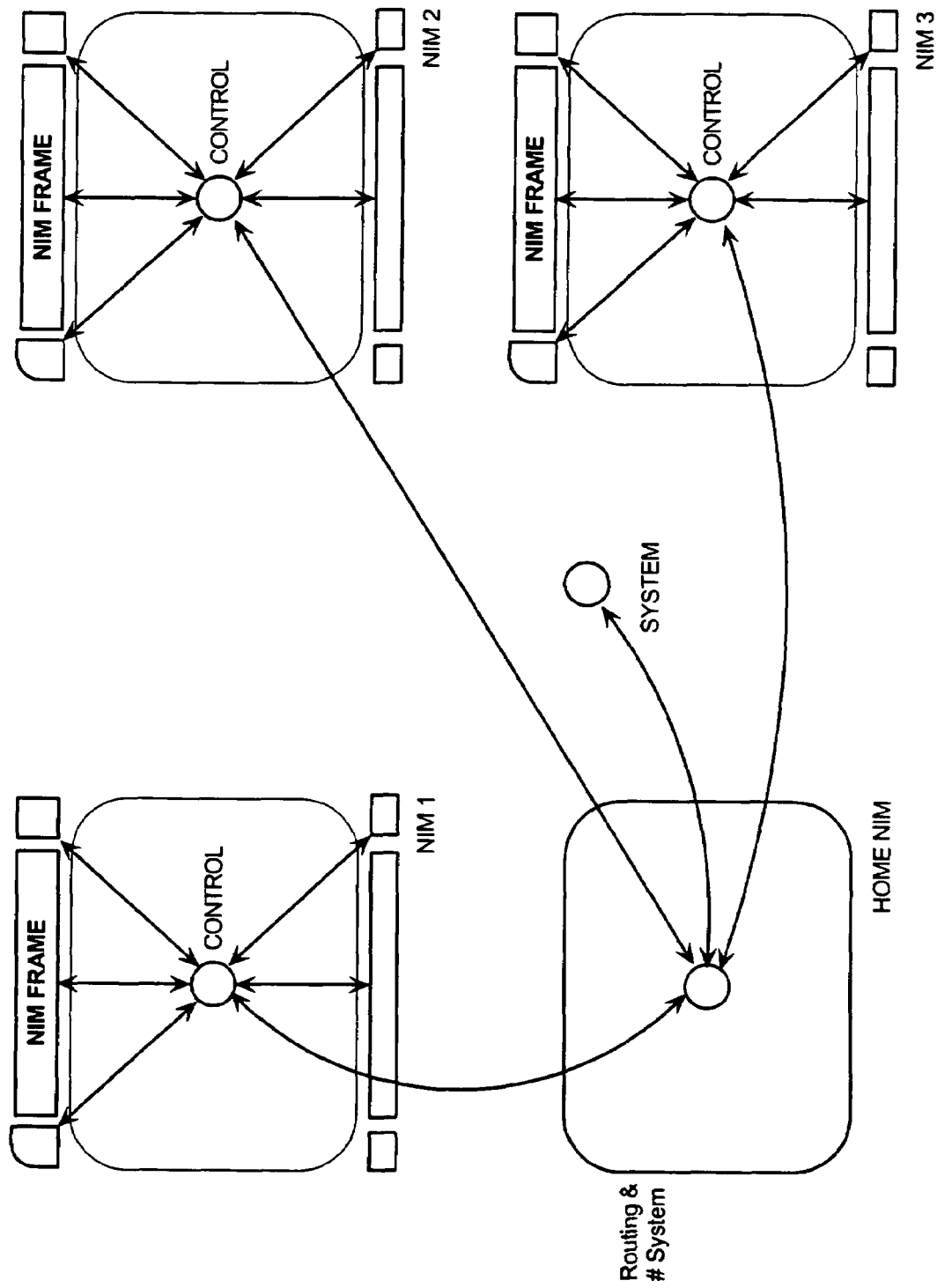
FIG. 14 illustrates NMA message routing between NIMs and the message interface in the client parser application.

As illustrated in FIG. 14, all elements of the system can send and receive NMA messages. Message routing between NIMs, from a NIM to itself (that is, between e.g. the frame elements and a control, or one control and another), and from NIMs to the system, are handled by a message interface module 106, which is part of the client parser application 38 in the client 20. In one embodiment, the message interface module 106 resolves addressing queries, executes system-level commands from the NIMs such as "close all NIMs," and passes messages between NIMs. The message interface 106 may also communicate messages to controls such as the browser class controls, for example "navigate the addressed NIM's browser control to the argument URL." Alternatively, the message interface module 106 may route a message to an application or content server (not shown in 'FIG. 14) for expanded functionality. In one embodiment, the message interface module 106 uses an HTTP request to access an application program interface (API) call, with data optionally being sent and received in XML format. For example, the message interface 106 could send a message providing user input, such as credit card information to a credit processing module on a web server 82.

In one embodiment, an NMA message has two components: a recipient, or address, and the message body. Both are represented as strings. The address may specify an exact NIM, a kind of NIM or control, a domain, or the system, meaning the overall home NIM display. For example, in one embodiment, the address may be in the form:

<NTM specifier>:<control specifier> if the communication is between NIMs in the same domain, or

<domain>:<NIM specifier>:<control specifier> or

<domain>:<NIM specifier>:<NIM id>:<control kind>: <control id> if the communication is between NIMs in different domains, or system if the communication is to the system.

In one embodiment, if the address is not properly specified it defaults to #system. The message interface 106 in the client 20 can flexibly allow, restrict MM addressing or sending messages—for example, the message interface can ensure that only certain NIMs can send message to a particular NIM. This allows NIM developers to develop coordinated NIMs that can interact, by sending messages to e.g. change content or open one another, without allowing other NIMs to interact with their coordinated NIMs.

In one embodiment, a specifier inn address may be the unique identification of the NIM, control or domain in question: <specifier>:=<ID>. Alternatively, where the kind of NIM or control receiving the message is important but the specific NIM or control is not, the specifier may address a message to the closest matching recipient using a search criteria: <specifier>:=<kind>#<search criteria>. The kind should be a type of NIM or control that is installed in the system. Search criteria may be, for example, "any," "open," or "closed." Finally, where the control is being specified, the specifier may be a symbol, such as ".", indicating that the message is addressed to the sending NIM. For example, in one embodiment, the address #system sends the message to the system. The address #. sends the message to the NIM which sent the message. The address #7 sends the a message to the NIM with the identifier 7. The address #B#open:5 sends a message to the control with the identifier 5, in the first open dot of kind B found in the system.

In one embodiment, certain NIMs will have privileges to send particular messages to certain NIMs, and not to other NIMs. For example, NIM.s in a domain may be permitted to send control messages to other NIMs in the same domain, but not to NIMs in other domains. Thus, a NIM provider may have control over messaging between NIMs in his domain, and prevent NIMs in other domains from changing NIMs in his domain. Alternatively, NIM providers may coordinate with NIM providers in other domains, permitting certain messaging privileges between some of the NIMs in their respective domains. The HomeNIM and other system NIMs, such as the login NIM, which are in the system domain, may have certain messaging privileges that no other NIMs have, such as logging the user out or closing all the currently-open NIMs.

In one embodiment of the invention, the second part of the message, the body, is represented as a string of characters. Messages may be sent to the client parser application, to the frame of a NIM, or to a control. Messages may be specific, defined messages, as shown in the following examples, or may be any javascript, which may be sent in or out of NIM content. Examples of defined messages to the client parser application, in one embodiment, are:

| Application Message<arg> | Function |
| --- | --- |
| Refresh | Refreshes the user's profile. |
| #have-NIM <NIM-address> | Check if the user has the specified NIM as part of the user's profile. |
| #delete-NIM <NIM-address> | Remove the specified NIM from the user's profile. |
| #get-screen-width | Returns the width of the screen. |
| #get-screen-height | Returns the height of the screen. |
| #close-all-NIMs | Closes all open NIMs. |
| #get-NIM-ids <NIM-address> | Returns the NIM ID of the specified NIM. |

Messages can also be sent from a NIM to itself, or to another NIM, and the identified actions or functions, specified in the body, are performed on the receiving NIM. The following are examples of messages to a NIM for one embodiment of the invention:

| Defined NIM Message<arg> | Function |
| --- | --- |
| #set-size<width><height> | Sets the size of the NIM. |
| #set-width<width> | Sets the width of the NIM. |
| #set-height<height> | Sets the height of the NIM. |
| #set-position<x-pos><y-pos> | Sets the position, of screen, of the NIM. |
| #set-title<title> | Sets the title of the NIM. |
| #collapse | Collapses, but does not close, the NIM. |
| #uncollapse | Uncollapses the NIM. |
| #set-user-sizable<width true/false><height true/false> | Establishes whether the NIM is sizeable by the user |
| #set-background-color<color> | Sets background color of the NIM. |
| #set-title-text-justify<justify-keyword> | |

The above examples of NIM messages may, in one embodiment of the invention, be sent to a NIM by another NIM. For example, a user may provide input to a NIM, for example a stock tracking chart NIM, indicating an interest in another NIM, such as a stock trading NIM. The current NIM may then send an "open" message to the second NIM to open it, if it wasn't already open. The current NEM may then send a navigate message (see below) that may include an argument, such as a URL or other content pointer, so that the second NI.M could be opened to a specific URL indicated by the first NIM.

Finally, messages may be sent to a control of a NIM, either by the NIM itself, another control, the HomeNim system, or another NIM. As examples, the following control messages are provided in one embodiment of the invention:

| Defined Control Message | Function |
| --- | --- |
| ##<any javascript> | Run any javascript in the control, e.g. javascriptin a browser-type control. |
| #show | Set visibility control within a NIM. |
| #hide | Set invisibility of a control within a NIM. |
| #get-size | Get size of control. |
| #get-address | Query for unique ID of a control by kind. |
| #navigate | Navigate the control. |

Control messages may be used by a NIM, addressed to its own control, or to the control of another NIM. Control messages may also be sent by the HomeNIM, or by the applications server or content server.

An example of a message to a NIM is window.external.PostMessage("#.:","#collapse)" this is a message from a NIM, to itself, collapsing the NIM. Another example of a message from a NIM to another NIM is "window.external.PostMessage("#mp3#any:","#open")", which is addressed to a NIM with the kind "mp3," but only if it is in the same domain as the sending NIM. The body of the message instructs the message of type mp3 to open. An example of a javascript message is "window.external.PostMessage ("#mp3#any:1", "33play( )")", which sends a message to the mp3 NIM control that calls the javascript function play( ).

The operation of the home NIM and individual NIMs has been described. Attention presently turns to different techniques used in accordance with the invention 25 to host NIMs.

As shown and described in relation to FIG. 1, the application server 50 includes a NIM Management Module 112, a NIM Templates Database 74, a ShareLink Database 78, and a user profile database 76.

Figure 15:
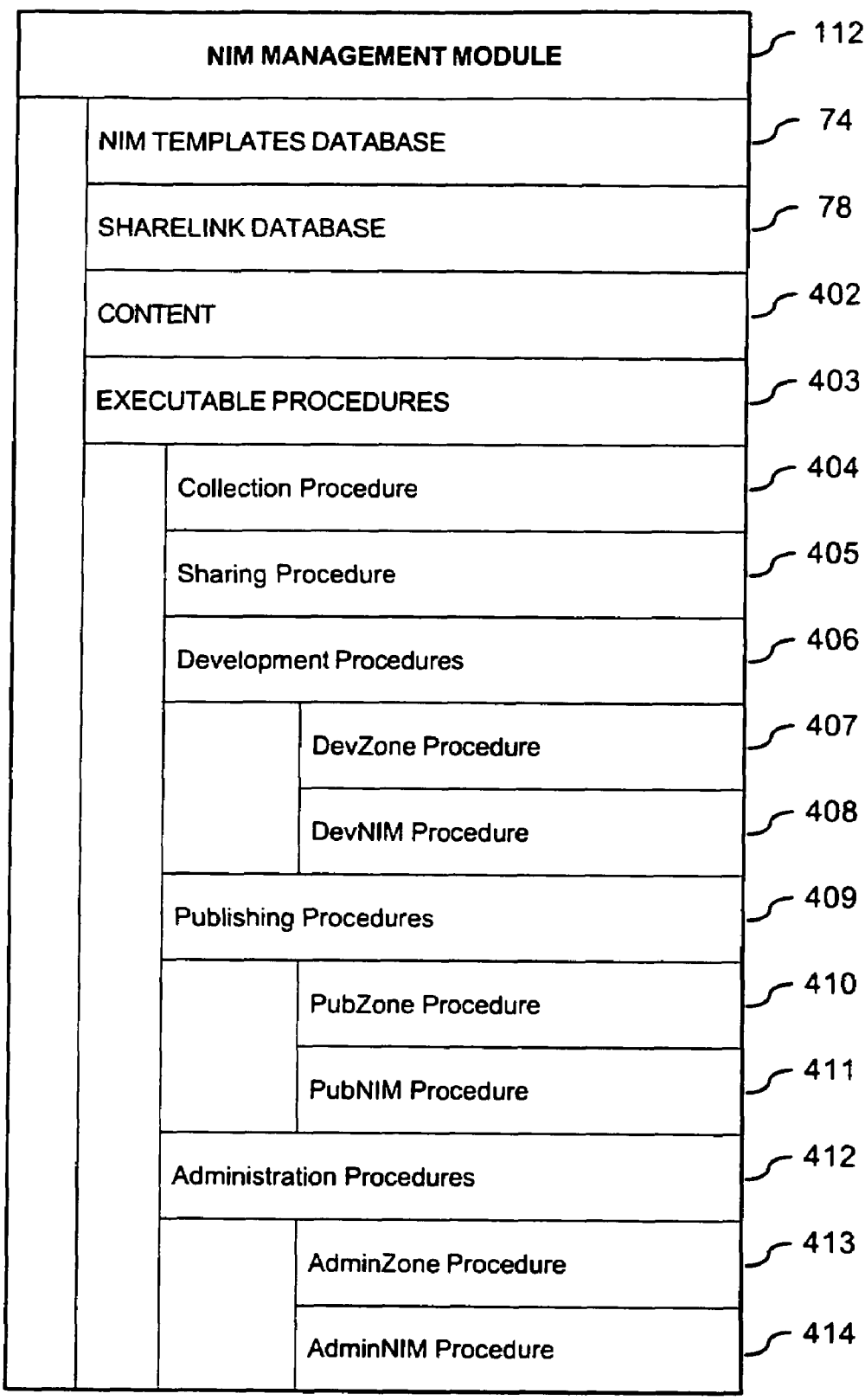
FIG. 15 is a diagrammatic illustration of an embodiment of a NIM Management Module utilized in accordance with an embodiment of the invention.

FIG. 15 is a diagrammatic illustration of an embodiment of the NIM Management Module 112. NIM Management Module 112 may contain the NIM Templates Database 74 and the ShareLink Database 78, discussed in further detail below. NIM Management Module 112 may also contain content 402 for filling in a NIM frame or for rendering Internet pages. Alternatively, content 402 may be stored elsewhere, such as on a Web server similar to the server 82 shown in FIG. 1. As discussed above, the content preferably contains Internet content such as HTML (Hypertext Markup Language), dHTML, and images.

In addition, Management Module 112 preferably contains executable procedures 403 for controlling and managing the NIM system. These procedures 403 may include: a Collection procedure 404 for obtaining new NIMs; a Sharing procedure 405 for sharing NIMs with others; Development procedures 406, such as a DevZone procedure 407 and a DevNIM procedure 408, for creating, modifying or deleting NIMs; Publishing procedures 409, such as a PubZone procedure 410 and a PubN1M procedure 411, for publishing NIMs so that they are publically accessible; and Administration procedures 412, such as an AdminZone procedure 413 and an AdminNIM procedure 414, for administering the system. It should be noted that the NIM sharing procedure, discussed in further detail below, may be processed by either the Server module (102 of FIG. 1), or the Sharing procedure (405 of FIG. 15). Control and management of the server and the NIM Management Module 112 components will now be discussed in further detail.

Figure 16:
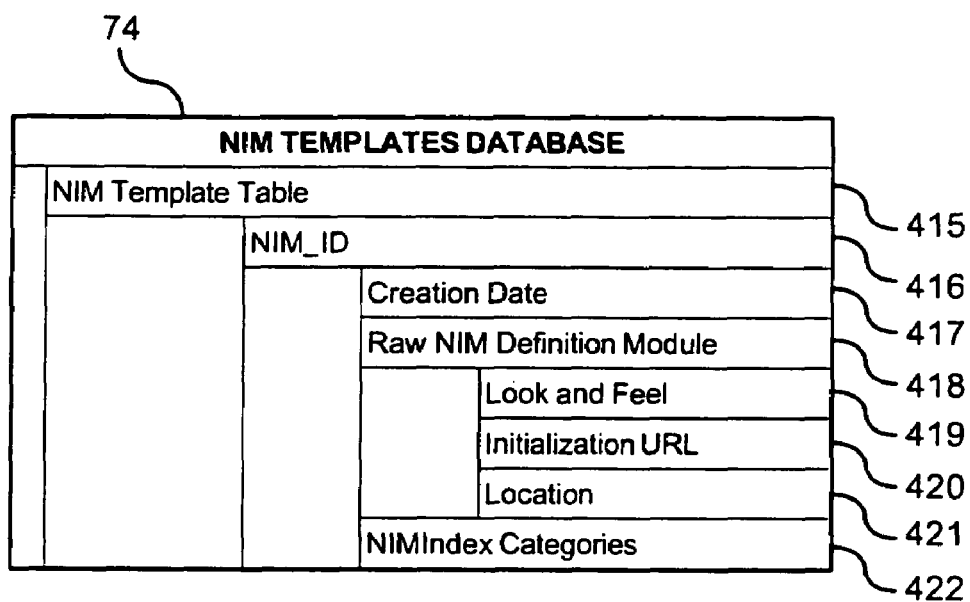
FIG. 16 is a diagrammatic illustration of an embodiment of the NIM Templates database utilized in accordance with an embodiment of the invention.

FIG. 16 is a diagrammatic illustration of an embodiment of the NIM Templates database 74. In this embodiment, NIM Templates database 74 primarily stores XML NIM definitions in their initial unmodified state as initially designed by a partner and which have not been altered by a user in any way. The unmodified NIMs are also referred to as "Raw NIMs". The NIM Templatesdatabase 74 is used as the starting point for the development of NIMs which may later be customized or modified by a user, developer, or system administrator, as discussed below.

For ease of explanation, the individual or organization that controls the server (50 of FIG. 1) will hereinafter be referred to as the system provider and the individual or organization who supplies the content will hereinafter be referred to as a partner. It should be understood that a provider, partner, user, developer, and administrator of the system may be distinct entities, the same entity, or a combination of both. Furthermore, as discussed above, each of the above entities is assigned access rights or privileges which permit or forbid that entity from performing different actions on the system.

FIG. 16 illustrates an embodiment of a NIM Template database 74. A NIM identification number (NIM_ID) 416 is stored in a NIM Template table 41.5 in the NIM Templates database 74. A Raw NW, identified by its NIM_ID, includes a plethora of RAW NIM characteristics, including, but not limited to, a Raw NIM creation date 417, which indicates when the NIM was created and is useful when searching for NIMs created during a specific time, a Raw N.I.M definition module 418, and the NIMIndex categories 422 in which the NIM has been categorized. Each NIM when created in typically classified into one or more NIM Index categories by the developer, such as "Applications", "Business", "Entertainment" and "News".

Each NIM is fully configurable and definable. The NIM definition module 418 contains details defining the NIM, such as the look-and-feel 419, of the Raw NIM, initialization URLs (Uniform Resource Locators) 420, and a location 421 of where the developer would like the NIM to open on a users's computer screen. The look and feel of the NIM is the appearance and function of the NIM interface. The look and feel may characterize the frame or skeleton layout, the graphics used to represent certain functions, such as opening and closing the NIM, whether the frame is sizable, and the appearance and operation of menus in the frame.

The definition module 418 may also contain Initialization URLs 420 which reference resources containing content. The content resources may be HTML (Hypertext Markup Language), dHTML, images, programs such as Java applets, or any other file supported by HTTP. The Initialization URLs 420 contains the name of the protocol required to access the resource, a domain name that identifies a specific computer on a network, such as the Internet, and a hierarchical description of a file location on that specific computer. These files or resources are then used by the home NIM to fill in the frame and controls with content. In addition, the definition module 418 may contain other details such as the location 421 on a user's computer screen where the NIM should initially open.

The NIMIndex may be used to search for, learn about, and collect NIMs. The NIMIndex is typically accessed from either a Web browser, such as Internet Explorer® or Netscape Navigator® or from the home NIM, 108 of FIG. 1. A user may search for NIMs by, or according to, any field of the NIM Templates table 415 via the NIMIndex.

Figure 17:
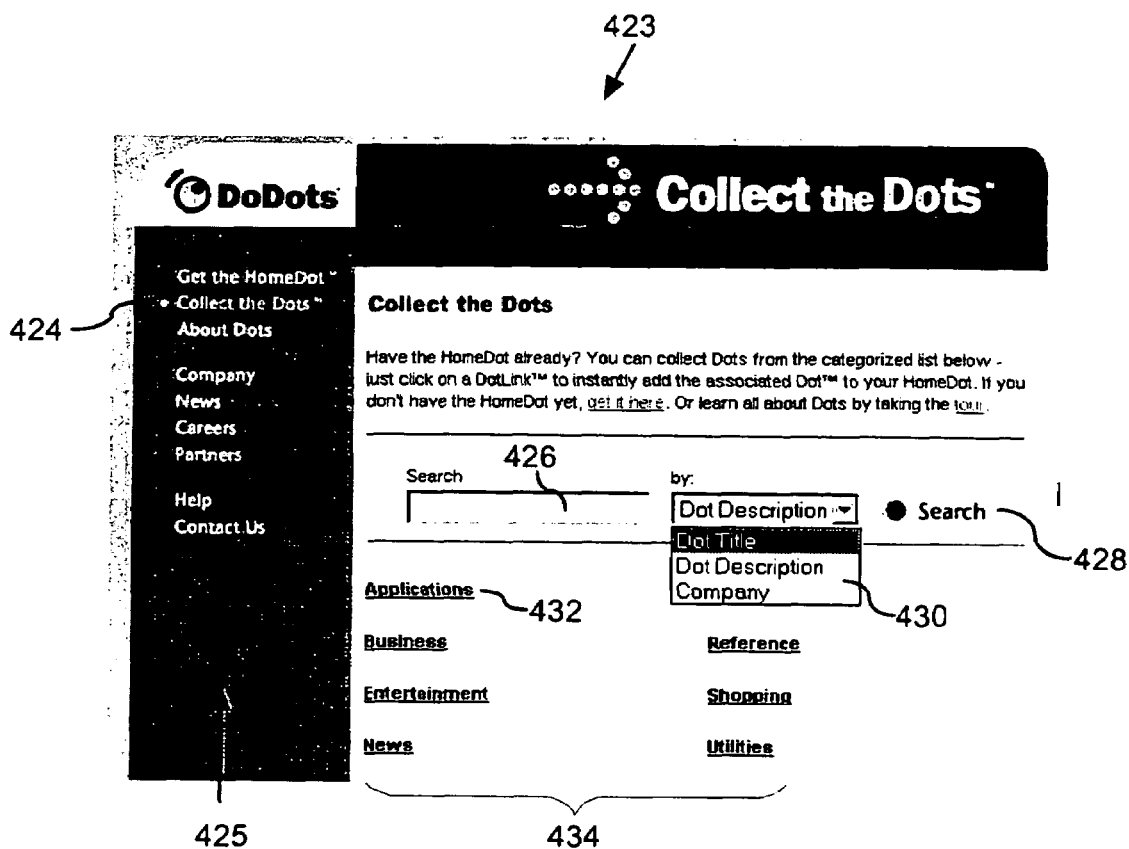
FIG. 17 is an illustration of a main NIMIndex Web page used in accordance with an embodiment of the invention.

A user accessing the NIMIndex from a Web Brow typically navigates to a main NIMIndex web page such as that shown in FIG. 17. FIG. 17 is an illustration of the main NIMIndex Web page 423. A user typically navigates to main NIMIndex Web page 423 from a NIM home-page (not shown), or while anywhere within the NIM Web site by clicking on the "Collect the DOtSTM" link 424 in a menu 425. A user may search the NIMIndex by entering a search term in a form 426 and clicking on the "Search" button 428 which implements the Collection Procedure (404 of FIG. 15) to search the NIM Templates database (74 of FIG. 15) for NIMs that match the query. In one embodiment, the NLMIndex may be searched by NIM title, NIM description, or partner, as shown in the pull down menu 430. The user may also browse the NIMIndex by clicking on a link 432 to a NIMIndex category 434 which will navigate the user to a NIMIndex category Web page 440, as shown in FIG. 18.

Figure 18:
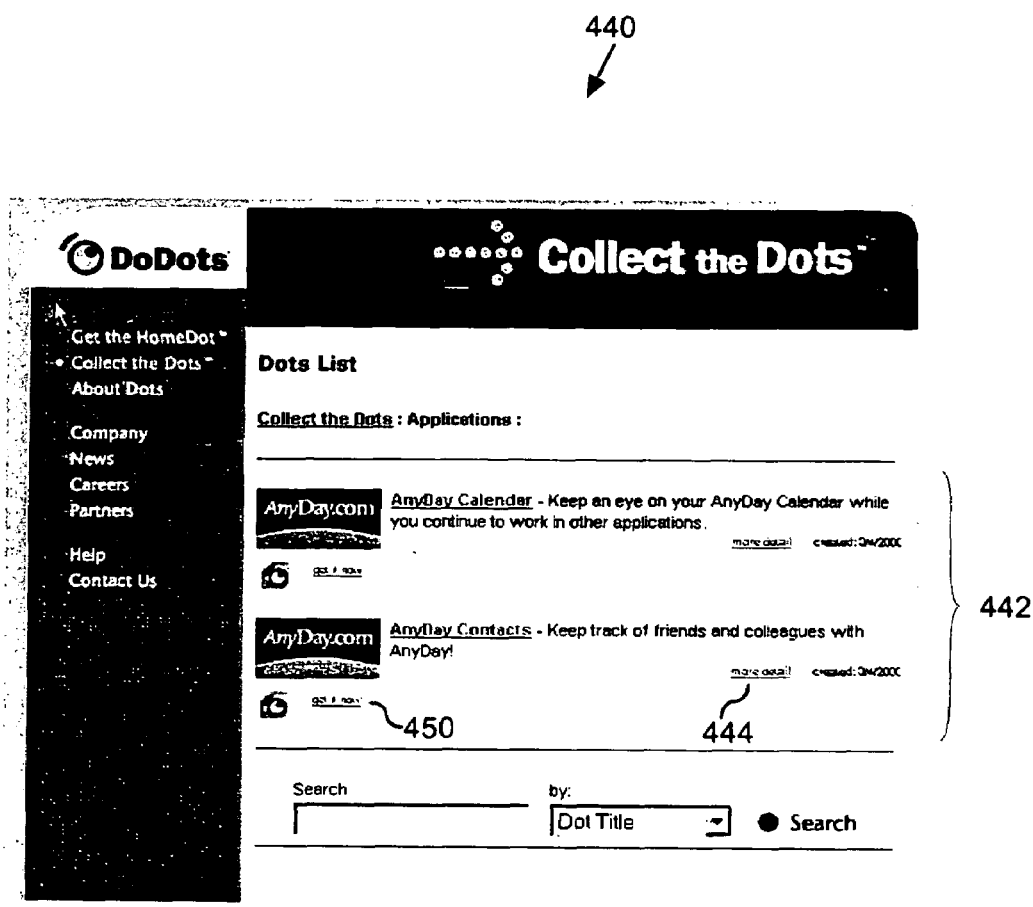
FIG. 18 is an illustration of a single NIMIndex category used in accordance with an embodiment of the invention.

FIG. 18 is an illustration of a single NIMIndex category, the "Applications" category 435, shown in FIG. 17. A list of sub-categories (not shown), as well as a list of NIMs 442 and their short descriptions are shown in FIG. 18. A user may click on the "more detail" link 444 to be taken to a page displaying a full description (discussed later in relation to FIG. 29B) of the NIM, shown in FIG. 19.

Navigation of the Internet generally occurs through the use of URLs (Uniform Resource Locators), which are the addresses of files or resources accessible on the Internet. The type of resource depends on the Internet application protocol. Using the World Wide Web's protocol, the Hypertext Transfer Protocol (HTTP), the resource can be an HTML (Hypertext Markup Language) page, an image file, a program such as a Java applet, or any other file supported by HTTP. The URL contains the name of the protocol required to access the resource, a domain name that identifies a specific computer on the Internet, and a hierarchical description of a file location on the computer and usually takes the form: "URL=protocol://machine.name[:port]/directory/document.name'?[&arguments]" The "protocol" is the Internet protocol used to reach the document or resource. On the Web, the "protocol" is typically HTTP, but it can take any number of forms, such as ftp (file transfer protocol), file (a local file), gopher (gopher protocol), mailto (electronic mail address), news (Usenet news), telnet and tn3270 (interactive sessions), wais (wide area information servers), or the like.

The "machine.name" is the name of the host come where the document resides (such as www.NIM.com). The ":port" portion of the address is optional and is only necessary when a resource is accessible through a non-standard TCP port number. Although the standard port number for HTTP is 80, there are numerous Web servers on the Internet that use non-standard ports, such as port 8000.

The NIM system, however, may also utilize a proprietary NIM protocol. An example of a URL using the proprietary NIM protocol is: "NIMS:?NIMTemplate=<N/M_ID>"

The NIM protocol URL is used to collect, distribute, and share NIMs. When collecting NIMs the NIM protocol URL is referred to as a NIMLink. When distributing or sharing NIMs the NIM protocol URL is referred to as a ShareLink.

The "NIMs:" term defines the NIM protocol or scheme and is always followed by a colon. The "?NIMTemplate=<NIM_ID" is an argument, where a dollar sign (5) and a question mark (?) are used to denote path and/or search elements. It should be noted that no path is supplied (i.e.: "//path/to/something"). The argument instructs the client parser application (38 of FIG. 1) how to handle a user's selection of a NIM protocol URL and what the NIM protocol URL must do. For example, to obtain a NIM, the argument might read "NIMTemplate=123", to obtain a Share (discussed below) the argument might read "Share=123", to obtain a Pack (discussed below) the argument might read "Pack=123", etc. The argument can be used to cause the client parser application to do anything within it's system of functionality by specifying new argument sets to build new types of special client parser application links.

In one embodiment, the address for where the client parser application (38 of FIG. 1) searches the system (10 of FIG. 1) for the NIM Template or ShareLink database (74 and 78 of FIG. 1) is specified within the processed login script or session_config, although it could alternatively be specified within the NIM protocol URL. When a user clicks on a NIM protocol URL (from any where you can place and click on a link, for example in a browser, in a NIM, in email, in a document, etc.), the client parser application processes the NIM protocol URL in the same manner as a browser processes HTTP links and an email program processes mailto links.

When a protocol URL takes the form of a NIMLink, the client parser application responds by obtaining the NIM definition from the NIM Template database, optionally adds the NIM to the user's processed user profile (unless the NIM has been specified to be opened in transient mode, which may be specified in the argument), and optionally opens the NIM on the user's display screen.

In one embodiment, by default, unless specified otherwise, a NIM will be added to a users collection (transient-false) and will be opened (open-true). A NIMLink with arguments may look as follows: "NIMS:?NIMTemplate&transient=true" or "NIMS:?NIMTemplate&open=false". More than one additional argument could be added by appending another argument to the URL which may read as "&argument=value".

A ShareLink (discussed below) is similar to a NIMLink and may read "NIMS:?share=123", where 123 is the SHARE ID referencing the share module within the ShareLink Database. Pack Links (discussed below) typically read as "NIMS:?pack-123", where 123 is the PACK_ID referencing a pack module within the NIM Template Database.

Figure 19:
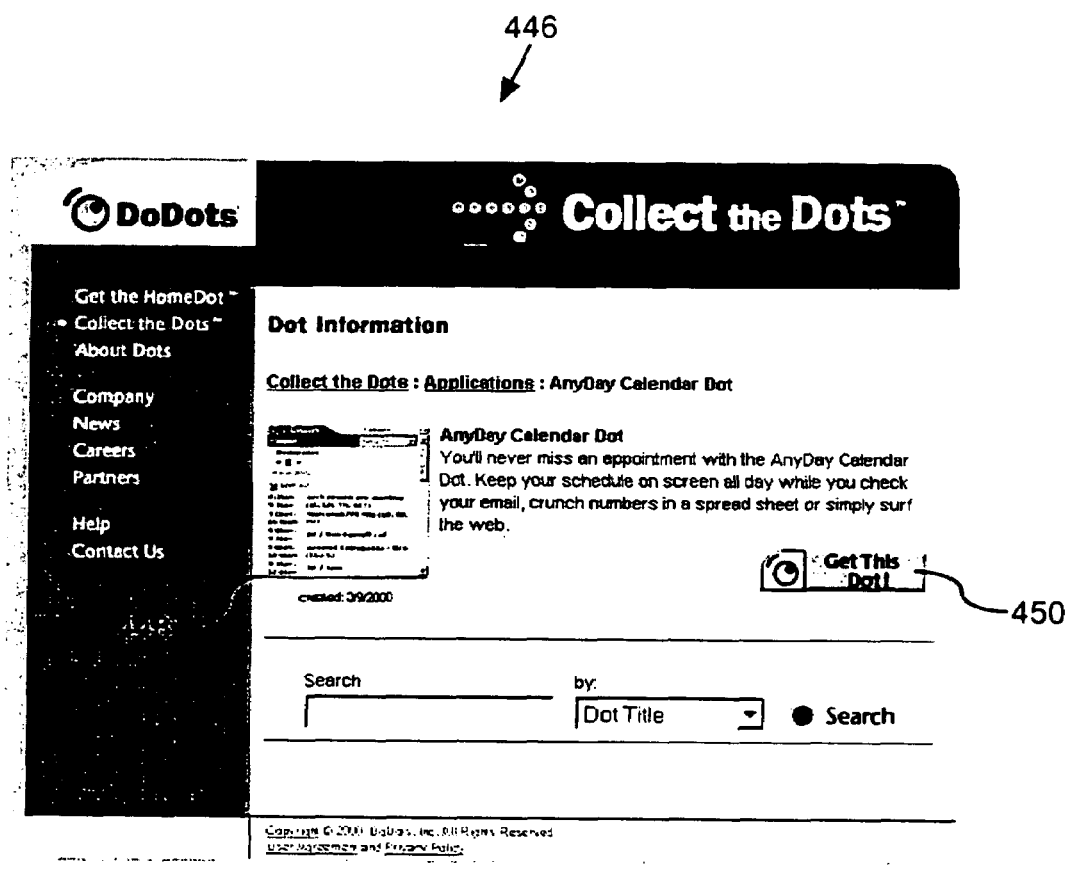
FIG. 19 is an illustration of a full description of NIM content provided in accordance with an embodiment of the invention.

FIG. 19 is an illustration of a full description of NIM content 446. A graphic of the opened NIM may also be displayed 448.

Figure 20:
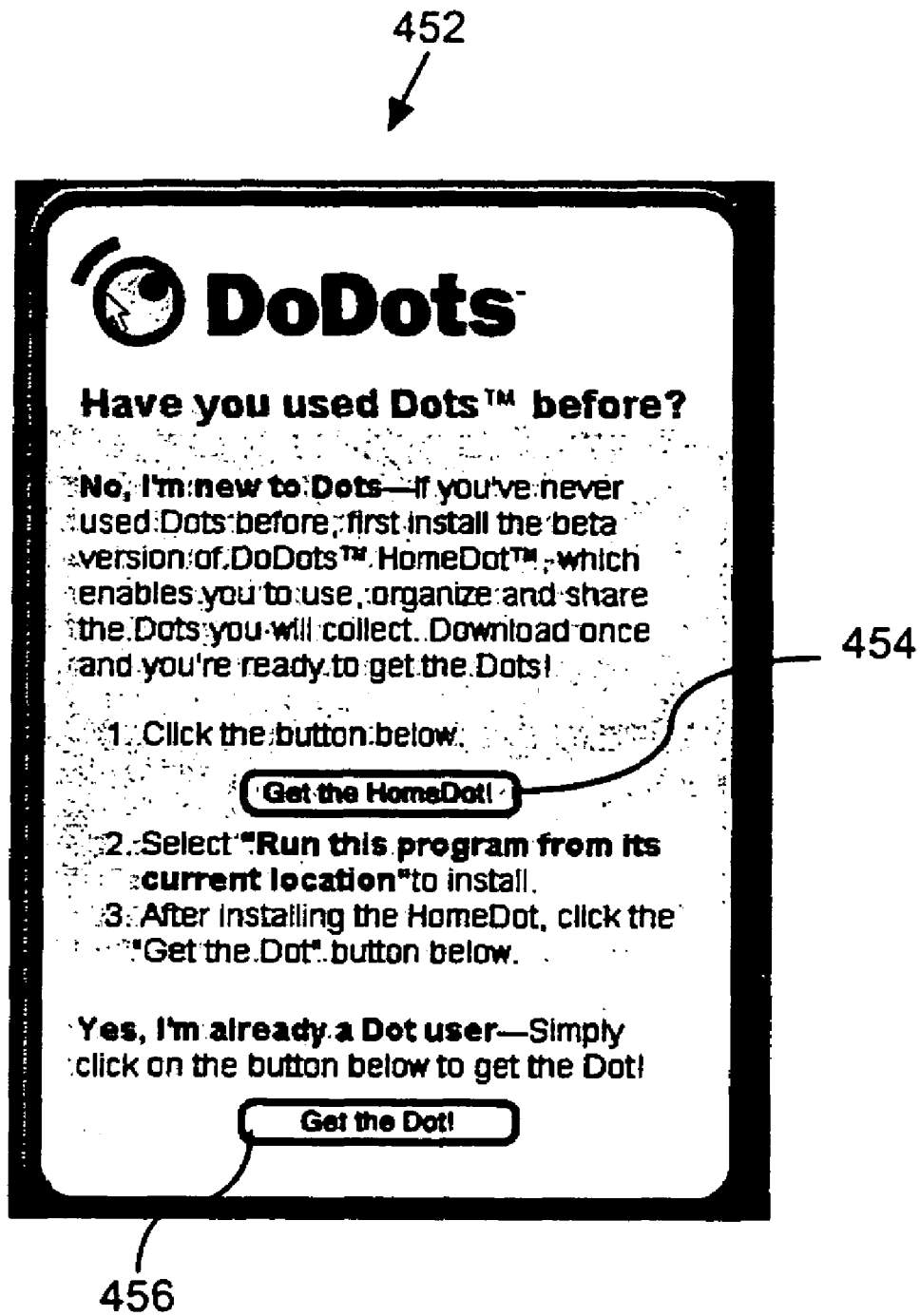
FIG. 20 is an illustration of a Web page displayed to the user once the user has clicked to collect the NIM.

Once the user decides that he would like to add a NIM to his home NIM, the user clicks on the "get it now" or "Get This Dots™ NIMLink 450 (FIGS. 18 and 19) which either runs the Collection procedure (404 of FIG. 15) which obtains that NIM's NIM definition module (418 of FIG. 16) from the NIM Template table (415 of FIG. 16), or opens another Web page as shown in FIG. 20.

FIG. 20 is an illustration of a Web page 452 which might be displayed to the user once the user has clicked on the NIMLink 450. The user is presented with an option of either collecting the NIM 456, or if the user does not have the home NIM application, the user may first download the home NIM by clicking on "Get the homeDotIm" 454. Once the user clicks on the download the NIM button 456, the Collection procedure (404 of FIG. 15) obtains that NIM's NIM definition module (418 of FIG. 16) from the NIM Template table (415 of FIG. 16).

The Collection procedure (404 of FIG. 15) transmits the NIM definition to the user's home NIM, which optionally opens the MM and saves the NIM definition module (418 of FIG. 16) on the user's local processed user profile. All NIM definition modules (418 of FIG. 16) on the user's computer may subsequently be saved to the user profile database, as discussed earlier in this writing. Alternatively, a "preview" button may be provided which transiently displays the NIM on the user's computer screen without adding the NIM to the user's local processed user profile. The user may also search the NIMIndex from their home NIM.

FIG. 21 is an illustration of the main home NIM graphical user interface (GUI) 464, similar to that shown in FIG. 5. The home NIM displays a list of all NIMs 466 that the user has collected. Furthermore, any NIMs that the user has collected in groups or packs, can be accessed by clicking on the "My Dotpacks'" tab 468. One way to obtain new NIMs is to click on the "Get" button 470, which opens the NIM shown in FIG. 22.

FIG. 22 is an illustration of a get new NIM GUI 474. A list of all NIMs 476 (or a featured subset) that may be collected by the user are displayed. Clicking on the "More Dots'" tab 478 (shown in FIG. 23) displays further NIMs which may be collected.

When a user selects or clicks on any of the NIMLinks 480, NIMLink 480 references the NIM_ID (416 of FIG. 16) for that NIM in the NIM Templates database (74 of FIG. 16). The collection procedure (404 of FIG. 15) receives the NIM_ID (416 of FIG. 16) from the user, locates the NIM definition module (418 of FIG. 16) corresponding to that NIM_ID in the NIM templates database, and transmits the NIM definition module to the user's computer. That NIM may automatically be opened on the user's computer screen. The NIM is saved to the user's list of NIMs on their home NIM (466 of FIG. 21), and the NIM definition module is saved in the user's local processed user profile. Alternatively a "preview" button may be provided which transiently displays the NIM on the user's computer screen without adding the NIM to the user's local processed user profile, as discussed above in relation to the N1MLink. All the NIM definitions that the user has listed on their home NIM are saved to the user profile database either periodically, at a set time, by event, or when the user closes their home NIM. The technique of the invention facilitates a viral distribution architecture. In other words, the technique of the invention facilitates rampant distribution of generated NIMs, as described below.

Users (or developers) may share NIMs they have collected, and perhaps even modified, with other users (or developers) in accordance with this viral distribution architecture. Because the NIM definition contains basic reference information, such as data to instantiate the NIM and URLs and other references to where the NIM content is located, a NIM is easily and quickly distributed, collected, and shared. By packaging Internet content and applications as NIMs and referencing the NIMs by NIMLinks, the system advantageously gives Internet content viral characteristics as the NIMs can easily be distributed or shared between users.

Each NIM definition contains just enough information to define and initialize the NIM's components (NIM frame, controls, etc.). For example, this information may contain data to configure the skeleton or frame that is filled in by NIM content from a developer's server. The NIM definition is therefore fairly small in size (~2K), and is therefore easily distributable as an XML file or Blob (binary large object), which is communicated using the same mechanisms (HTTP/HTTPS requests) as regular Web pages.

This is especially useful where a user has collected a NIM or a group of NIMs (Packs) that he would like to send to another user. For example, a user may have an online trading NIM, calculator NIM, and stock research MM all set up in various positions on his screen, and would like to share the entire Pack with a friend who is remotely connected to the Internet.

To share NIMs with others, the system utilizes the Sharelink database 78 of 25 FIG. 15 and the Sharing procedure 405 of FIG. 15. FIG. 24 is a diagrammatic illustration of the Sharelink database 78. NIM Sharelink database 78 stores a list of all NIMs shared by users, developers, or administrators, in a share table 484. Each NIM or group of NIMs shared is assigned a Share ID 486 which points to a Share module 488. Each Share Module 488 may also include a creation date 490, multiple 30 individual MM definition modules 492, or multiple packs of NIMs that have been shared (Sharepack module 494) containing multiple NIM definition modules 496 and 498.

FIG. 25 is an illustration of a Share NIM's GUI 500. All dots collected by the user (466 of FIG. 21) can be shared with other users by clicking on the "Share" button 502 shown in FIG. 21. Once the user has clicked on the "Share" button 502, the GUI 500 shown in FIG. 25 is launched. The user may then highlight any of the NIMs or packs of NIMs 504 he has collected or created and thereafter share the NIMs or packs of NIMs 504 by clicking on the "Share via email" button 506. It should be noted that other means of distributing the NIMs may be used together with, or instead of, email.

When users share NIMs or NIM packs, their home NIM application generates a 10 share module, which may for example be an XML Blob containing the N1M definition or Sharepack modules shared. The shared NIM XML is then sent to, and saved in, the Sharelink database (78 of FIGS. 1 and 24). The Sharing procedure 405 of FIG. 15 then automatically generates a shared link (ShareLink) that references or points to the address of the shared XML on the Sharelink database. This ShareLink is then sent or 15 distributed (via email or posted on a Web site) to other users.

If a user receives shared NIM(s) or pack(s) and has a home NIM installed on his client computer, then clicking on the Sharelink adds the NIM(s) to the user's home NIM and opens the shared NIM(s) on the user's screen. If a recipient of a shared NIM does not have the home NIM installed on his computer, then the home NIM is downloaded and installed (with the user's cooperation), the shared MM is added to his local processed user profile, and the NIM is opened.

The NIM management module (112 of FIG. 15) may also be responsible for controlling and managing the development of new NIMs via the DevZone and the DevNIM discussed below.

Because NIM content is based on existing Internet content standards (HTML, DHTML, GIFs, etc.) developers can create MM content using their existing Internet content development tools and methodologies. Therefore, no special hardware or software is required to develop or serve NIM content.

Furthermore, as the application server (50 of FIG. 1) hosts and delivers NIM definitions from the NIM Templates database (74 of FIG. 1) developers merely define and package the NIM content without directly authoring, hosting, or serving the XML NIM definitions. Therefore, no special hardware or software is required on the developer-side to host and serve the NIM content, other than required for their regular Internet content.

Two means are provided for creating NIMs. First, a Developer Zone Web site (DevZone) and second, a set of developing NIMs (DevNIMs). Both means enable NIM developers to create, define, and modify NIM definitions, and to support the NIM development process which results in XML NIM definitions being added to the NIM Templates database and NIMLinks generated.

The DevZone is a Web site where NIM developers can view a list of NIMs they have defined and/or published, add new NIMs, and categorize, view, modify, or delete their existing NIMs. The DevZone is preferably rendered in a Web browser, is hosted on the Web server (82 of FIG. 1), and is implemented with a DevZone procedure (406 of FIG. 15). To access the DevZone, the developer may typically pass through a secure portal, such as by supplying a login identity and password.

Figure 26:
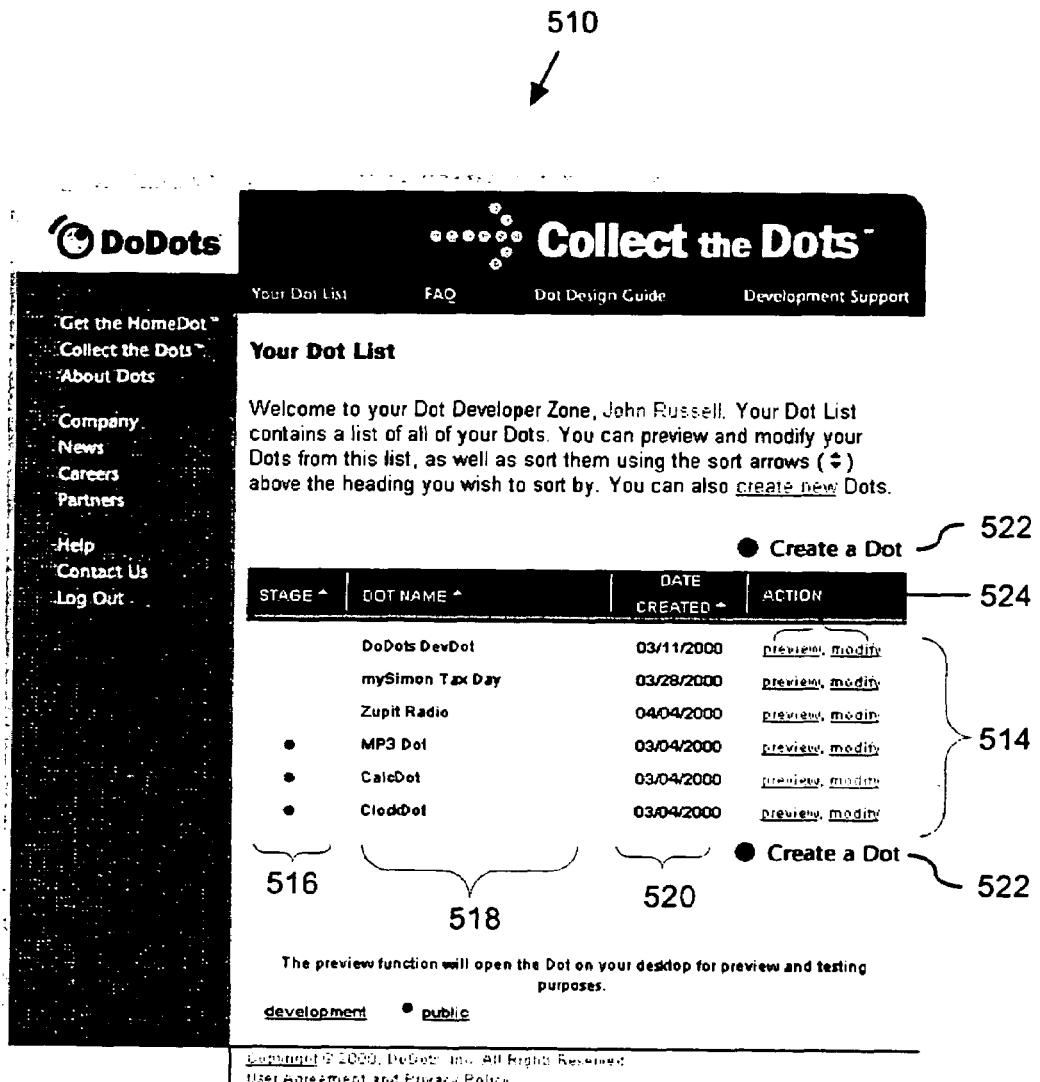
FIG. 26 is an illustration of the main DevZone Web page utilized in accordance with an embodiment of the invention.

FIG. 26 is an illustration of the main DevZone Web page 510. All NIMs created by the NIM developer appear in a customized NIM list 514 that may only be accessed by that NIM developer. All NIMs created by a developer appear on the NIM list 514, unless they have been deleted by the developer or by a system administrator. The NIM list may contain the NIM name 518, the date the NIM was created 520, and an indication 516 of whether the NIM is in development or accessible by the public in the NIMIndex (i.e. "in-development" or "published").

To access the NIM definition (for modification or review) the developer clicks on a "modify" or "preview" link 524 as transient (e.g. to add the NIM to their home NIM for previewing and testing). By clicking on the "modify" link, the developer is taken to the NIM modification web page, as shown in FIG. 27. Alternatively, by clicking on the "Create a Dot'" button 522, the developer is taken to a web page similar to the NIM modification web page shown in FIG. 27, where the developer may create a new NIM.

FIG. 27 is a partial view of a NIM modification web page 530. To modify an existing NIM, or create a new NIM definition, a developer preferably utilizes Web forms, such as 534 to 542, or any area that contains objects that capture user input, such as text entry spaces, check boxes, and selection buttons. Developers typically fill in forms with information which defines the NIM, where the details might include the NIM's name 534, the URL for any image associated with NIM 540 (as shown in FIG. 18), the URL for a detailed image 542 (448 of FIG. 19), and such details as NIM frame (e.g., size of NIM, sizeable), layout of the controls (e.g., WebConduit control), and to specify the initial MM content (e.g., the initial target URLs for the WebConduit control, TitleBar, BottomBar), and any categories in which the developer would like the NIM to be listed in the NIMIndex. Once the developer has completed or modified the forms, he may either save or delete the NIM 532. If the developer selects either the development check box 536 or the public check box 538, and then saves the NIM, the DevZone procedure (407 of FIG. 15) generates a XML NIM definition, stores the XML NIM definition in the NIM Templates database (74 of FIGS. 1 and 15) and returns a NIMLink pointing to that NIM which is listed on the NIM list (514 of FIG. 26) on the developer's home NIM. The only difference being that once the developer selects the public check box 538 and saves the NIM, the NIM definition is published utilizing the PubZone publishing procedure (410 of FIG. 15) to a publicly accessible portion of the NIM Template Table (415 of FIG. 16), from where users can access, download, and collect the NIM. If the developer selects the development check box 536, the NIM can only be viewed and or modified by the developer and system administrator. It should be noted that the DevZone only allows control of certain characteristics of each NIM. Other characteristics may be set to default while still other characteristics can only be altered by an administrator. In an alternative embodiment, the DevZone may be rendered in a NIM or group of NIMs just as it was rendered in a Web browser. In either embodiment, NIM developers fill out one or more forms specifying NIM definition parameters, an XML NIM definition gets created and stored in the NIM Templates. Database, and a NIMLink gets generated that points to the new NIM. The Developer can then view or debug this NIM by clicking on the NIMLink to add it to his home NIM, or preview as transient, and thereafter render it on his screen. NIM definitions may also be developed using NIMs and NMA messages. A 30 developer may create Raw NIMs from empty NIM Templates using a development NIM (the DevNIM) on the developer's home NIM.

FIGS. 28A to 28D are GUIs of a development NIM (the DevNIM). A developer may obtain a DevNIM by either collecting the DevNIM in the usual manner, as discussed above, or the system, via the system administrator, may share the NIM with the developer, also as discussed above. The DevNim contains a DevNIM procedure (408 of FIG. 15) which is transmitted to the developer's home NIM, as discussed above.

Figure 28A:
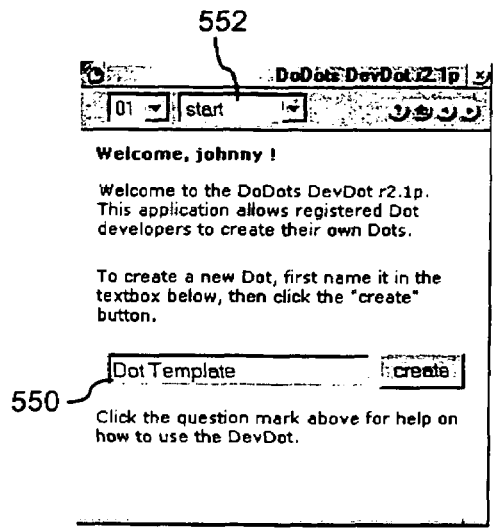
FIGS. 28A to 28D are graphical user interfaces of development NIMs (DevNIMs) utilized in accordance with an embodiment of the invention.
Figure 28B:
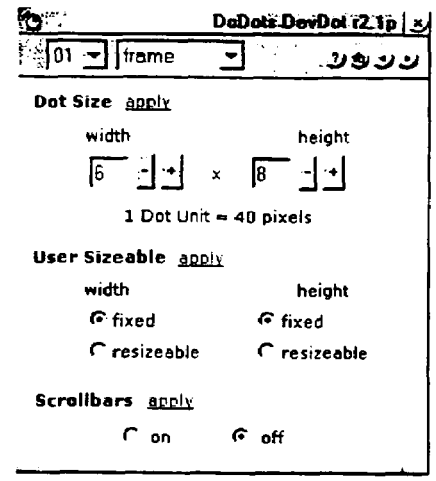
Figure 28C:
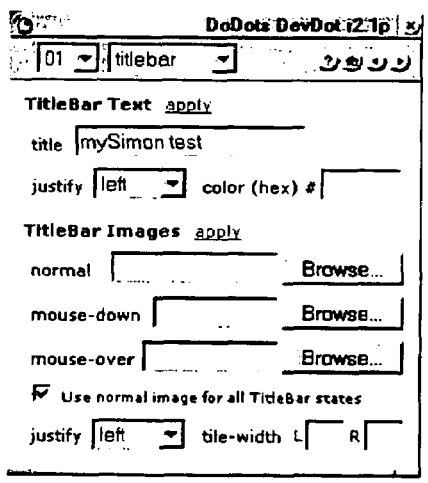
Figure 28D:
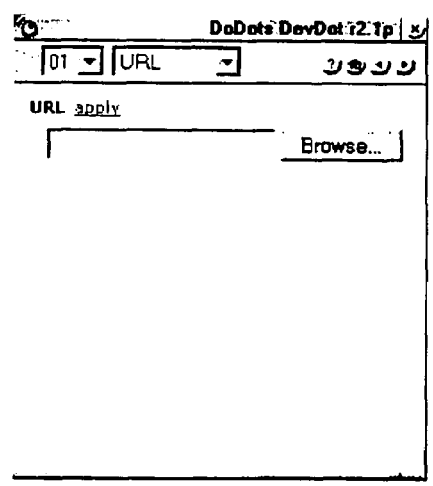

To create a new NIM, the developer launches the DevNIM and enters a NIM name 550 into the DevNIM. The server then obtains an empty NIM (a NIM with default or no initialization data and with only basic characteristics) from the NIM Template Database using the procedure for collecting NIMs described above, and saves the empty NIM under the supplied new NIM name 550 locally in the developer's processed user profile. The developer may then modify the empty NIM to the required form using the DevNIM. In the preferred embodiment a pull down menu 552 is provided where the developer can select which feature to modify, such as the frame characteristics (FIG. 28B), the titlebar (FIG. 28C), or initialization URLs for different frame or control elements (FIG. 28D).

Each time the developer modifies a setting, the DevNIM, using the DevNIM procedure, sends NMA messages to the newly saved NIM to modify its definition parameters. For example, modifying the NIM's name, size, TitleBars, BottomBars, or WebConduits (as shown in FIGS. 28A to 28C).

Unlike the DevZone, a new XML NIM definition and NIMLink is not generated every time a modification is made. All modifications (during the development cycle) are made locally to the NIM definition and are stored in the developer's processed user profile. The DevNIM embodiment, therefore, requires a separate publishing step that promotes the newly created NIM definition from the developer's user profile, to the NIM templates database on the application server.

To publish the NIM, the NIM developer categorizes the NIM and the NIM definition is copied from the developer's processed user profile to the NIM Templates database.

A publishing NIM (PubNIM), implemented with Publishing procedures 409, is provided to handle these functions. The PubNIM may therefore be shared or transmitted to the developer along with the DevNIM. The PubNIM contains a PubNIM procedure (411 of FIG. 15) which controls the publication of the NIMs to the NIM template database, as discussed above. The PubNIM procedure sends a NIM definition module to the application server which receives the NIM definition module, extracts the NIM definition from the share module, stores it in the NIM Templates database, and associates the NIM with the developer so that the NIMLink shows up on the developer's NIM list (in their DevZone account).

Alternatively, the new NIM may be published directly from the DevNIM. Once a user is satisfied with the NIM, he may select an option which publishes that NIM definition to the NIM Templates database. It should be noted that a developer may modify his NIMs at any time from the DevNIM.

As mentioned earlier, when a developer is first authorized to create and/or modify NIMs, or at any time thereafter, information about that developer is saved in that developer's user profile (76 of FIG. 1) on the application server.

A developer may also create application programs using NIMs, which a user may access from his client computer. Just as client-side application characteristics (sizing, position, menus) are accessible to content via NMA, the system may offer server-side application functionality, or toolkits, which are accessible through the NMA.

A developer can build a NIM application without implementing, hosting, or supporting complex server or client applications. By using the server toolkits, a developer can develop N1Ms that exhibit server-application behavior by focusing on implementing NIM content (just like standard Internet content).

For example, a NIM's content (an HTML page) may send a message to the system (or server) to request a credit card to be processed. Other toolkit examples may include credit card billing, user profiling, targeted advertising, email, chat rooms, Internet telephony applications, or calendars.

Any server-side application can be made accessible through the NMA, as a toolkit, just as client-side application behaviors are made accessible. In the current implementation, server-side application functions could be offered by a NIM (exposed via javascript functions on a page in a hidden frame). Other NIMs could access this functionality by sending NMA messages to this "Toolkit NIM" calling the functions. A NIM developer may therefore focus on Internet content development while accessing the features, behaviors, and functionality of an application just as if he had developed custom client and server side applications. The NIM management module (112 of FIG. 15) may also be responsible for controlling and managing the administration of the system via the AdminZone and the AdminNIM discussed below.

A system administrator has the power to create, modify or delete users, developers, NIMs, other administrators, or NIMIndex categories, depending on that administrators access privileges. In a similar manner to the DevZone and DevNIM, system administrators may utilize either a Web browser administration zone (AdminZone), or an administration NIM (AdminNIM) which both make use of Administration procedures (412 of FIG. 15).

Figures 29A, 29B:
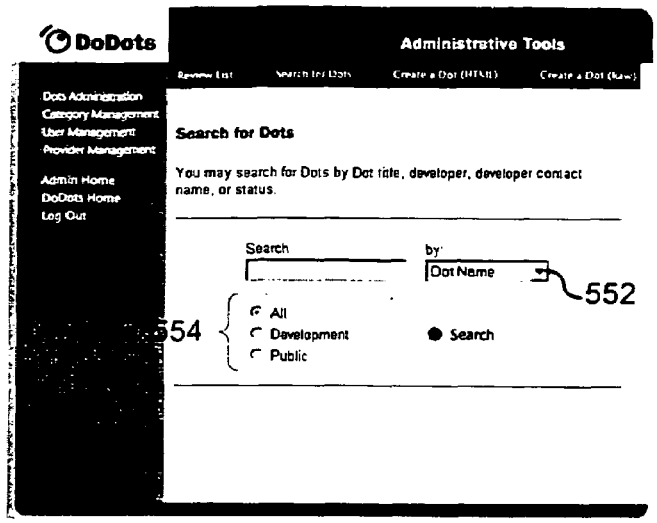

To access the AdminZone, an administrator typically passes through a secure portal, such as by supplying a login identity and password. Once within the AdminZone, the administrator may search for a NIM by NIM name or title 552, category, developer, developer contact name, or status, as shown in FIG. 29A. The administrator may also selectively search for NIM's in development or publicly accessible NIMs 554.

Utilizing an AdminZone procedure (413 of FIG. 15), once the required NIM 20 is located the administrator may modify or delete the NIM in a similar manner to a developer as shown in FIG. 29B, and described above.

Figure 30A:
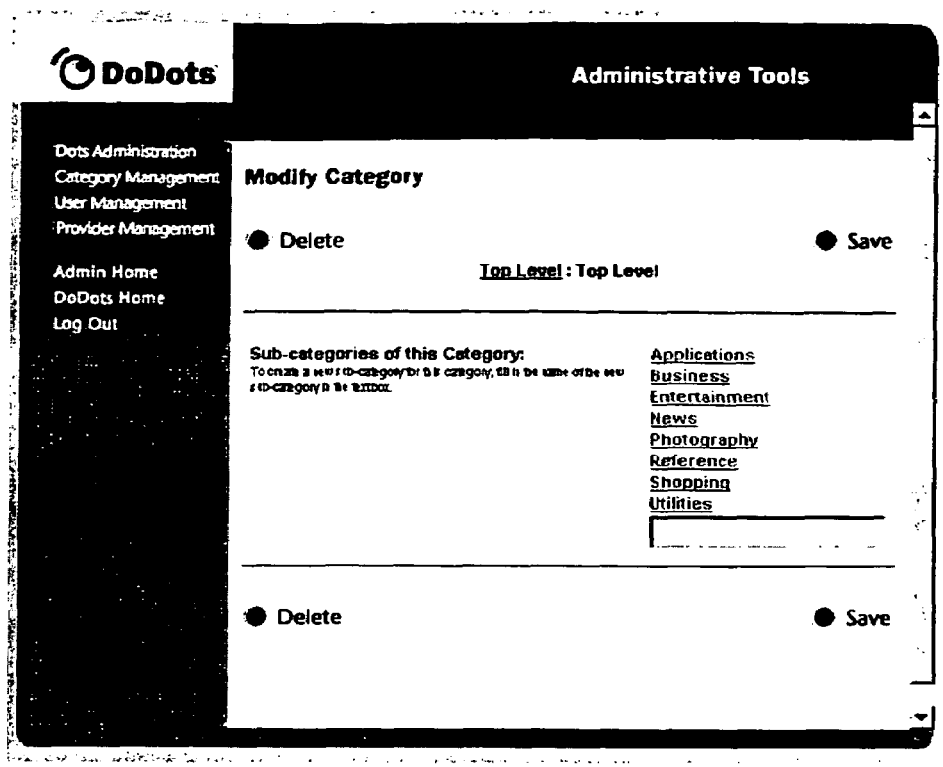
Figure 30B:
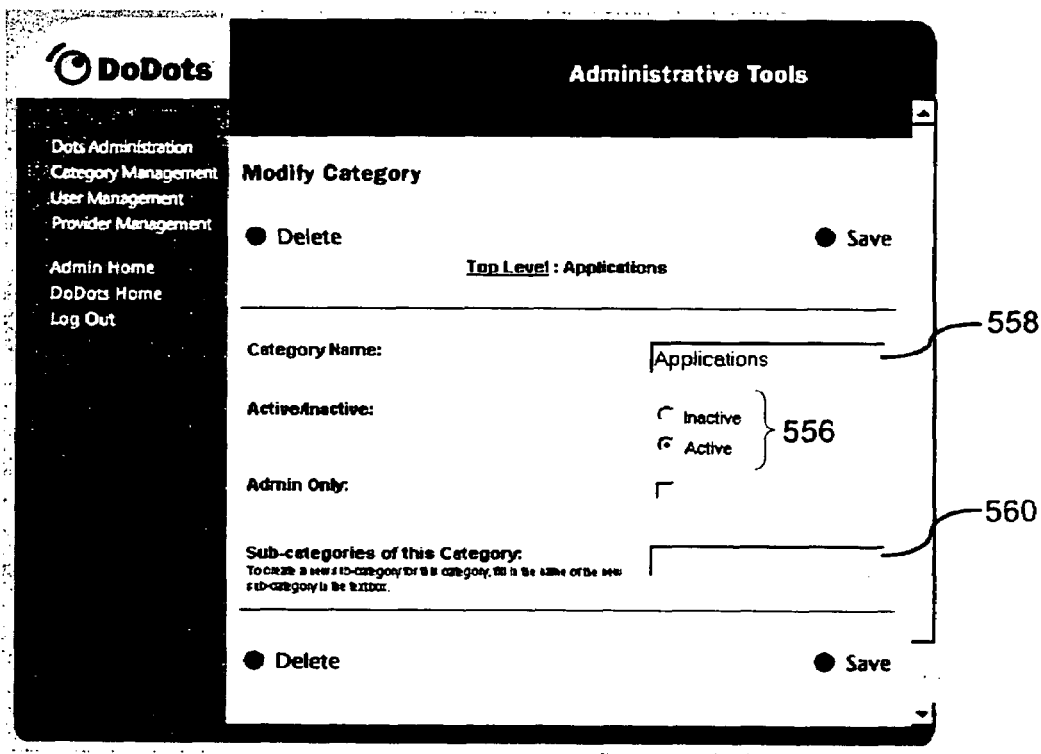

Also utilizing the AdminZone procedure, the administrator may manage NIMIndex categories by creating new categories, modifying or deleting existing categories, and/or adjusting the layout of the NIMs within those categories as shown in FIGS. 30A and 30B. For example, an administrator may change a category's name 558, designate the category active or inactive 556, or create sub-categories 560. The system administrator may also select a category or categories for the NIM to appear in, where each NIM may be registered in more than one category.

Figure 31A:
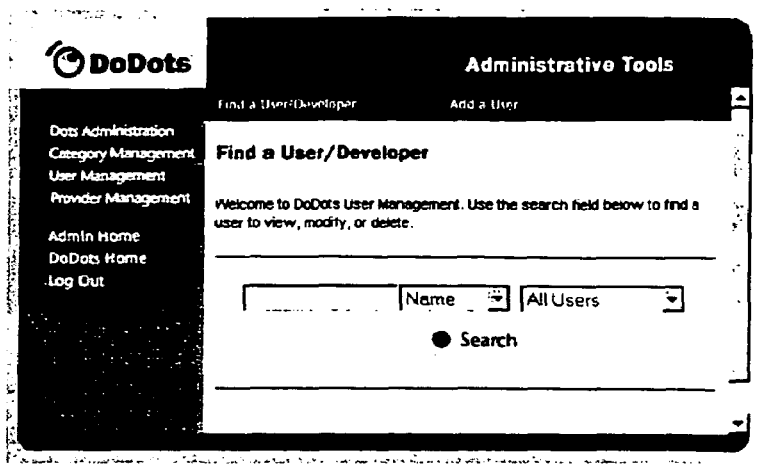
Figure 31B:
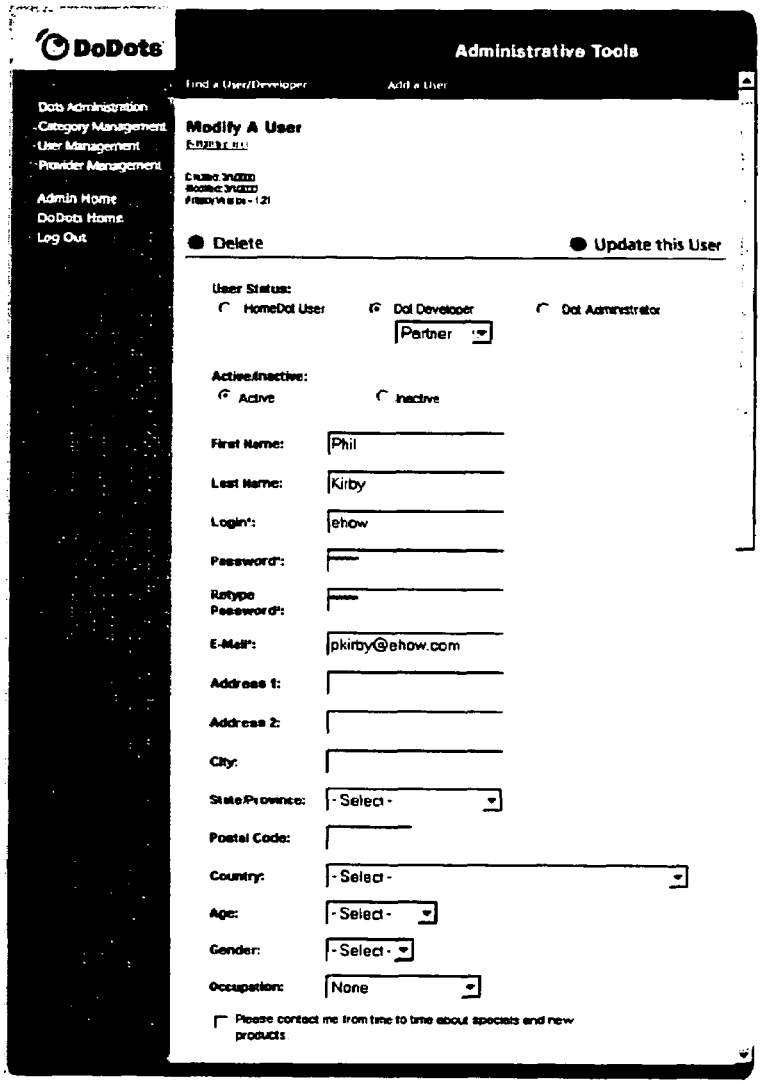

Finally, utilizing the AdminZone procedure (413 of FIG. 15), an administrator may search for users, providers, or developers and adjust their details, as shown in FIGS. 31A and 31 B. The system administrator may, for example, change a users contact details. In addition to adding, modifying or deleting NIMs, system administrator may have the task of reviewing NIM submissions from developers and promoting NIMs to the public. A submissions list of newly submitted NIMs may be displayed to an administrator, who may promote the NIM to the public or view the NIM. Once promoted, changes are made to the NIM Templates database and the NIM is automatically removed from the submissions list (again by utilizing the AdminZone procedure (413 of FIG. 15)).

The foregoing discussion has explored the inherent nature of NIMs. Attention now turns to different techniques that may be used to exploit information that is associated with the use of NIMs. In particular, the following discussion is directed toward the accumulation of statistical information that is only available in view of the architecture of the present invention.

Currently, the predominant method of tracking and collecting user online behavior is severely limited for a number of reasons. First, most Internet use or visitor statistics are single-dimensional (linear, sequential) because Internet content is presented to users one full-screen page at a time. Second, users visit and leave sites so rapidly their visits are barely meaningful. Third, user's browsing habits are often discontinuous (browsers give users navigational bypass controls—back, forward, home, refresh, stop, etc.). Fourth, user behavior tracking is limited from a single site's server point of view. Current use statistics are plagued with the challenge of tracking continuous user behavior (especially from a cross-company perspective), with more than a single dimension of use context. Finally, because a computer may have multiple users, or a single user may use multiple computers, tracking continuous user on-line behavior is extremely difficult.

One of the advantages of the NIM system as illustrated in FIG. 1, is that the Server 50 is able to track continuous, long-term NIM use information about each user. This is because the NIM server, through communication with the home NIM, can track each NIM event performed by each user. Therefore, it is possible to track each individual user's entire NIM use activity from the moment the user downloads the home NIM.

Figure 32:
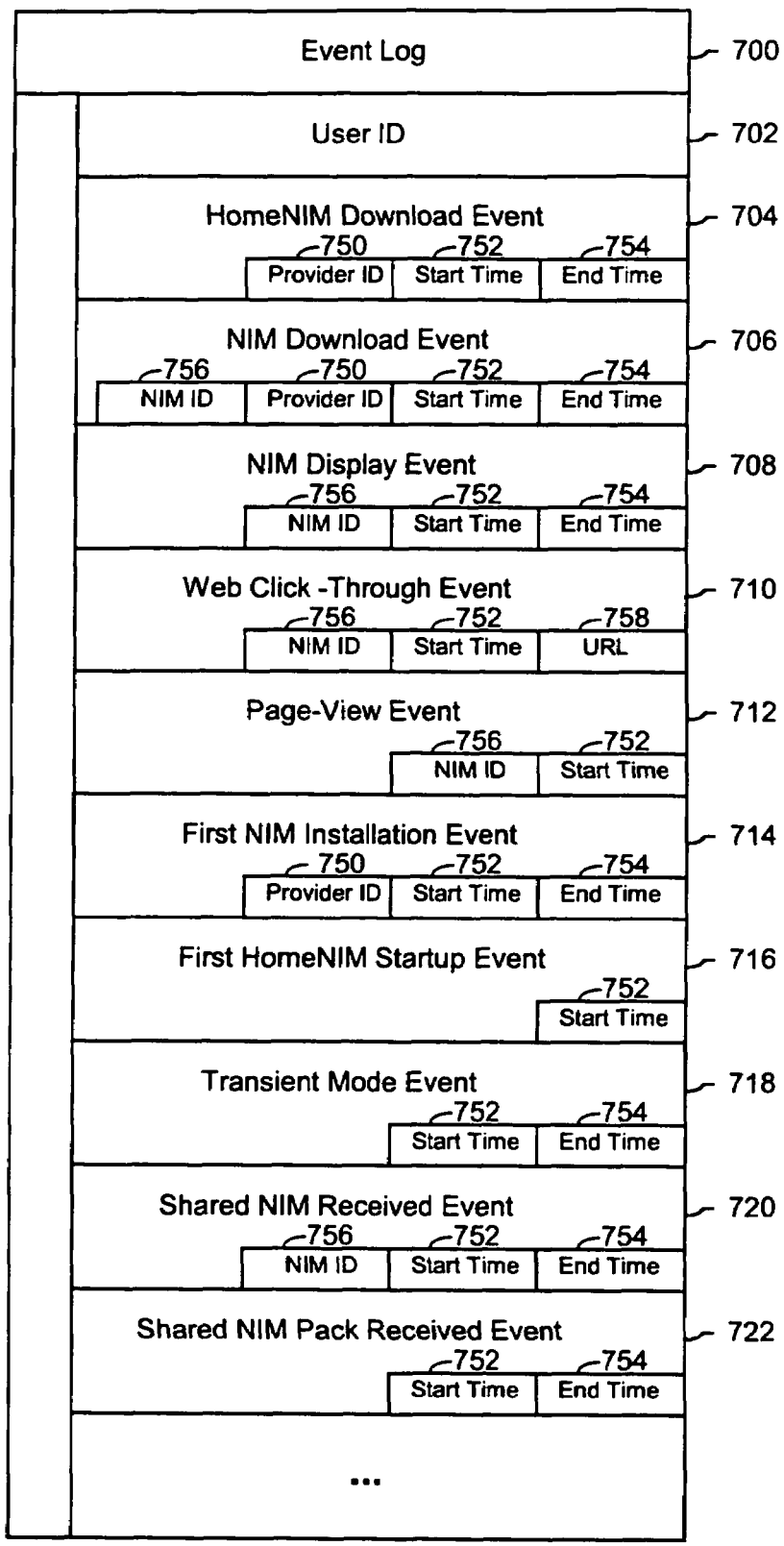
FIG. 32 illustrates an embodiment of an event log that may be used in accordance with an embodiment of the invention.

Referring to FIG. 32, in one embodiment of the invention the following events may be tracked by the Event Log Module 98 (within the client computer 20 of FIG. 1):
- home NIM Download Event 704
- NIM Download Event 706
- NIM Display Event 708
- Web Click-Through Event 710
- Page-View Event 712
- First NIM Installation Event 714
- First home NIM Startup Event 716
- Transient Mode Event 718
- Share NIM Received Event 720
- NIM Pack Received Event 722

A home NIM Download Event 704 is logged when the user clicks on a link to request the home NIM user application. Preferably, the start time 752, and the end time 754 are recorded for this event. Also recorded is the provider ID 750 which is a parameter (generally, an integer) that represents the content provider partner who provided the link to the user.

NIM Download Event 706 is logged when the home NIM acquires a NIM via a NIMLink. The start time 752, the end time 754, and the provider ID 750 are recorded for this event. Also recorded is the NIM ID 756 which is a parameter (generally, an integer) that represents the NIM that was just downloaded.

NIM Display Event 708 is logged when a user activates a NIM. The NIM ID 756, the start time 752, and the end time 754 are recorded for this event. Web Click-Through Event 710 is logged whenever a user links from a NIM to a full-screen browser. This can occur when a user clicks on a link in the NIM, or it can occur automatically through the NIM messaging, or directly through the content provider. The NEM ID 756, the start time 752, and the Internet address 758 of the link are recorded. Page-View Event 712 is logged whenever a user views a page of content within a NIM. The NIM ID 756, and the start time 752 are recorded for this event.

First NIM Installation Event 714 is logged the first, a NIM or NIM Pack is installed from a web site. This event is logged only once for each user account. The NIM ID 756, start time 752, and end time 754 are recorded for this event.

First home NIM Startup Event 716 is logged when the home NIM runs for the first time. This event is logged only once for each user account. The start time 752 is recorded for this event.

Transient Mode Event 718 is logged when the home NIM runs in transient mode. Transient mode occurs when the home NIM runs before the user has logged in. The start time 752, and the end time 754 are recorded for this event.

Shared NIM Received Event 720 is logged for each NIM a user receives as part of a share. If a NIM Pack is shared, this event will be recorded for each NIM in the shared pack. The NIM ID 756, the start time 752, and the end time 754 are recorded for this event.

Shared NIM Pack Received Event 722 is logged for each NIM Pack a user receives as part of a share. Thus, when a NIM Pack is shared, an Event 720 will be logged for each NIM in the NIM Pack, while an Event 722 will be logged once for the NIM Pack itself. The start time 752, and the end time 754 are recorded for this event.

The events listed above are tracked in one particular embodiment. Other embodiments may track more or perhaps fewer events. This comprehensive event tracking is possible because each user event can be identified by the NIM Server through communication with the home NIM. Additional events may include tracking when a user sends a share or tracking when a user sends a NIM or a NIM Pack.

Figure 33:
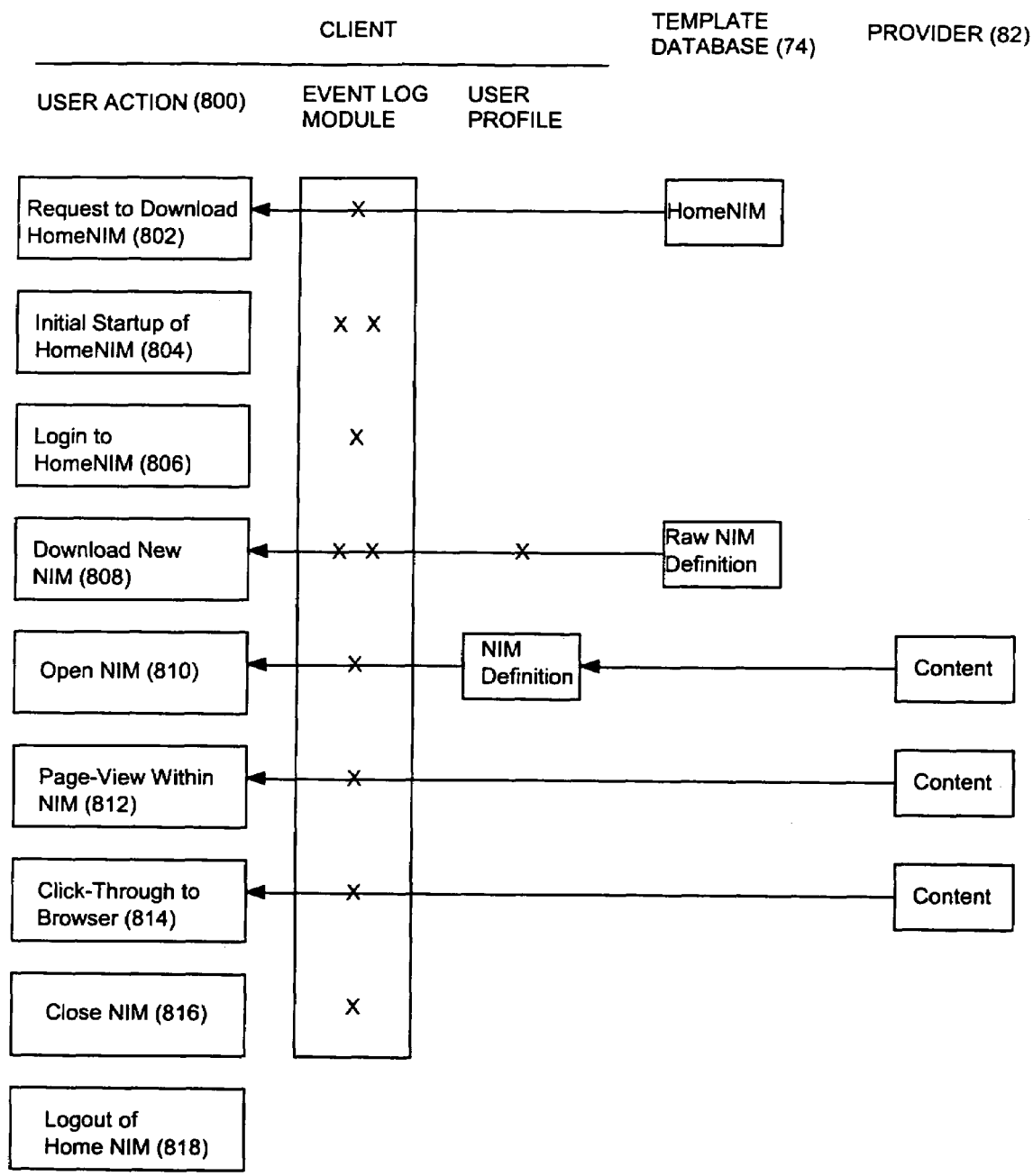
FIG. 33 illustrates the tracking of events in an event log module in accordance with an embodiment of the invention.

FIG. 33 shows a typical series of user actions 800 as they are tracked by the Event Log Module 98. First, a user may request to download the home NIM application (step 802) from either a partner's web site or the NIM Server 50. The Event Log Module 98 records a home NIM Download Event, as shown with field 704 of FIG. 32. The start time 752, and the end time 754 are preferably recorded. Also, the provider ID 750 of the site from where the home NIM download request was received is recorded.

Returning to FIG. 33, the user subsequently activates the home NIM for the first time (step 804). The Event Log Module 98 records a First home NIM Startup Event 716, as shown in FIG. 32. The start time 752 is preferably recorded. In addition, the home NIM is activated and the user lot yet logged in, a Transient Mode Event 718 is logged and the start time 752 is recorded.

As shown in step 806 of FIG. 33, the user logs into the home NIM. When this occurs, the end time 754 may be recorded for the Transient Mode Event 718.

A user download of a new NIM (step 808) may be from a partner's web site or the NIM Server. When this occurs, the raw NIM definition is copied into the user's User Profile 76. The event log 98 records two events. First, because this is the first NIM the user has installed, a First NIM Installation Event 714 is recorded. The start time 752, the end time 754, and the provider ID 750 of the download site are preferably recorded. The second event recorded is a NIM Download Event 706. The Event Log Module 98 preferably tracks the NIM ID 756, the provider ID 750, the start time 752, and the end time 754 for this event.

The next thing a user may do is open the NIM (step 810). This consists of retrieving the NIM definition from the user's User Profile and getting NIM content from the provider 82, as discussed above. The NIM is displayed for the user and the Event Log Module 98 records a NIM Display Event 708. However, at this point, the Event Log Module 98 can only record the start time 752, and the NIM ID 756 for this event. The end time 754 is recorded when the NIM is closed.

For every page of content a user views within a NIM 812, a Page-View Event 712 is recorded. Some page views may require content from the provider 82. The NIM ID 756, and the start time 752 are recorded for this event.

The NIM may also enable the user to click on a link that results in navigating to a full screen web browser (step 814). When a user does this, a Web Click-Through Event 710 is recorded. The Event Log Module 98 records the NIM ID 756, the start time 752, and the URL of the web site that is passed from the NIM content to the browser 758.

When the NIM closes (step 816), the end time 754 for the NIM Display Event 708 is recorded. When the user logs out of the home NIM (step 818), the event log is uploaded to the Server 50 (of FIG. 1).

In one embodiment of the invention, the previously described Event Log Module 98 (within the client computer 20 of FIG. 1) tracks user events in the home NIM user application and uploads the information to the Statistics Database 80 (of the server computer 50 of FIG. 1) at predetermined intervals alternate embodiments, the Event Log 700 (in FIG. 32) may be processed by the NIM Server before it is stored in the Statistics Database 80. For example, the NIM Server may process NIM use status information for each user that is currently logged in.

The Statistics Database 80, illustrated in FIG. 34, preferably lists every event 1002 by every user of home NIMs along with the corresponding fields associated with each event. For-example, if a NIM Display Event is recorded, the User ID 1004 of the user that performed the event is listed, the start time 1006 is listed, the end time 1008 is listed, and the NIM ID 1010 is listed. If a Web Click-Through Event is recorded, the User ID 1004 is listed, the NIM ID 1010 is listed, the start time 1006 is listed, and the URL of the web site 1014 is listed. The Statistics Database 80 therefore allows the list of events to be easily referenced and searched by each event or by each of the fields associated with the events.

Figure 35:
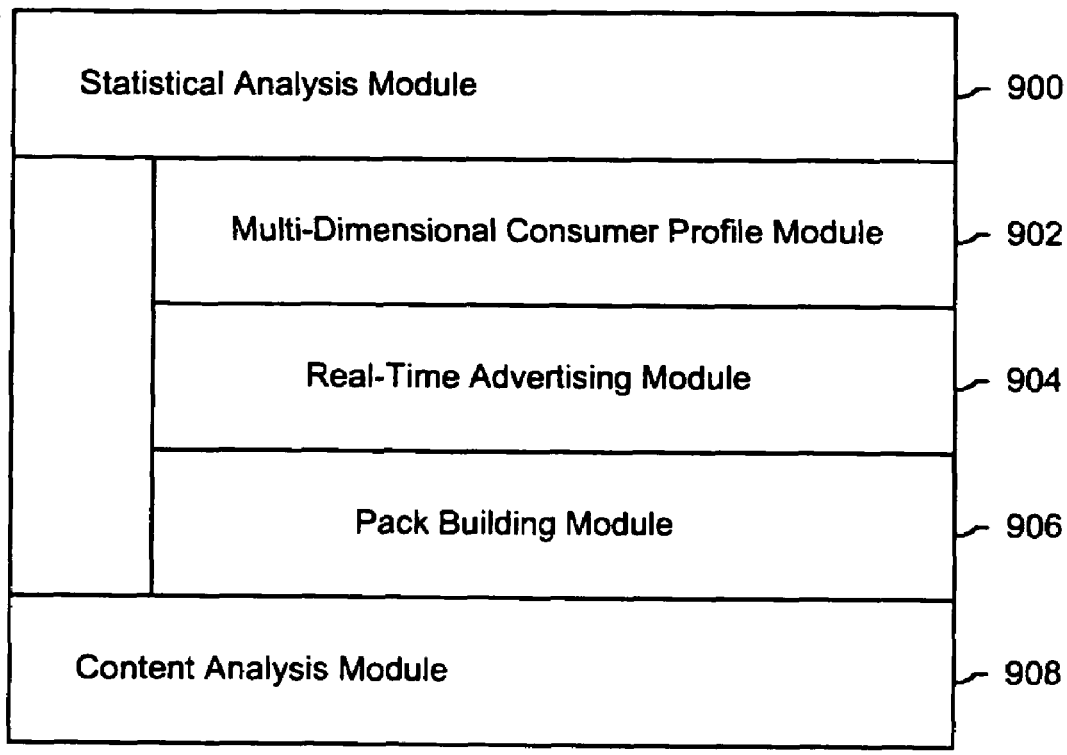
FIG. 35 illustrates a statistical analysis module and a content analysis module that may be used in accordance with an embodiment of the invention.

Referring to FIG. 35, the Statistical Analysis Module 900 uses the Statistics Database 80 in order to provide various services for the content provider partners 82. Preferably, the Statistical Analysis Module 900 includes a Multi-Dimensional Consumer Profile Module 902, a Real-Time Advertising Module 904, and a Pack Building Module 906, as discussed below.

A primary advantage of the present invention is that, because NIMs are used in groups and are used more often and for longer periods of time than web pages or web sites, real-time multi-dimensional NIM use data (that's a function of which NIMs are activated simultaneously) can be accumulated. In accordance with an embodiment of the invention, this accumulated data is used to generate a multi-dimensional consumer profiling database. The Multi-Dimensional Consumer Profile Module 902 uses information from the Statistics Database 80 to examine, for each user, the start time, and the end time of each NIM Display Event It then determines the NIMs (using the NIM IDs) that are opened simultaneously for each user. The Module 902 determines, for every selected NIM, the other NIMs that a given user may use in conjunction with the selected NIM. The Module 902 also determines how often these other NIMs are used simultaneously with the selected NIM. For example, Company X provides a NIM for selling its books. The Multi-Dimensional Consumer Profile Module 902 determines for Company X that a particular user has a NIM related to finance activated 30% of the time the user has the book-selling NIM acted, a NIM related to computers 20% of the time the user has the book-selling NIM activated, and a NIM related to wedding gifts 5% of the time the user has the book-selling NIM activated. This will provide Company X with a more complete profile of the user's interests.

The Real-Time Advertising Module 904 determines the NIMs that each user has displayed at any given moment. This information is used by a content provider partner or by the NIM Server to target advertising information. For example, if a user has a NIM related to sports displayed simultaneously with Company X's book-selling NIM, Company X uses this information to stream an advertisement for a sports book. In one embodiment, this is accomplished by associating each NIM with a context keyword. This is done by incorporating the context keyword into the NIM definition or, alternatively, by maintaining a table of NIMs and their corresponding context keywords. For example, the NIM related to sports is associated with the context keyword "sports." Moreover, the Real-Time Advertising Module 904 may combine the real-time user information with the historical user information from the Statistics Database 80 to provide advertisers with a complete picture of a user's interests.

The Pack Building Module 906 uses the Statistics Database 80 to determine which NIMs are being used simultaneously. The Module 906 also determines which NIMs are being shared as NIM Packs. From this, the Module 906 provides information to content provider partners about which NIMs should be bundled together. In alternate embodiments, the Module 906 builds a NIM Pack based upon the information it processes. For example, if the Pack Building Module 906 determines that an airline NIM is being used with a hotel NIM and a car rental NIM, the Module 906 may build a NIM Pack with a restaurant NIM.

Additionally, in one embodiment of the present invention, the NIM Server 82 may track the content within a NIM in a Content Database 1050, as illustrated in FIG. 36. A content descriptor 1052 which may be a string describing the content that is shown within the NIM is recorded for content shown in the NIM. For example, if a NIM displayed an advertisement for an automobile followed by an advertisement for a restaurant, the two recorded content descriptors might say "automobile ad" and "restaurant ad." In addition, the NIM ID 1054, the start time at which the content is displayed 1056, and the end time 1058 are all preferably recorded for each content descriptor.

Referring to FIG. 35, The Content Analysis Module 950 is able to correlate, at any moment, the content displayed to the user as recorded in the Content Database with the user's NIM activity recorded in the Statistics Database. For example, if one NIM displays to a user an advertisement for a travel book, the user may open a NIM related to Florida, a NIM owned by a specific airline, and a NIM owned by a car rental company. This pattern of user behavior will allow the company that provides the travel book advertisement to better understand the effect of the advertisement on the user. The company may use this information to make cross-promotions with other NIM providers, or, simply to provide more effective targeted advertisements.

In an alternative embodiment, each of the content providers may track its own content information. The content providers could then compare its content information with the user information provided by the Statistics Database of the NIMServer.

Figure 37:
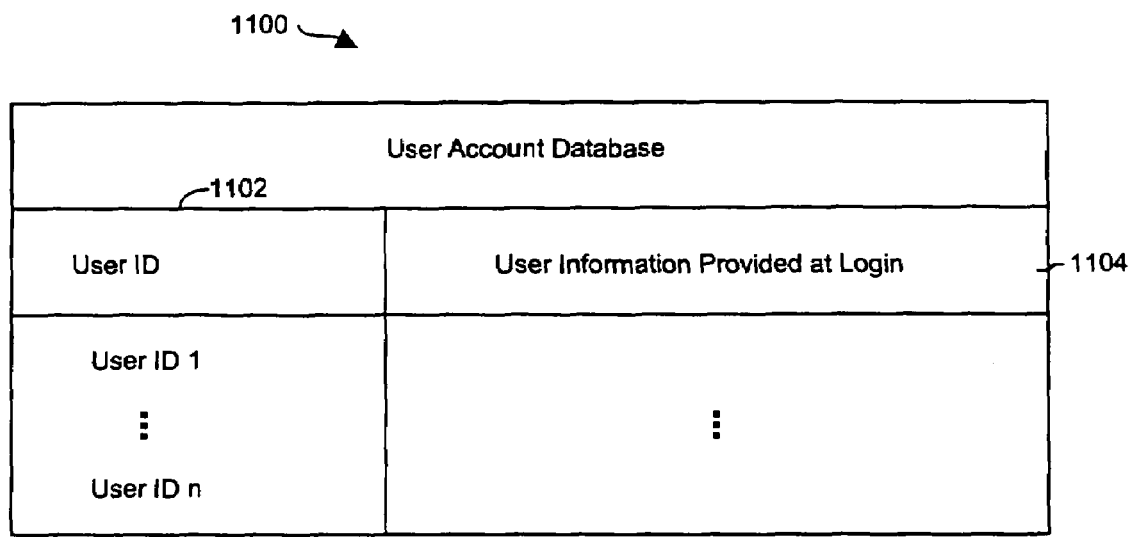
FIG. 37 illustrates a user account database that may be used in accordance with an embodiment of the invention.

Finally, referring to FIG. 37, all of the user event information may be used in conjunction with user information provided at login. During the login process, the user may be required to enter demographic information such as age, marital status, etc. In one embodiment, this information is stored in a User Account Database 11100. Each User ID 1102 is listed along with the corresponding user information 1104. Therefore, it is possible to match the user events with personal information about the particular user to give advertisers or NIM content providers a more complete behavior profile of each user.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of tracking distributed content within a computer network, which is displayed on a computer device, comprising:

displaying first addressed content in a first frame having a format and controls which are specific to the first addressed content, the first frame and first addressed content acquired and rendered independently from a Web browser program, and wherein display of the first addressed content is at least in part outside of a window of a Web browser program, and further wherein the first addressed content comprises at least a portion of a definition of the first frame;

displaying second addressed content in a second frame having a format and controls which are specific to the second addressed content, the second frame and second addressed content rendered independently from a Web browser program, and wherein display of the second addressed content is at least in part outside of a window of a Web browser program, and further wherein the second addressed content comprises at least a portion of a definition of the second frame;

recording information that includes starting times and ending times for time periods during which the first addressed content and the second addressed content were displayed on said computing device;

deriving, using said recorded information, whether said first addressed content and said second addressed content were displayed on said computing device during overlapping time periods; and outputting said determination of whether said first addressed content and said second addressed content were displayed on said computing device during overlapping time periods such that it may be used by other processes.

2. The method of claim 1 wherein said information associated with addressed content includes information related to user activity on said computing device, further comprising:

recording additional information related to user activity during the time period during which said first addressed content was displayed on said computing device; and correlating, using said recorded information, the first addressed content that was displayed on said computing device with user activity on said computing device.

3. The method of claim 1, wherein said first addressed content and said second addressed content are displayed in overlapping time periods on the computing device, and further comprising the step of determining the length of time which said first addressed content and said second addressed content are displayed in overlapping time periods on said computing device.

4. The method of claim 1, wherein:

said first addressed content is provided by a first addressed content provider, and said first addressed content has associated therewith a first identifier identifying the first addressed content provider;

said second addressed content is provided by a second addressed content provider, and said second addressed content has associated therewith a second identifier identifying the second addressed content provider; and the recorded information further comprises the first identifier and the second identifier.

5. The method of claim 1, wherein:

said first addressed content is obtained from a first addressed address;

said second addressed content is obtained from a second addressed address; and the recorded information further comprises the first addressed address and the second addressed address.

6. The method of claim 5, wherein:

said first addressed content has associated with it a date and time that it was obtained from the first addressed address;

said second addressed content has associated with it a date and time that it was obtained from the second addressed address; and the recorded information further comprises the dates and times that the first addressed content and the second addressed content were obtained.

7. The method of claim 1, further comprising the step of providing to the computing device a third addressed content, selection of the third addressed content based on a determination that the first addressed content and second addressed content were displayed in overlapping time periods.

8. The method of claim 7, wherein the third addressed content is provided to the computing device during the time period that the display of the first addressed content and the second addressed content overlap.

9. A system for tracking information relating to interaction with software objects on a computing device, comprising:

a computer-readable storage medium having stored thereon:

a first software object, comprising information programmed in a format readable by a Web browser program, wherein the information includes instructions for invoking a first computing device resident process executable independent of a Web browser and a definition that defines at least in part a functionality and an appearance of a first user interface outside of a window of a Web browser program and within which the results of the first computing device resident process are presented;

a second software object comprising information programmed in a format readable by a Web browser program, wherein the information includes instructions for invoking a second computing device resident process executable independent of a Web browser and a definition that defines at least in part a functionality and an appearance of a second user interface outside of a window of a Web browser program and within which the results of the second computing device resident process are presented;

a third software object configured to record information including starting times and ending times for time periods during which a user interacts with the first software object and the second software object on said computing device; and a fourth software object configured to communicate with a server coupled to said computing device to thereby provide the information to the server for determining at least whether said information comprising said first software object and information comprising said second software object were displayed on a computing device during overlapping time periods.

* * * * *